US006990273B2

(12) United States Patent
Zervas

(10) Patent No.: US 6,990,273 B2
(45) Date of Patent: Jan. 24, 2006

(54) OPTICAL MULTI-BAND DEVICE WITH GRATING

(75) Inventor: Mikhail Nicholaos Zervas, Southampton (GB)

(73) Assignee: Southampton Photonics, Ltd, Southampton (GB)

( * ) Notice: Subject to any disclaimer, the term of this patent is extended or adjusted under 35 U.S.C. 154(b) by 283 days.

(21) Appl. No.: 10/398,139

(22) PCT Filed: Oct. 12, 2001

(86) PCT No.: PCT/GB01/04556

§ 371 (c)(1),
(2), (4) Date: Apr. 2, 2003

(87) PCT Pub. No.: WO02/31552

PCT Pub. Date: Apr. 18, 2002

(65) Prior Publication Data

US 2004/0101242 A1    May 27, 2004

(51) Int. Cl.
*G02B 6/34* (2006.01)
(52) U.S. Cl. ............................................. 385/37
(58) Field of Classification Search .................. 385/37
See application file for complete search history.

(56) References Cited

U.S. PATENT DOCUMENTS 6,067,391 A * 5/2000 Land ........................... 385/27
6,269,205 B1 * 7/2001 Peral et al. .................. 385/28
6,313,933 B1 * 11/2001 Iwano ........................ 398/79
6,314,220 B1 * 11/2001 Mossberg et al. ............ 385/37
6,317,539 B1 * 11/2001 Loh et al. ..................... 385/37
6,330,383 B1 * 12/2001 Cai et al. ..................... 385/37
6,453,093 B2 * 9/2002 Xie et al. ..................... 385/37
6,501,883 B1 * 12/2002 Painchaud et al. ........... 385/37
6,865,319 B2 * 3/2005 Painchaud .................... 385/37

FOREIGN PATENT DOCUMENTS

WO    WO9922255 A    5/1999

OTHER PUBLICATIONS

Kashyap, R. et al. "Super-step-chirped fibre Bragg gratings", Electronics Letters, IEE Stevenage, GB, vol. 32,, No. 15, Jul. 18, 1996, p. 1394-1396, XP006005439; ISSN 0013-5194.

* cited by examiner

*Primary Examiner*—Rodney Bovernick
*Assistant Examiner*—Mike Stahl
(74) *Attorney, Agent, or Firm*—John S. Reid

(57) ABSTRACT

Apparatus for filtering optical radiation, which apparatus comprises a waveguide (50), and which waveguide (50) comprises a grating (51) having a first reflection wavelength band (52) having a first average wavelength (53) and a first group delay (54), and a second reflection wavelength band (55) having a second average wavelength (56) and a second group delay (57), wherein the first group delay (54) and the second group delay (57) are different in at least a portion of the second reflection wavelength band (55).

38 Claims, 47 Drawing Sheets

OPTICAL MULTI-BAND DEVICE WITH GRATING

CROSS REFERENCE TO RELATED APPLICATIONS

The present application is a U.S. National Stage filing of Patent Cooperation Treaty ("PCT") application Ser. No. PCT/GB01/04556, filed 12 Oct. 2001, which in turn claims priority to United Kingdom (Great Britain) Patent Application Ser. No. GB0025185.0, filed 13 Oct. 2000.

FIELD OF INVENTION

This invention relates to an optical waveguide multi-band Bragg grating device.

BACKGROUND TO THE INVENTION

High speed, high capacity optical communication systems require high performance devices that introduce minimum degradation. Such devices are required, for example, to introduce minimal insertion losses and should show no spurious reflection peaks or unwanted dispersion slopes. The adoption of wavelength-division-multiplexing (WDM) technology, as a means of increasing the optical system bandwidth and speed, is increasingly shifting the emphasis towards the use of multiband optical devices. The implementation of a 128-channel optical network, for example, will require the development of complex devices with up to 128 different transmission bands.

Multiband reflective optical devices have already been successfully demonstrated by using fibre Bragg grating technology. Multiband operation can be achieved by multi-element arrays formed by splicing together a series of single-band gratings with different central wavelengths and strong side-lobe suppression. Such an approach can result in high total insertion loss, due to finite splice losses. Their performance can also be compromised by residual backreflections introduced by the splices, especially if the individual gratings are written in fibres with different characteristics, such as different numerical apertures or core/cladding compositions, in order to increase photosensitivity and/or eliminate short-wavelength cladding-mode losses.

Multiband operation can also be achieved by overwriting and essentially superimposing different gratings, corresponding to the different reflection bands, on the same fibre length. However, such an approach quickly saturates the available fibre photosensitivity and results in a small number of bands with relatively small reflectivity. Also, since this process involves multiple exposures, any error during the writing of a certain grating (e.g., due to different exposure conditions and UV-fluence stability) is quite likely to affect the other gratings as well.

Finally, multiband operation can also be achieved by single, complex superstructured gratings, such as sampled or sinc-apodised superstructured gratings. These complex-grating structures can be viewed as resulting from a linear, coherent superposition of the individual gratings that correspond to each different band. Such linear coherent superposition is essentially an additive process and results in complex refractive-index-variation patterns and very large required peak refractive index changes. This can potentially limit the number or types of photosensitive fibres that can be used. Also, it can severely limit the maximum achieved reflectivity at each band.

None of these prior-art approaches achieve multiband operation provide multi-channel, high-reflectivity devices (>50%) having low dispersion. This is a serious problem for high-speed (eg 10 GB/s and 40 GB/s) communication systems.

An aim of the present invention is to improve the performance of gratings that reflect optical radiation at more than one wavelength.

SUMMARY OF THE INVENTION

According to a non-limiting embodiment of the present invention there is provided apparatus for filtering optical radiation, which apparatus comprises a waveguide, wherein the waveguide comprises a grating having a first reflection wavelength band having a first average wavelength and a first group delay, and a second reflection wavelength band having a second average wavelength and a second group delay, wherein the first group delay and the second group delay are different in at least a portion of the second reflection wavelength band.

The first reflection wavelength band can have at least one maximum reflectivity. The maximum reflectivity can be greater than 50%. The maximum reflectivity can be greater than 90%. The maximum reflectivity can be greater than 95%. Preferably, the maximum reflectivity is greater than 99%.

The first average wavelength can be shorter than the second average wavelength.

The first group delay can have an average first time delay, and the second group delay can have an average second time delay. The average first time delay can be equal to, less than, or greater than the average second time delay.

The grating can have a time delay difference equal to the modulus of the difference between the average first time delay and the average second time delay.

The time delay difference can be between 1 fs (femtosecond) and 1000 ps (picosecond).

The grating comprises a plurality of lines, each line being defined by a respective strength, and each line having a relative displacement from adjacent lines. The time delay difference is preferably the time taken for light to propagate along the waveguide through an odd integral number of the lines. The integral number of lines can be between one and one million.

The first group delay can have a first chirp. By "chirp" we mean that the time delay varies with wavelength. The first chirp can be positive or negative. The first chirp can be linear or non-linear.

The second group delay can have a second chirp. The second chirp can be positive or negative. The second chirp can be linear or non-linear.

The grating can comprise at least one additional reflection wavelength band having an additional average wavelength and an additional group delay, and wherein the first, second and the additional average wavelengths are different from each other.

The grating can be such that the first, second and additional average wavelengths are configured to reflect non-adjacent wavelength channels. Wavelength channels are usually quoted in terms of their optical frequencies and these have been defined on internationally recognized 25 GHz, 50 GHz, 100 GHz and 200 GHz grids. The first, second and additional average wavelengths can be uniformly spaced. Such a device is commonly known as an interleaver.

There can be a circulator connected to the grating. The apparatus can then further comprise a first demultiplexer, and wherein the circulator is connected to the first demultiplexer. Alternatively, or in addition, the apparatus can further comprise a second demultiplexer, and wherein the grating is connected to the second demultiplexer.

The apparatus can comprise a plurality of such apparatus configured in a linear array, and wherein each apparatus is configured to reflect different wavelengths.

At least one of the circulators can be connected to a demultiplexer.

At least one circulator can be connected to another appropriate unit of apparatus, and wherein the apparatus is configured to reflect different wavelengths. The apparatus can further comprise at least one demultiplexer.

The invention can also provide an apparatus, which apparatus can be configured as at least one of an interleaver, a demultiplexer, or a multiplexer. The apparatus comprises at least one coupler, and at least one grating having a plurality of wavelength reflection bands. The coupler can be an optical fibre coupler, a beam splitter, or a planar optics coupler. The coupler is preferably a circulator. The apparatus can also comprise at least one demultiplexing device such as an arrayed waveguide array or a demultiplexer comprising an assembly of thin-film filters.

BRIEF DESCRIPTION OF THE DRAWINGS

Embodiments of the invention will now be described solely by way of example and with reference to the accompanying drawings in which.

DETAILED DESCRIPTION OF PREFERRED EMBODIMENTS OF THE INVENTION

Figure 5:
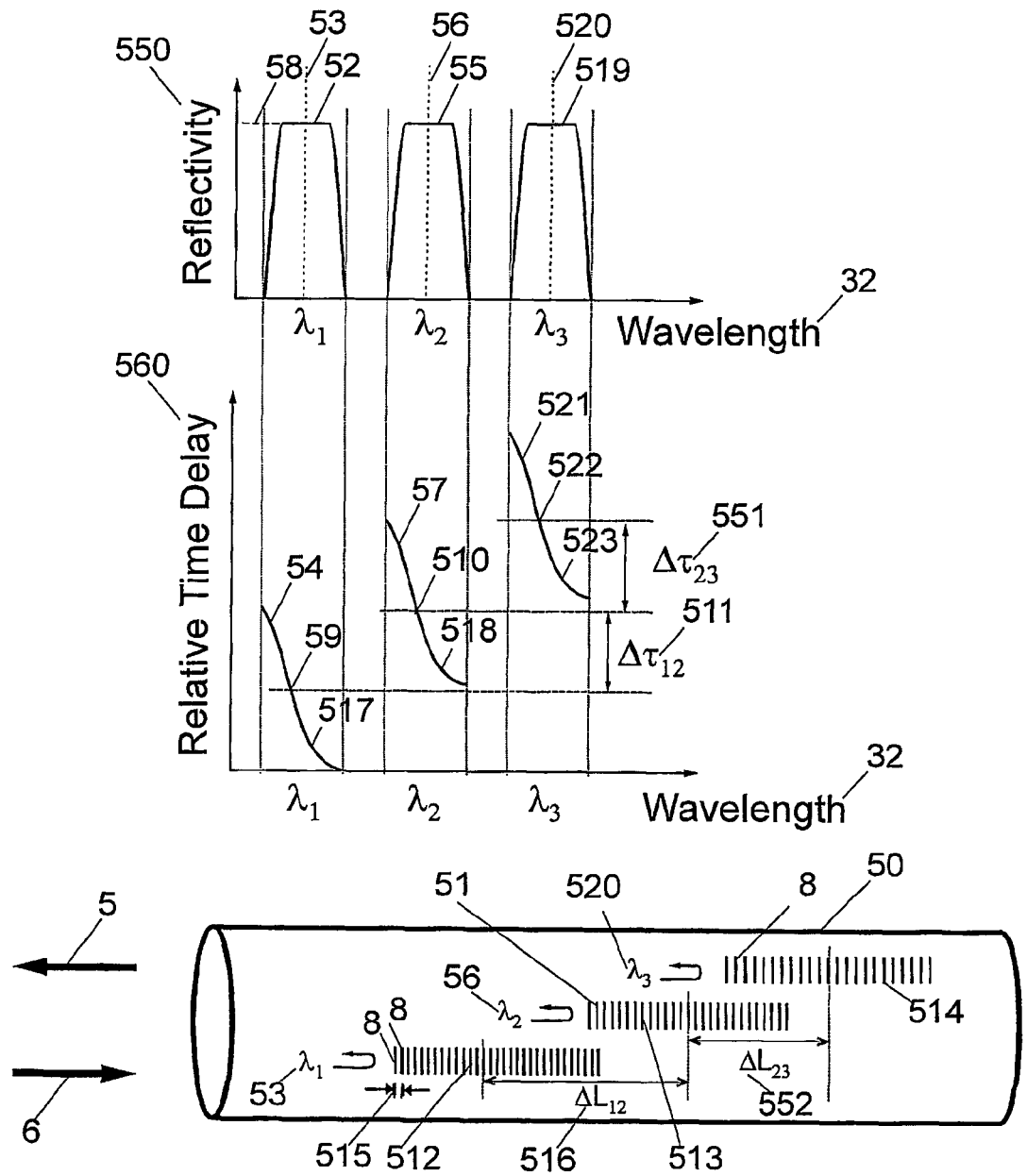
FIG. 5 shows a multiband fibre Bragg grating according to the present invention.

Referring to FIG. 5, there is shown apparatus for filtering optical radiation, which apparatus comprises a waveguide 50, wherein the waveguide 50 comprises a grating 51 having a first reflection wavelength band 52 having a first average wavelength 53 and a first group delay 54, and a second reflection wavelength band 55 having a second average wavelength 56 and a second group delay 57, wherein the first group delay 54 and the second group delay 57 are different in at least a portion of the second reflection wavelength band 55.

The grating 51 can be designed using an inverse scattering technique, a layer peeling method or an iterative or non-iterative analytical or computational process.

The first reflection wavelength band 52 can have at least one maximum reflectivity 58. The maximum reflectivity 58 can be greater than 50%. The maximum reflectivity 58 can be greater than 90%. The maximum reflectivity 58 can be greater than 95%. Preferably, the maximum reflectivity 58 is greater than 99%.

The first average wavelength 53 can be shorter than the second average wavelength 56.

The first group delay 54 can have an average first time delay 59, and the second group delay 57 can have an average second time delay 510. The average first time delay 59 can be equal to, less than, or greater than the average second time delay 510.

The grating 51 can have a time delay difference 511 equal to the modulus of the difference between the average first time delay 59 and the average second time delay 510.

The time delay difference 511 can be between 1 fs (femtosecond) and 1000 ps (picosecond).

Figure 1:
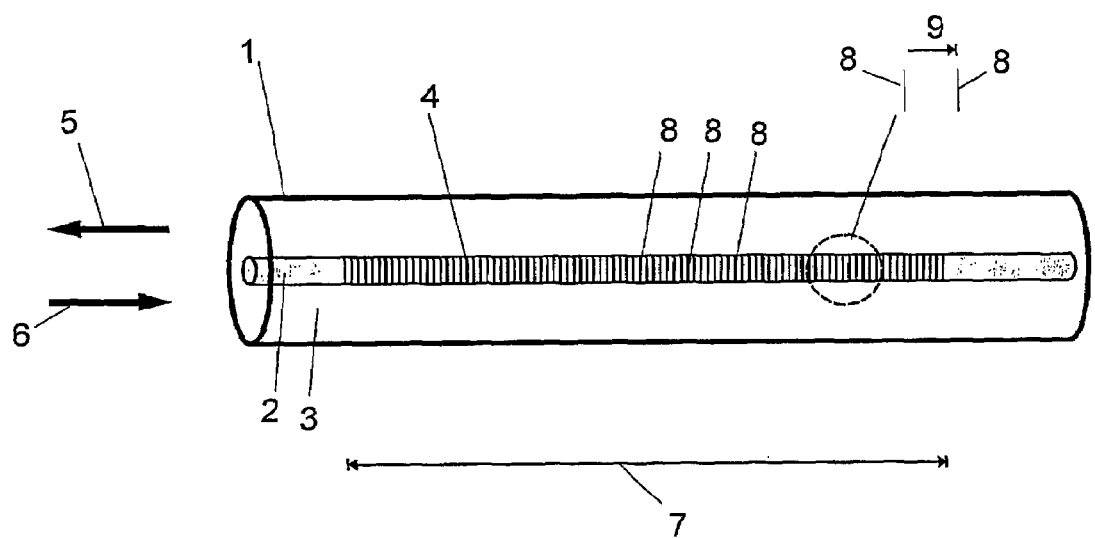
FIG. 1 shows a fibre Bragg grating according to the present invention.

The grating 51 has been shown for convenience as comprising three separate sub-gratings 512, 513 and 514. A more usual depiction is as shown in FIG. 1, which shows a waveguide 1 comprising a core 2 and a cladding 3. A grating 4 has been written into the waveguide 1. The grating 4 has a length 7. Optical radiation 6, which is launched into the waveguide 1 is reflected by the grating 4 resulting in reflected optical radiation 5. The grating 4 comprises a plurality of lines 8, each line 8 being defined by a respective strength, and each line 8 having a relative displacement 9 from adjacent lines.

Referring again to FIG. 5, the time delay difference 511 is preferably the time taken for light to propagate along the waveguide 50 through an odd integral number of the lines 8. The integral number of lines 8 can be between one and one million. Note that the time delay difference 511 corresponds to the time difference in reflection. Thus if the integral number of lines 8 is one (ie the light propagates along the waveguide 1 from one line to the next line) then this corresponds to a longitudinal shift of half the line spacing 515, and so, in the depiction shown in FIG. 5, the subgrating 513 would be shifted longitudinally by a length 516 of half the line spacing 515. Note that the line spacing 515 will vary along the grating 51 and thus the definition of "an odd integral number of lines" should be interpreted as an average or based on a localised line spacing. It is preferable that the time delay difference 511 is chosen to reduce the maximum strength of the lines 8.

The first group delay 54 can have a first chirp 517. By "chirp" we mean that the time delay varies with wavelength as shown in FIG. 5. The first chirp 517 can be positive or negative. The first chirp 517 can be linear or non-linear.

The second group delay 57 can have a second chirp 518. The second chirp 518 can be positive or negative. The second chirp 518 can be linear or non-linear.

The grating 51 can comprise at least one additional reflection wavelength band 519 having an additional average wavelength 520 and an additional group delay 521, and wherein the first, second and the additional average wavelengths 53, 56, 520 are different from each other. The additional group delay 54 can have an average additional group time delay 522. The additional group delay 54 can have an additional chirp 523. The additional chirp 523 can be positive or negative. The additional chirp 523 can be linear or non-linear.

Figure 39:
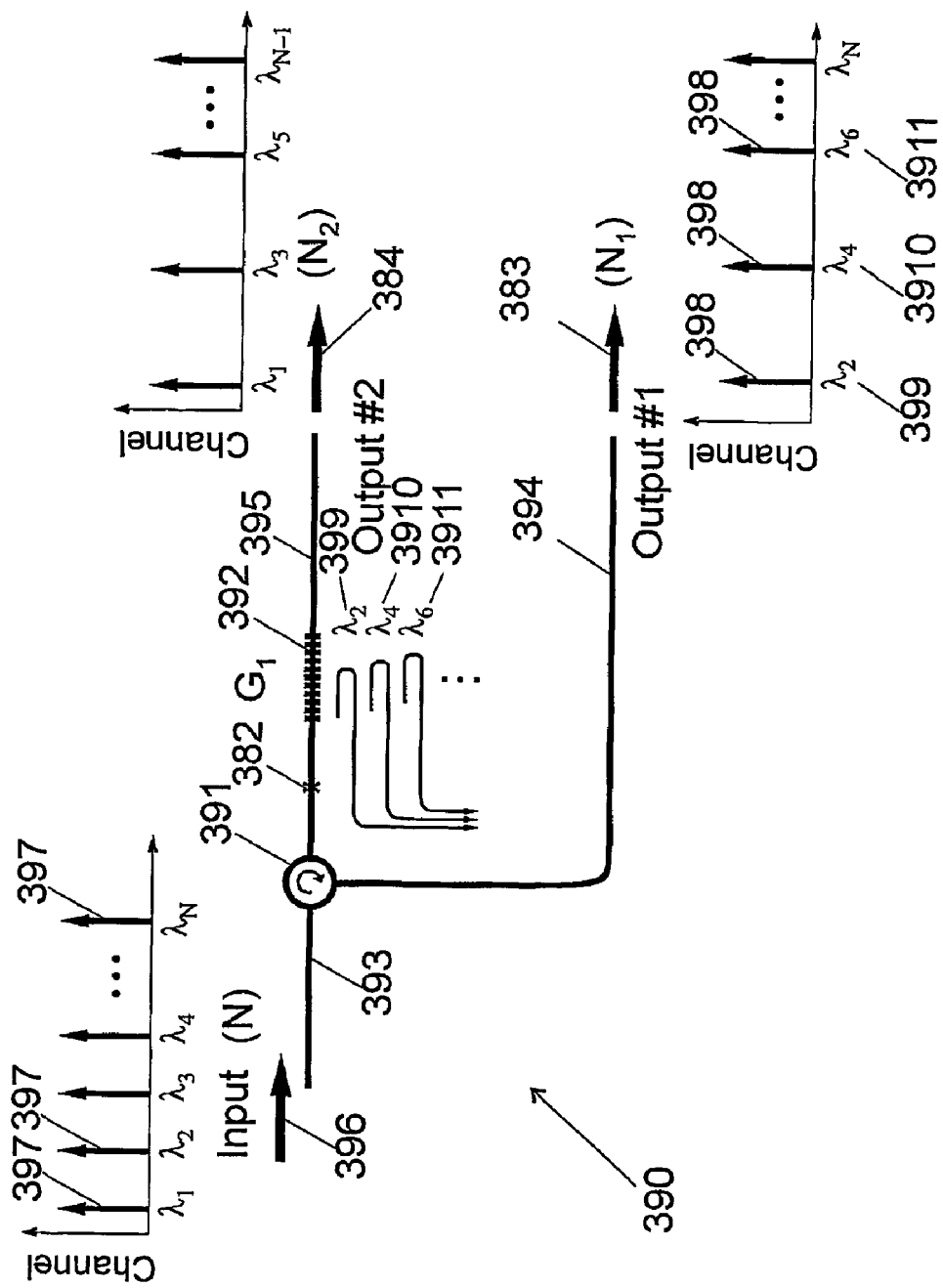
FIG. 39 shows an interleaver according to the present invention.

FIG. 39 shows an apparatus 390 comprising a circulator 391, a grating 392, an input 393, a first output 394, and a second output 395, wherein the grating 392 comprises first, second and additional reflection wavelength bands 399, 3910, 3911. Optical radiation 396 comprising a plurality of wavelength channels 397 is input into the apparatus 390. The grating 392 can be configured to reflect non-adjacent wavelength channels 398 as shown in FIG. 39. Wavelength channels are usually quoted in terms of their optical frequencies and these have been defined on internationally recognized 25 GHz, 50 GHz, 100 GHz and 200 GHz grids. The non-adjacent wavelength channels 398 can be uniformly spaced. Alternatively, they can be non-uniformly spaced. The grating 392 can be configured to reflect groups of wavelength channels 397 some or all of which can be adjacent. A coupler such as an optical fibre coupler, a planar waveguide coupler, or a beam splitter can replace the circulator 391.

Figure 41:
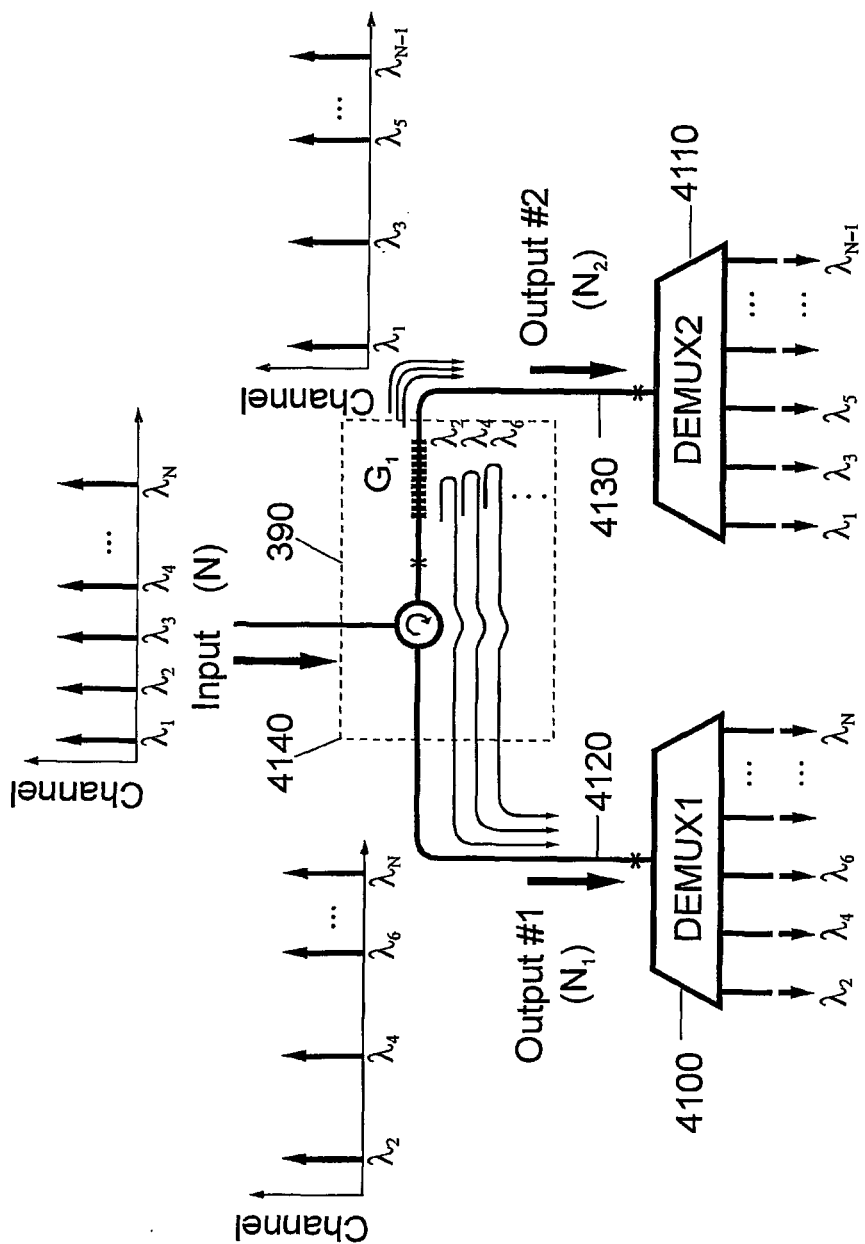
FIG. 41 shows a demultiplexer according to the present invention.

FIG. 41 shows the apparatus 390 connected to a first demultiplexer 4100 and a second demultiplexer 4110. The first and second demultiplexers 4100, 4110 can be an arrayed waveguide array, a demultiplexer comprising an assembly of thin-film filters, or an assembly of fibre Bragg gratings and couplers. The couplers are preferably circulators.

Figure 42:
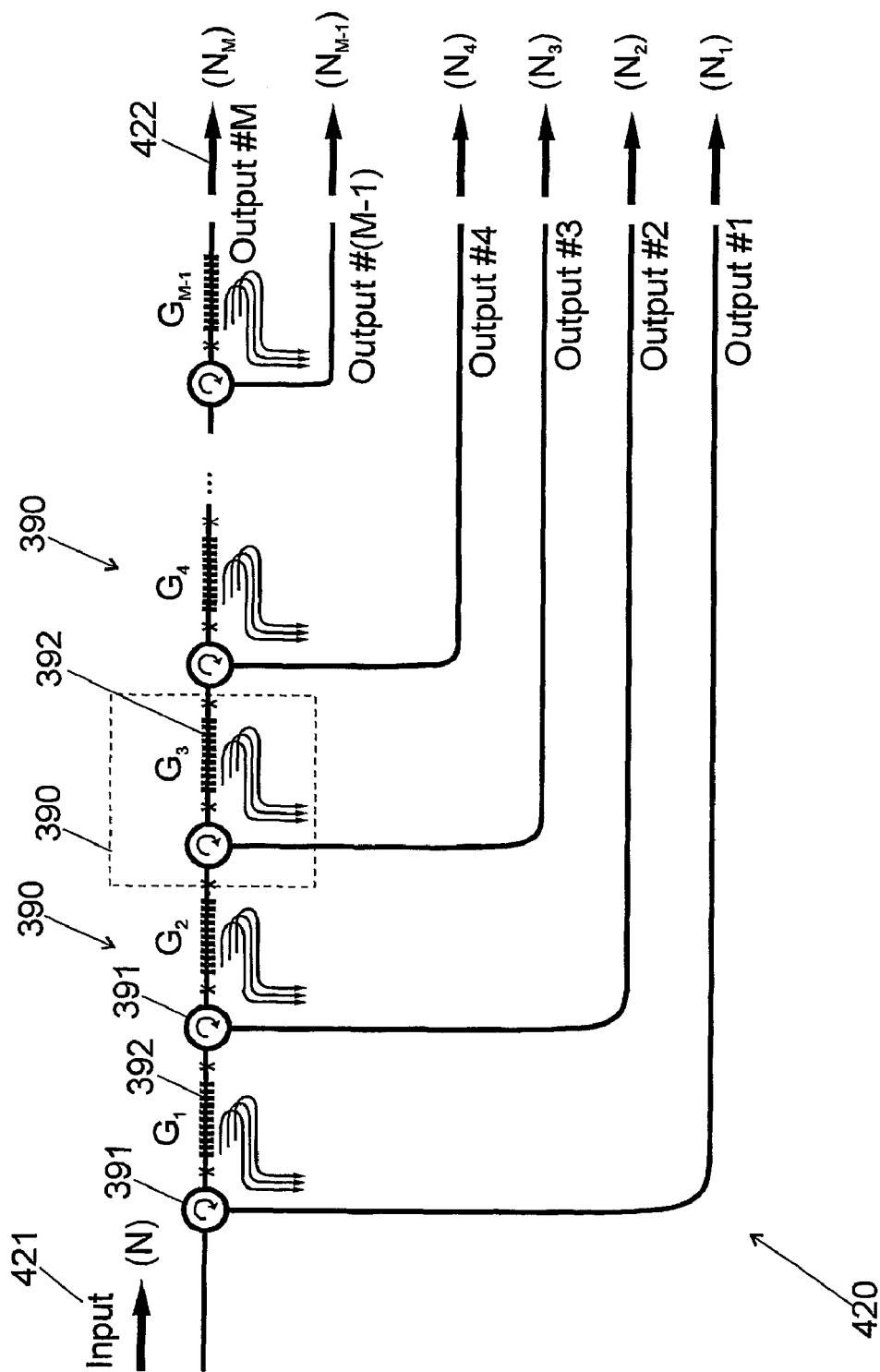
FIG. 42 shows a generalized M-port interleaver according to the present invention.
Figure 43:
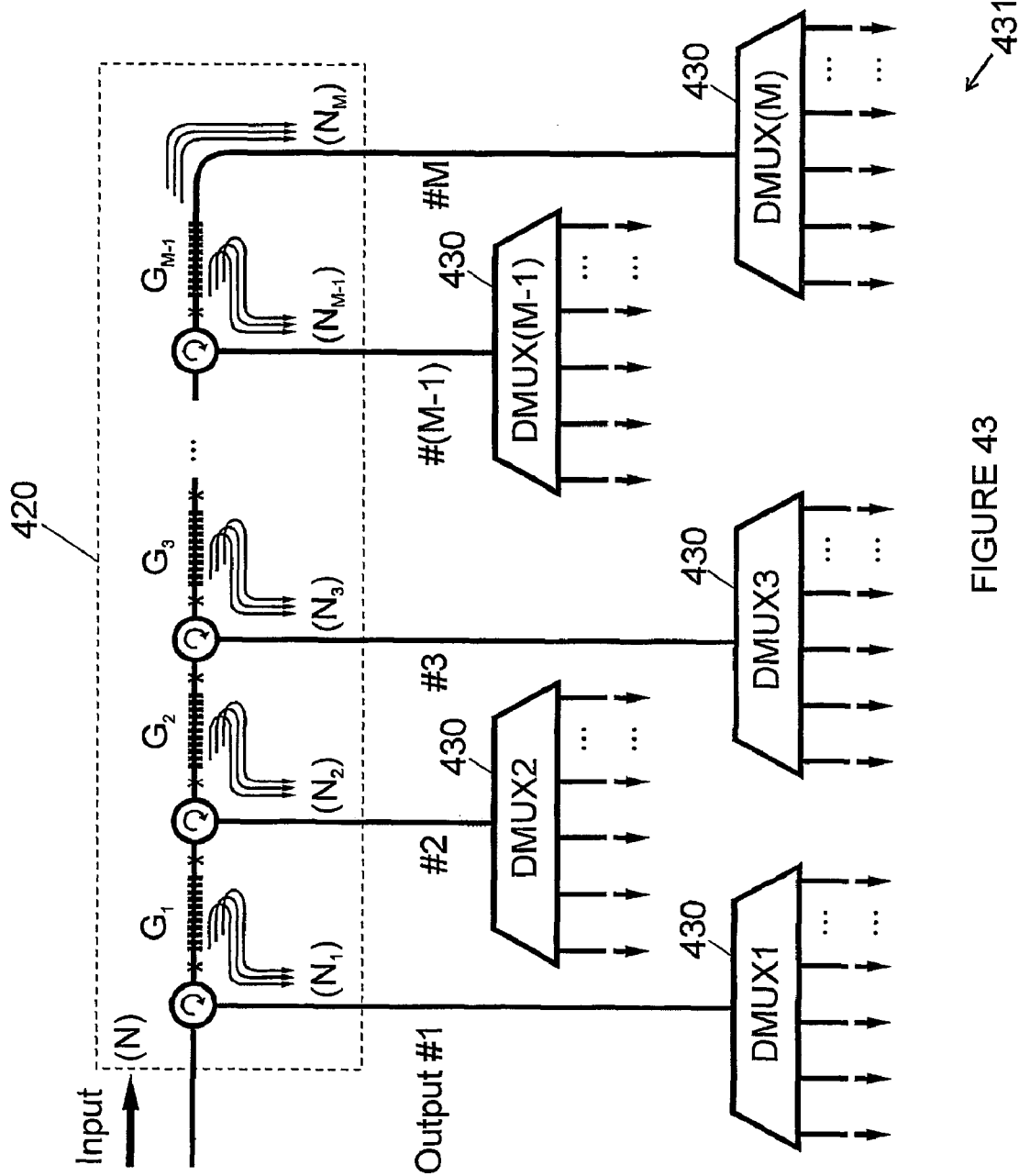
FIG. 43 shows a composite demultiplexer according to the present invention.

FIG. 42 shows an apparatus 420 comprising a plurality of apparatus 390 configured in a linear array, and wherein each apparatus 390 is configured to reflect different wavelengths. FIG. 43 shows the apparatus 420 connected to demultiplexers 430.

Figure 44:
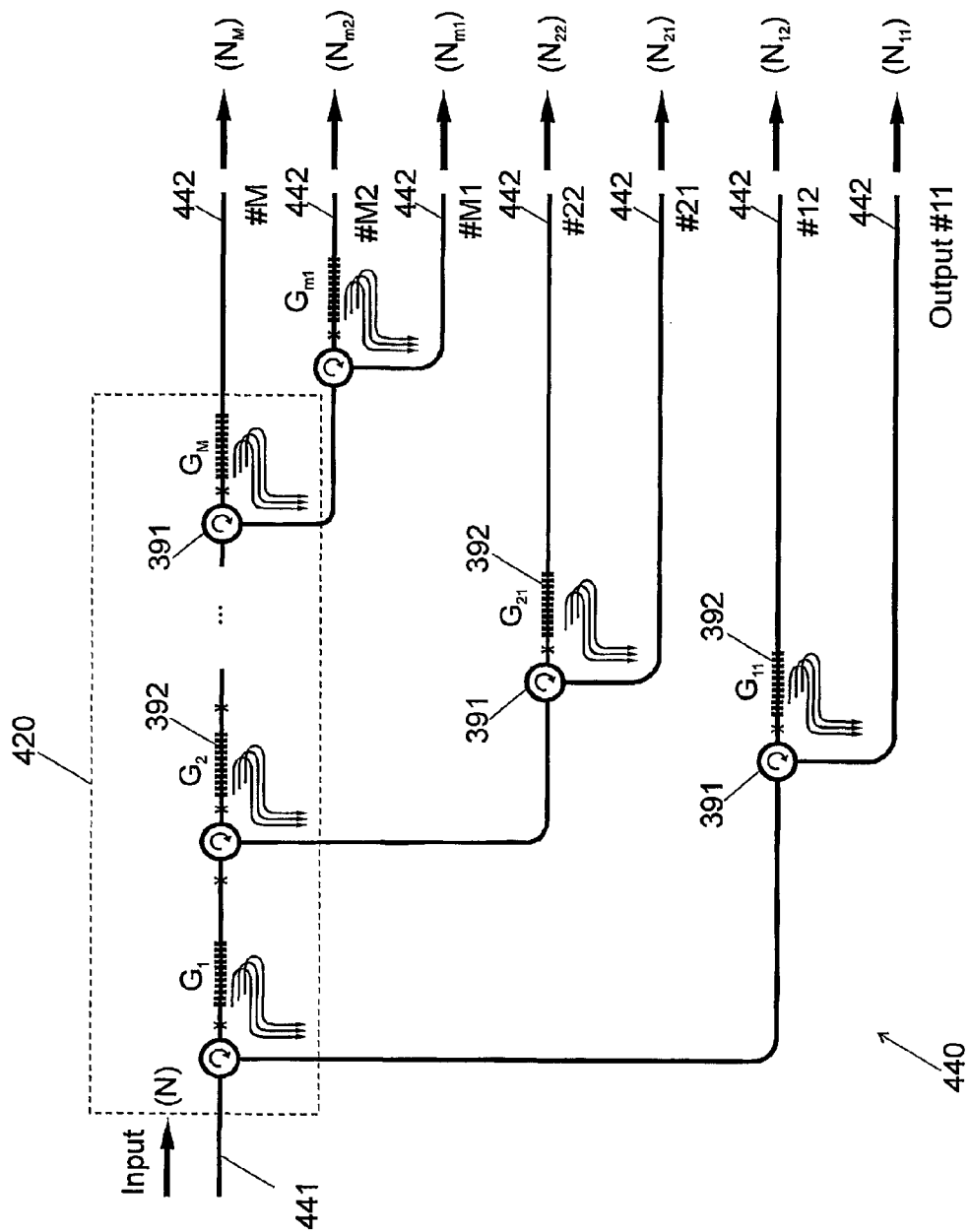
FIG. 44 shows a demultiplexer according to the present invention comprising multiband gratings and circulators in a tree configuration.
Figure 45:
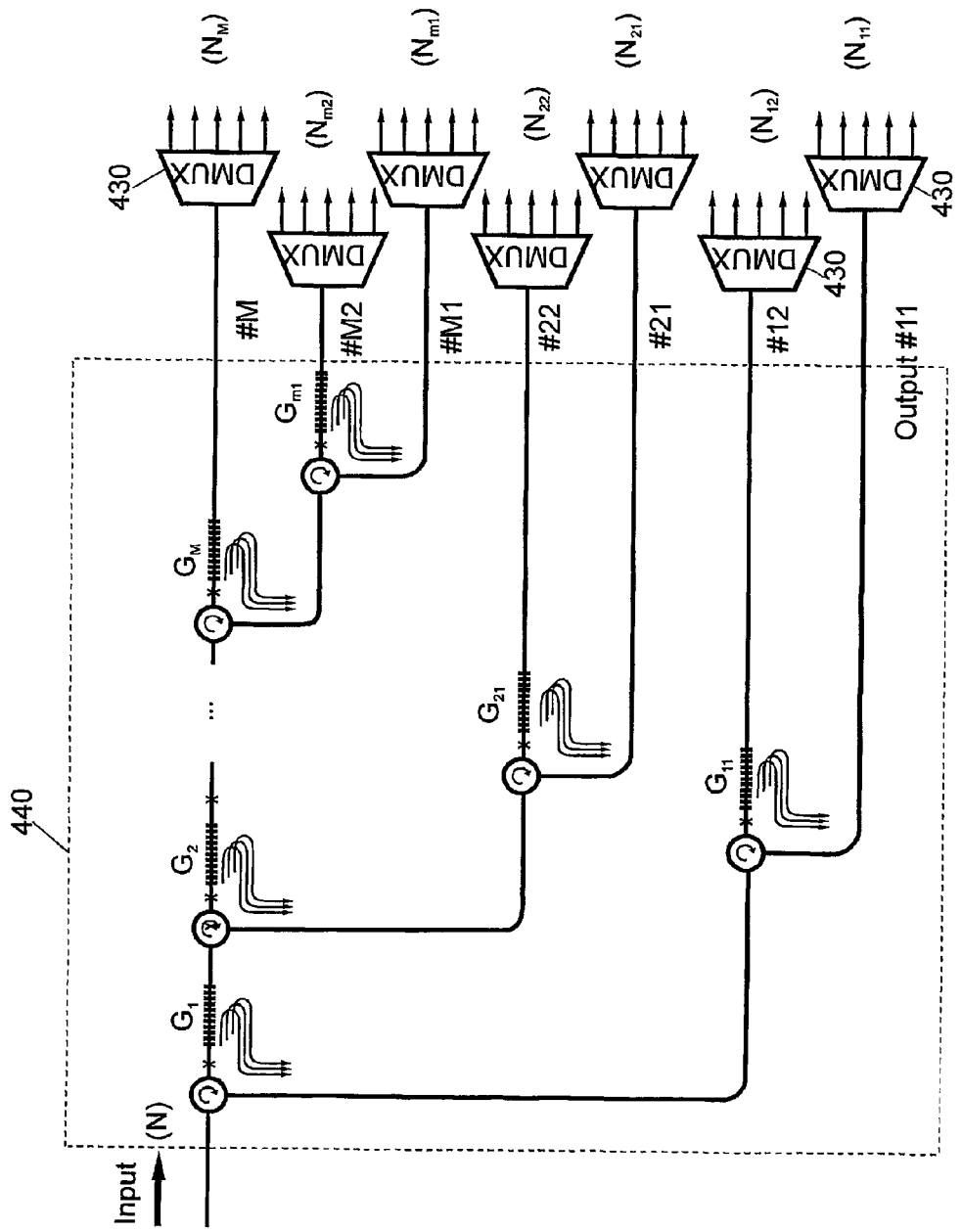
FIG. 45 shows a demultiplexer according to the present invention that uses the demultiplexer of FIG. 44.

FIG. 44 shows an apparatus 440 comprising the apparatus 420, circulators 391, gratings 392, inputs 441 and outputs 442. The apparatus is configured to reflect different groups of wavelengths to different ones of the outputs 442. FIG. 45 shows the apparatus 440 connected to demultiplexers 430.

Figure 46:
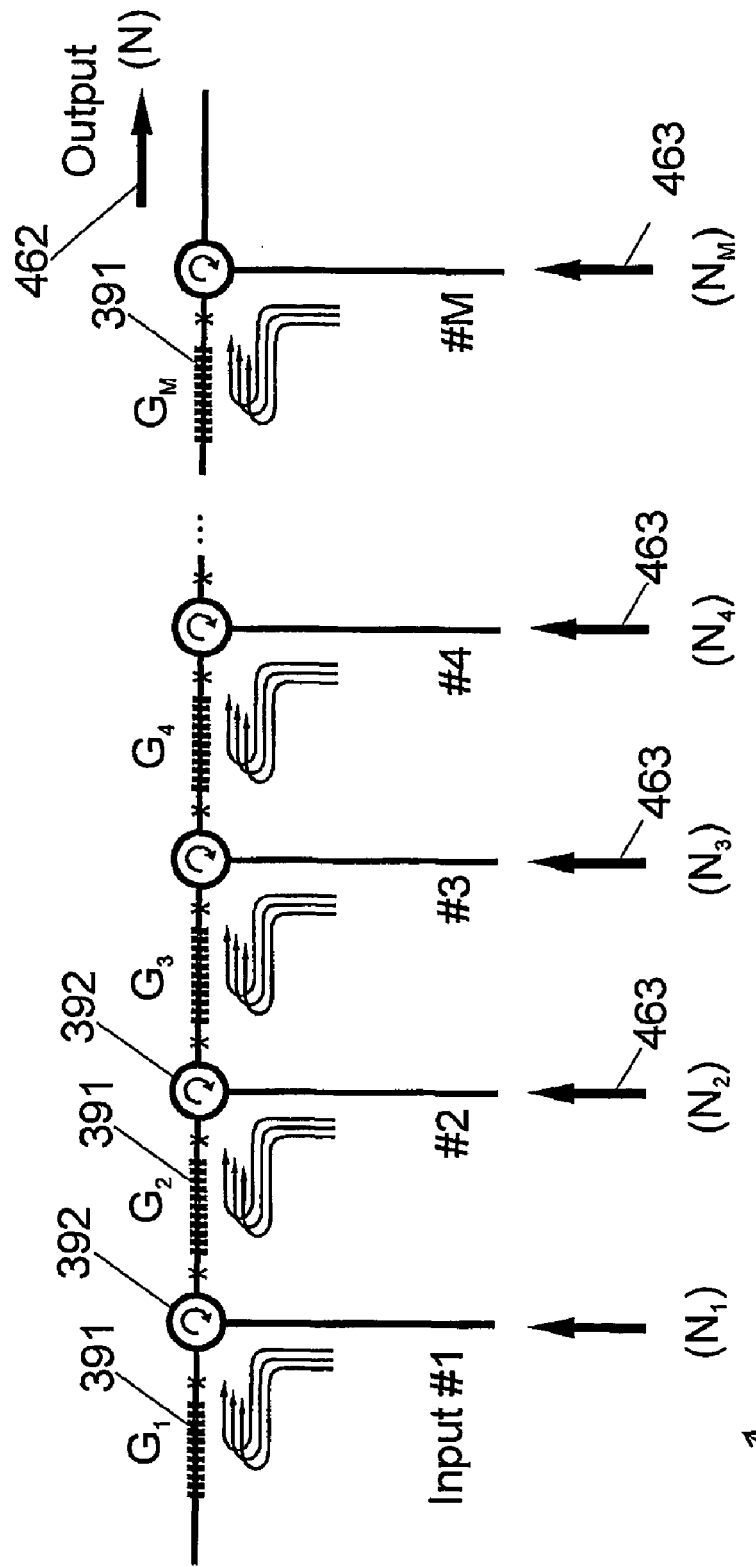
FIG. 46 shows a wavelength combiner according to the present invention.
Figure 47:
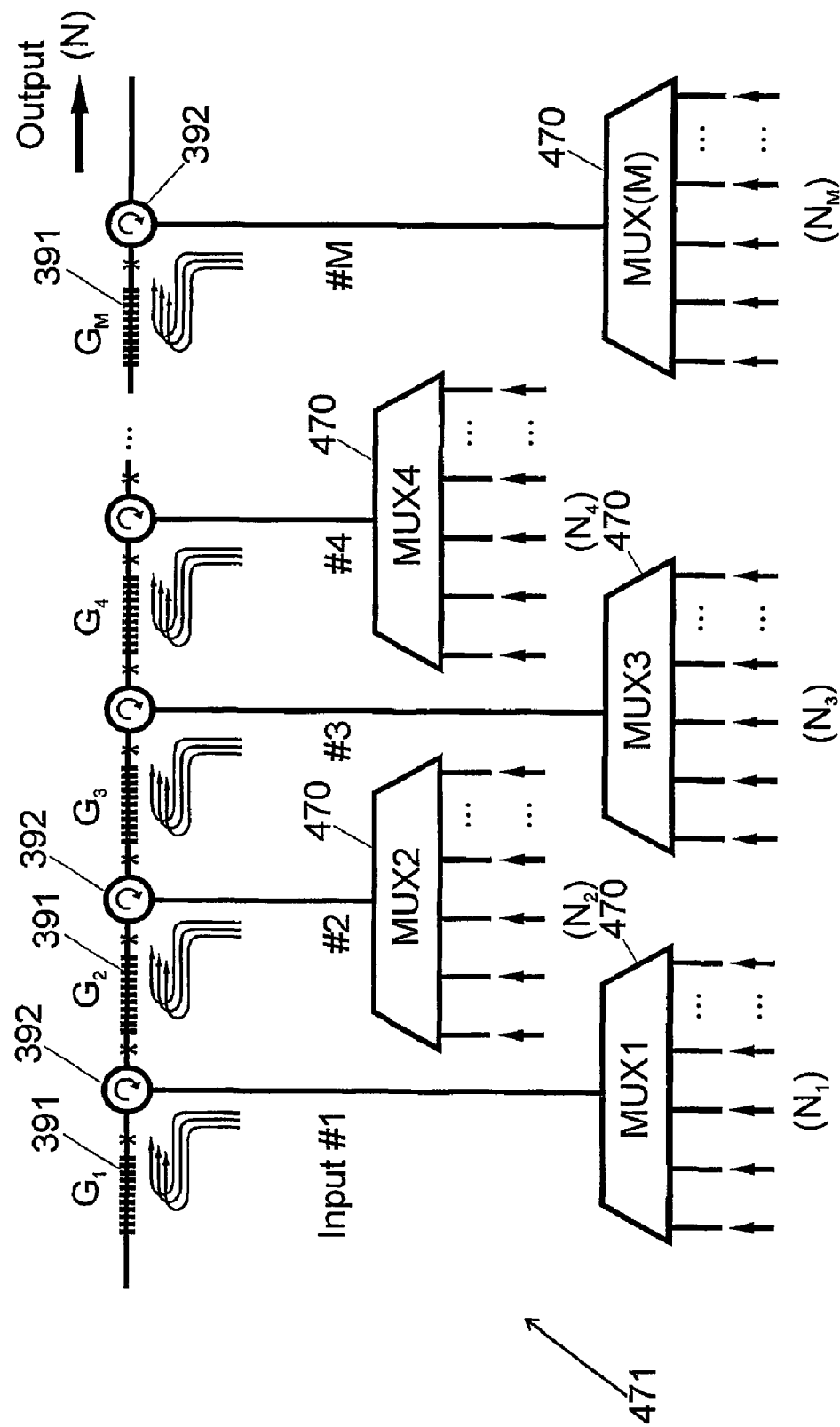
FIG. 47 shows a wavelength multiplexer according to the present invention.

FIGS. 46 and 47 show similar arrangements to FIGS. 42 and 45 but configured as wavelength combiners or multiplexers. The multiplexers 471 can comprise an arrayed waveguide array, an assembly of couplers, thin-film filters, or an assembly of fibre Bragg gratings and couplers or circulators.

Figure 2:
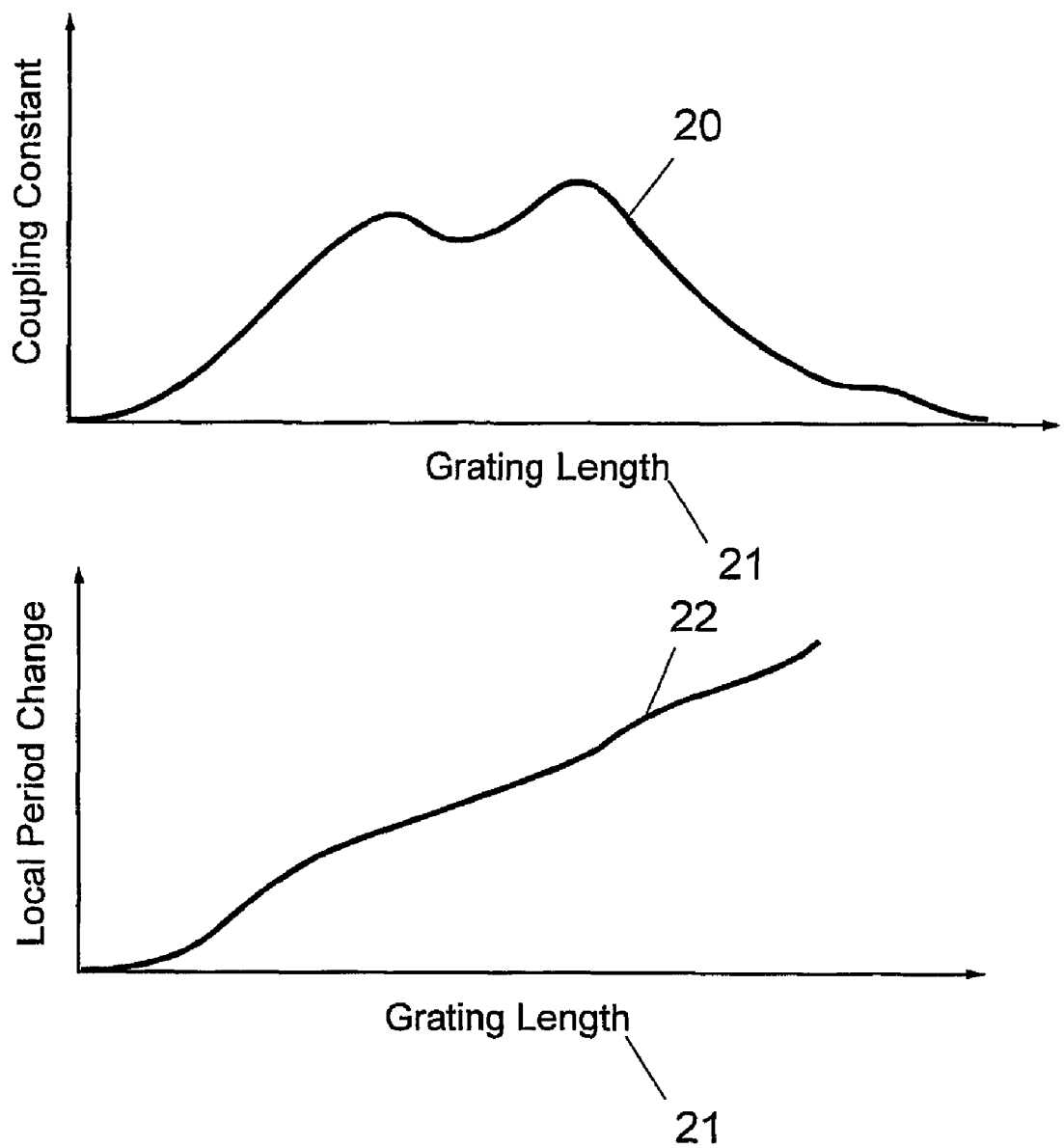
FIG. 2 (not in accordance with the invention) shows the variation in coupling constant with the length of a fibre Bragg grating.
Figure 3:
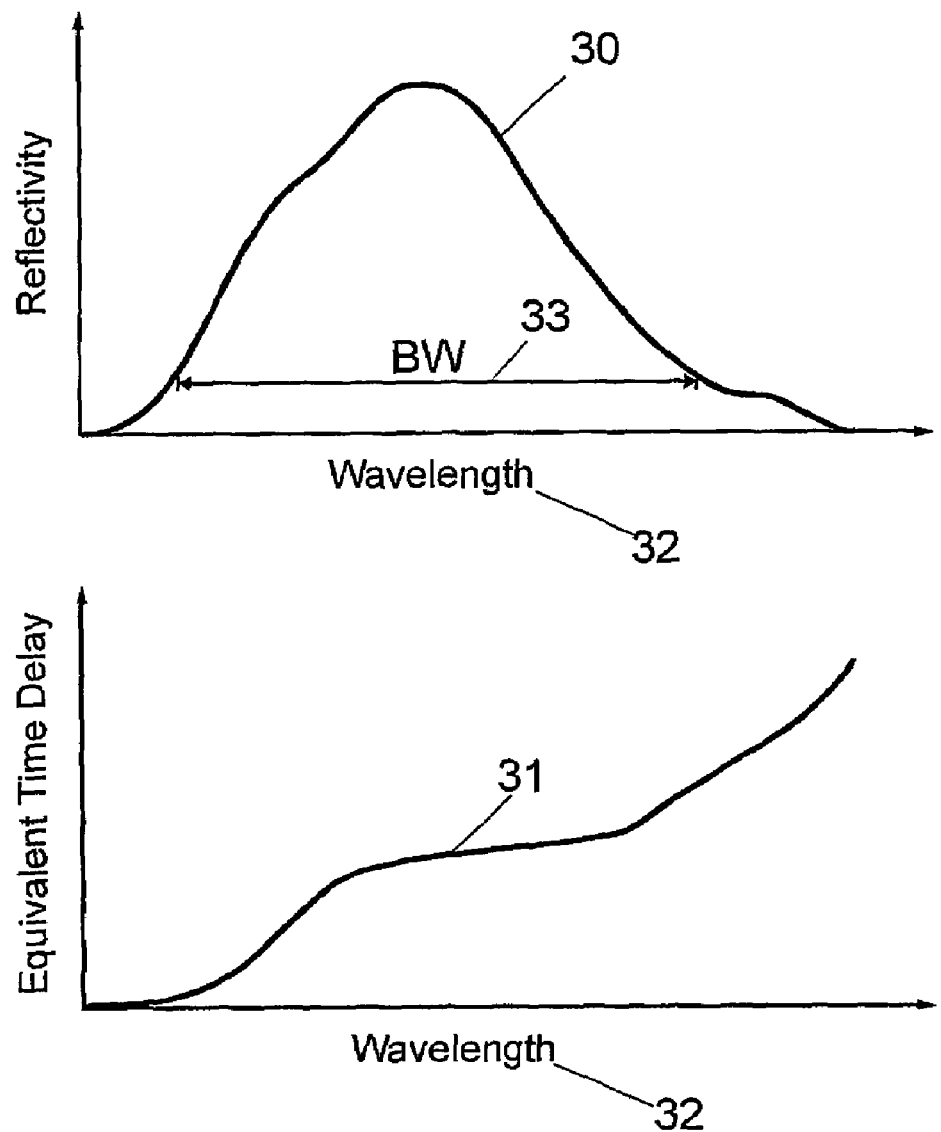
FIG. 3 (not in accordance with the invention) shows the variation of reflectivity and group delay with wavelength.

FIG. 1 is a schematic of a fibre Bragg grating 4 of length $L_{gr}$ 7 showing also the input light 6 and the reflected light 5. FIG. 2 shows a schematic of the variation of the coupling constant modulus $|\kappa(z)|$ 20 and the local-period change $\Delta\Lambda(z)$ variation 22, along the grating length z 21. FIG. 3 shows a schematic of the reflectivity spectrum $R(\lambda)$ 30 and the corresponding group delay $\Delta\tau(\lambda)$ 31, as a function of the wavelength $\lambda$ 32, over the grating bandwidth BW 33. By the word "bandwidth" or "band" we mean a wavelength range in which a substantial proportion of the optical radiation is reflected. The grating bandwidth 33 can be the 3 dB bandwidth.

Fibre Bragg Gratings (FBGs) can be characterised in terms of their period uniformity and the spatial variation of refractive-index modulation (apodisation profile). The refractive index variation along the FBG length is, generally, given by:

$$n(z) = n_0\{1 + 2h(z)\cos[K_0 z + \phi(z)]\} \quad (1)$$

where $n_0$ is the fibre effective refractive index, h(z) describes the amplitude variation of the induced refractive-index modulation, $K_0=2\pi/\Lambda_0$ is the reference Bragg wavevector ($\Lambda_0$ is the reference Bragg period). The positive peaks of h(z) are referred to as the "lines" of the grating. φ(z) is used to express the slowly varying spatial phase along the grating length, as well as specific phase shifts at particular points. z is the coordinate measured along the grating axis. In the case, for example, of linearly chirped gratings $\phi(z)=K_0Cz^2$, where C (in m$^{-1}$) is the chirp parameter, while for standard uniform gratings φ(z) is constant (usually taken as zero). The reference Bragg period $\Lambda_0$ is typically of the order of 0.1 μm to 1 μm. The slowly varying grating phase φ(z) corresponds to a slowly varying local grating period Λ(z) given by:

$$\Lambda(z) = \Lambda_0\left(1 - \frac{\Lambda_0}{2\pi}\frac{d\phi(z)}{dz}\right) \quad (2)$$

The difference $$\Delta\Lambda(z) = \Lambda(z) - \Lambda_0 = -\frac{\Lambda_0^2}{2\pi}\frac{d\phi(z)}{dz} \quad (3)$$

defines the local period change.

The index modulation h(z) is, in general, expressed as h(z)=$h_0$ f(z), where $h_0$ is the peak refractive-index modulation and f(z) is the apodisation profile. The grating coupling constant κ(z) is, in general, a complex number with a magnitude |κ(z)| that is proportional to the modulus of the refractive-index modulation h(z) and a phase arg[κ(z)] that depends on the local period change ΔΛ(z). Therefore, the grating can be fully described by |κ(z)| and the local period change ΔΛ(z).

The grating reflection coefficient is, in general, a complex number expressed as:

$$r_0(\lambda)=|r_0(\lambda)|e^{+i\theta(\lambda)} \quad (4)$$

where |.| denotes modulus and θ(λ) is the relative phase of the reflected light at the grating input end. The grating reflectivity R is given by $$R(\lambda)=|r_0(\lambda)|^2 \quad (5)$$

The group delay Δτ(λ), associated with the grating reflection, is given by:

$$\Delta\tau(\lambda) = \frac{n_0}{c_0}\frac{d\theta(\lambda)}{d\beta} = -\frac{\lambda^2}{2\pi c_0}\frac{d\theta(\lambda)}{d\lambda} \quad (6)$$

where $c_0$ is the phase velocity of light in vacuum, β is the propagation constant in the fibre, and λ is the free-space wavelength. The group delay Δτ(λ) is sometimes referred to in the specification and the figures as an equivalent time delay or time delay, and variations in the group delay is sometimes referred to as relative time delay.

The reflectivity spectrum R(λ) and the group delay Δτ(λ) of the light reflected by a grating, which is characterised by a coupling constant |κ(z)| and local-period change ΔΛ(z), can be calculated by a number of different methods such as coupled-mode theory, transfer-matrix method, or Bloch wave analysis. This procedure is usually called grating analysis process. Practical gratings can be fully characterised using a number of different measurement set-ups and methods.

The opposite process can also be followed. Given a desired reflectivity spectrum R(λ) and group delay Δτ(λ), the corresponding unique grating structure, which is characterised by a coupling constant |κ(z)| and local-period change ΔΛ(z), can be determined. This procedure is usually called grating synthesis or grating design. Gratings can be designed using Fourier-transform-based methods or more advanced integral and differential Inverse Scattering (IS) techniques.

Figure 4:
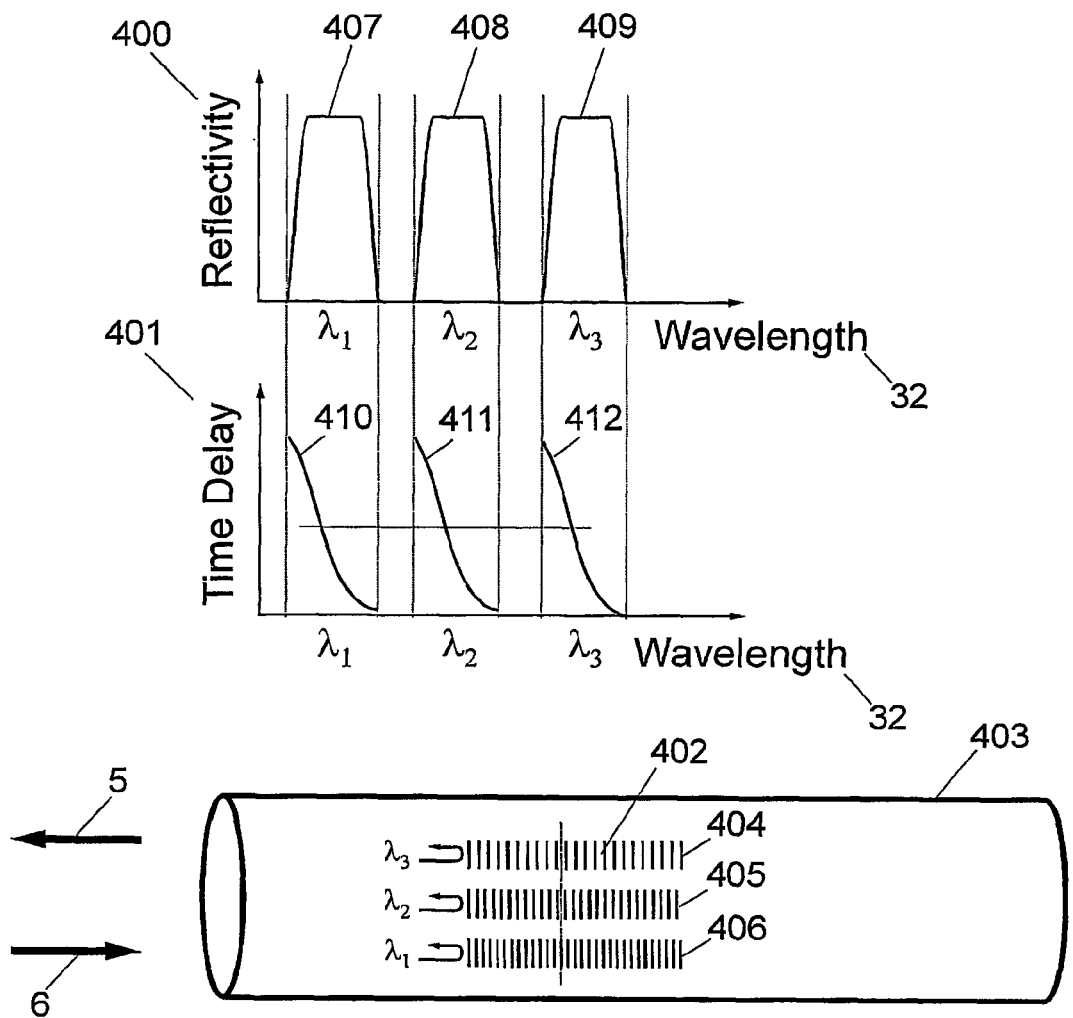
FIG. 4 shows a multiband fibre Bragg grating according to the present invention.

As already mentioned in the introduction, in addition to splicing together different gratings, multiband operation can be achieved by overwriting a number of different gratings or by using sampled and complex superstructured gratings. FIG. 4 shows a schematic of a multiband reflectivity spectrum 400 and group delay 401, respectively, of such a grating 402. It also shows a schematic of the fibre core 403 with the overwritten ("entangled") sub-gratings 404, 405, 406 each one reflecting a different wavelength band 407, 408, 409. In case of a sampled or complex superstructured grating, the sub-gratings 404, 405, 406 correspond to different spatial harmonics (the individual superimposed sub-gratings 404, 405, 406 are displaced vertically to facilitate visualisation). The individual-grating superposition is also manifested by the fact that the corresponding group delay responses 410, 411, 412 show no relative temporal shift. It should be stressed again that such linear coherent superposition is essentially an additive process and results in complex refractive-index-variation patterns and very large required peak refractive index changes, which can potentially limit the number or types of photosensitive fibres that can be used. Also, it can severely limit the maximum achieved reflectivity at each band and have deleterious effects on the group delay characteristic of the grating.

A purpose of this patent application is to define fibre Bragg gratings with multiband reflectivity response with reduced spatial complexity and minimum peak-refractive-index requirements. This is achieved by introducing a relative time-delay difference ($\Delta\tau_{ij}$) between the time responses of the various individual reflection bands. Extra time delay ($\Delta\tau_{ij}$) is effectively associated with extra total propagation length ($\Delta L_{ij}$) given by $\Delta L_{ij}=v_{gr}\Delta\tau_{ij}$, where $v_{gr}$ is the corresponding group velocity. Therefore, if we consider that each reflection band originates effectively from a certain area within the grating, the introduction of such time delay between reflection bands results in a relative spatial displacement of the individual reflection effective areas. In reflection, the equivalent spatial displacement is given by:

$$\Delta L_{ij}=\frac{1}{2}\Delta\tau_{ij}v_{gr} \quad (7)$$

where $v_{gr}=c_0/n_{gr}$ is the group velocity ($n_{gr}$ is the group index). The typical values $c_0=3\times10^8$ m/s and $n_{gr}=1.5$ are assumed in all the following calculations.

FIG. 5 shows the reflectivity 550 and equivalent-time-delay 560 spectra, with the relative time-delay differences ($\Delta\tau_{ij}$) 511, 551 clearly marked, and a schematic of the spatially separated ("disentangled") gratings, corresponding to different reflection bands. The associated spatial separations ($\Delta L_{ij}$) 516, 552 are also clearly shown. If the time delays $\Delta\tau_{ij}$ 511, 551 are chosen appropriately, the spatial overlap between the different reflection effective areas is minimised and the refractive-index modulation is distributed over the entire grating length. This spatial-overlap minimisation results in much smaller peak refractive-index modulation. However, the reflection and dispersion characteristics of each individual peak remain largely unaffected.

DISENTANGLED MULTIBAND GRATING DESIGN EXAMPLES

A number of different disentangled multiband fibre Bragg grating designs corresponding to various reflectivity and equivalent-time-delay spectra are now shown and discussed.

Example 1

Square Dispersionless Filters

Figure 6:
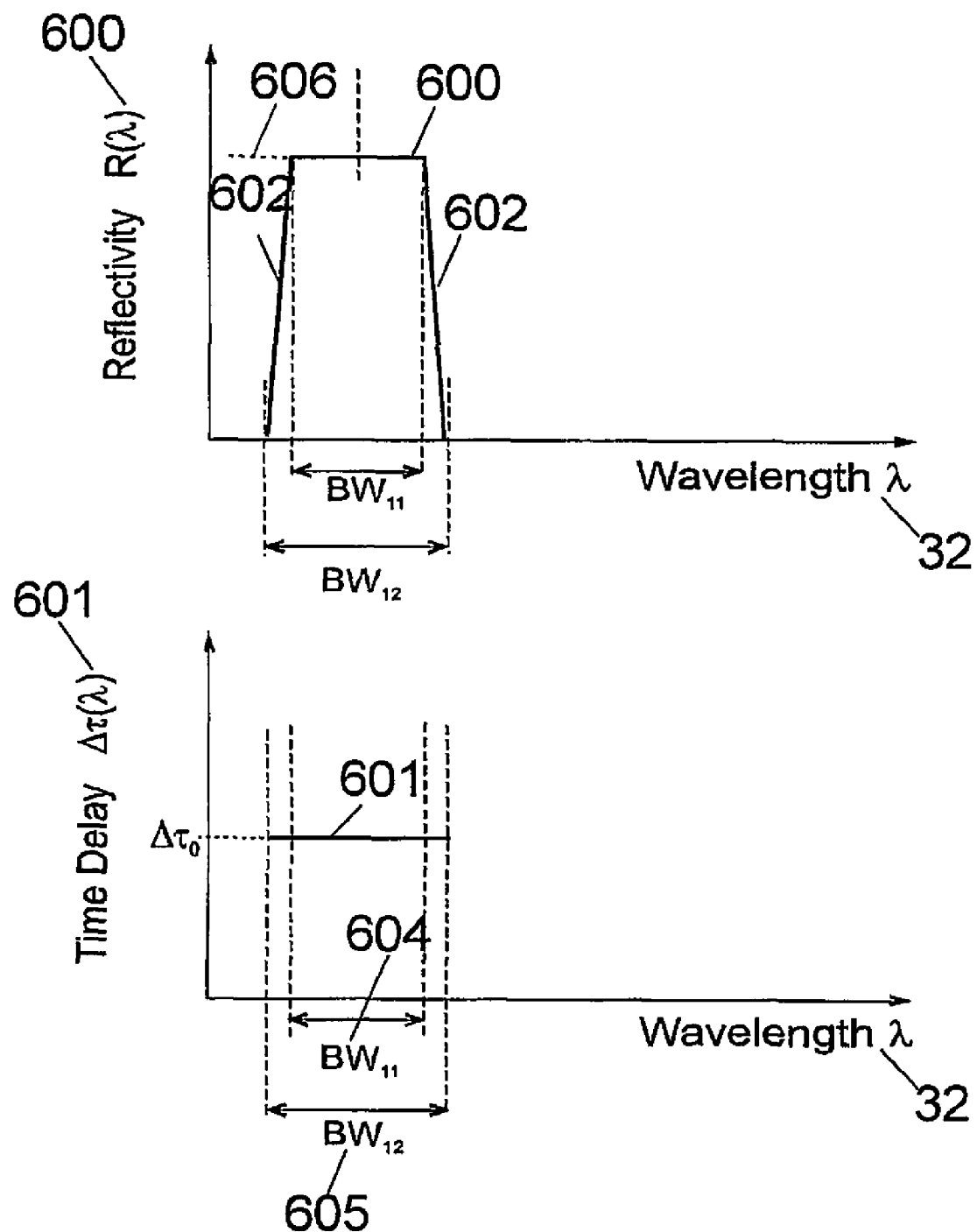
FIG. 6 (not in accordance with the invention) shows the reflectivity of a single band grating.
Figure 7:
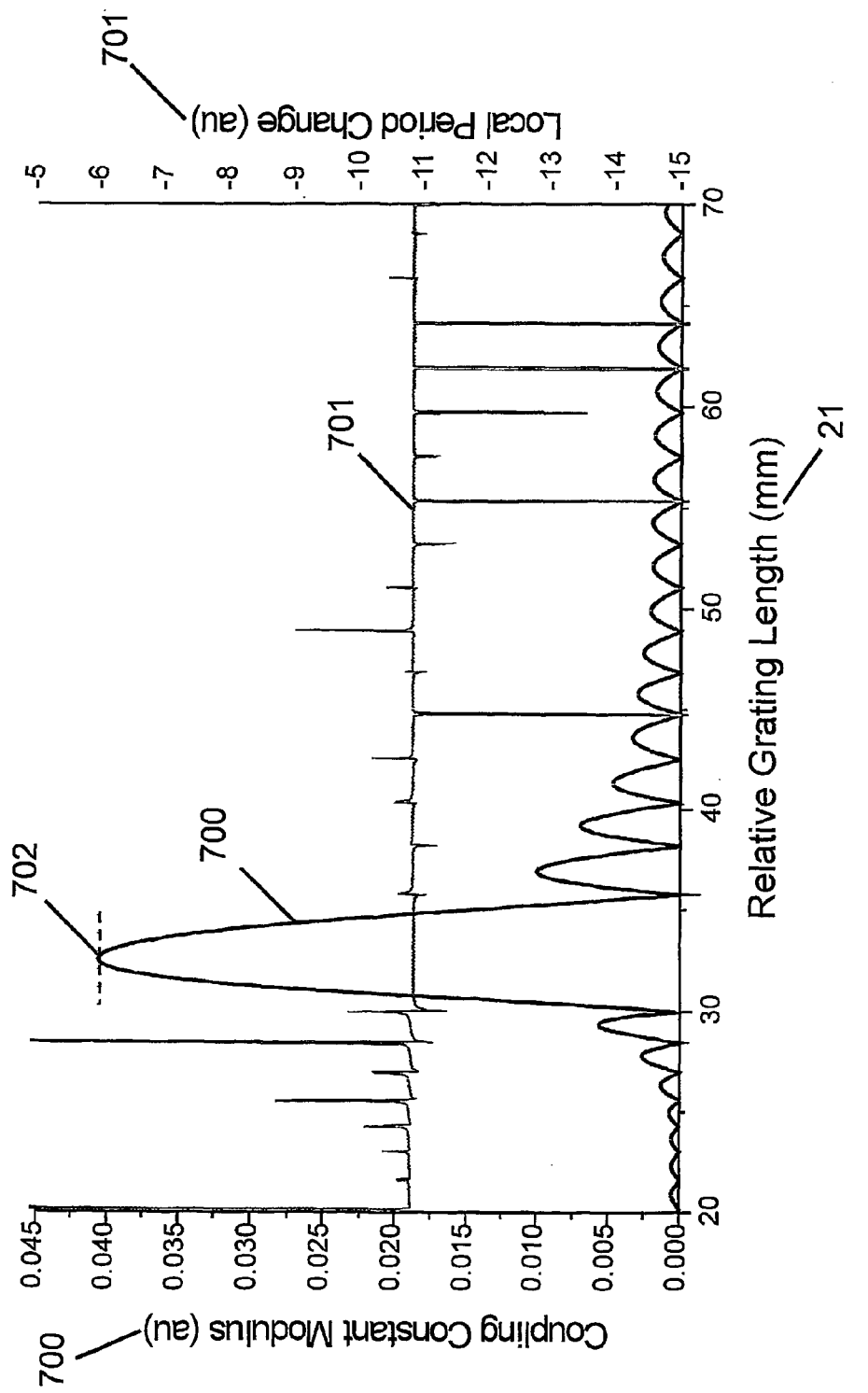
FIG. 7 (not in accordance with the invention) shows the coupling constant of the single band grating of FIG. 6.

We first consider the design of multiband square dispersionless filters. FIG. 6 shows the desired reflectivity spectrum $R(\lambda)$ 600 and the group delay $\Delta\tau(\lambda)$ 601 of a single band grating (not shown). In this example, the reflectivity spectrum 600 has sloping edges 602, and the inner bandwidth $BW_{11}$ 604 is 0.4 nm while the outer bandwidth $BW_{12}$ 605 is 0.6 nm. The peak reflectivity 606 is 99%. The group delay 600 is substantially constant, equal to $\Delta\tau_0=0$ ps, over the outer bandwidth $BW_{12}$. The corresponding coupling constant modulus $|\kappa(z)|$ 700 (thicker line—left axis) and the local-period change $\Delta\Lambda(z)$ 701 (thinner line—right axis) are shown in FIG. 7 plotted in arbitrary units (au). The coupling constant modulus 700 $|\kappa(z)|$ has a peak value 702. It is shown that the local period change is substantially zero over the entire grating length. This implies that the grating period is constant. The observed spikes are numerical artefacts and denote a sudden jump in the grating spatial phase $\square(z)$. All phase jumps, in this case, are equal to $\pi$. Referring to FIG. 6, the peak reflectivity 606 can be between 0.1% and 99.99999%. The group delay 601 can be a linear or nonlinear function of wavelength.

Figure 8:
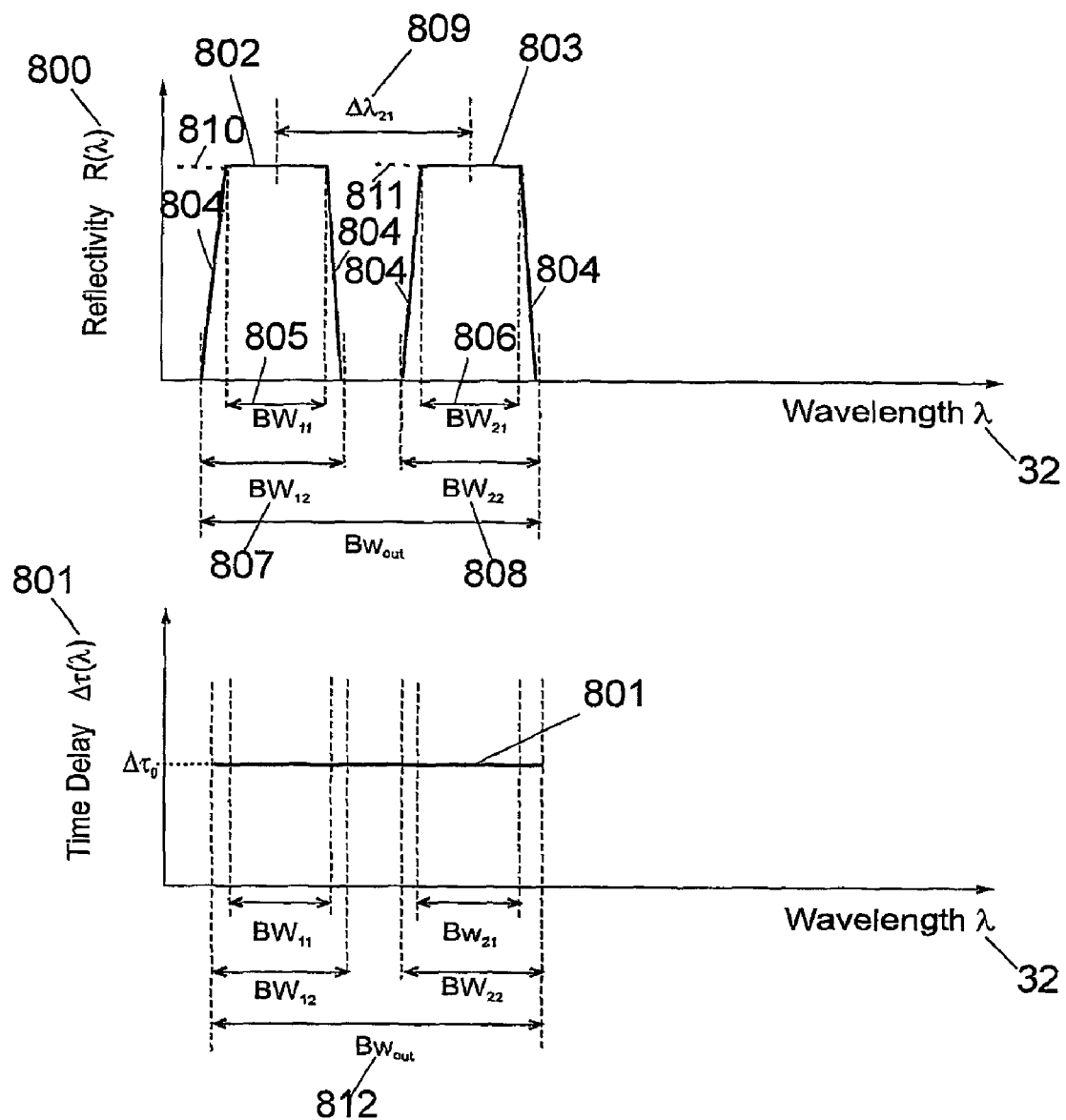
FIG. 8 (not in accordance with the invention) shows the reflectivity of a two-band grating.
Figure 9:
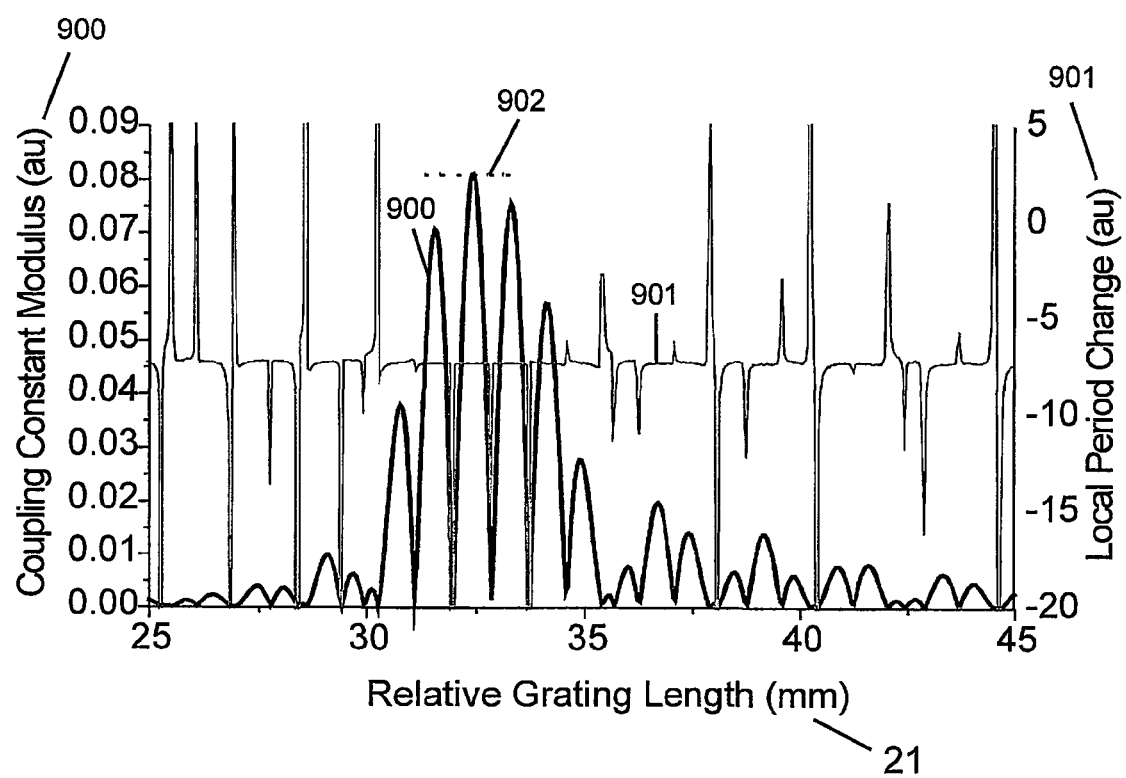
FIG. 9 (not in accordance with the invention) shows the coupling constant of the two-band grating of FIG. 8.

FIG. 8 shows the desired reflectivity spectrum $R(\lambda)$ 800 and the group delay $\Delta\tau(\lambda)$ 801 of a two-band grating (not shown). The reflectivity spectrum of each band 802, 803 has sloping edges 804. The inner bandwidths 805, 806 $BW_{11}=BW_{21}$ are 0.4 nm and outer bandwidths 807, 808 $BW_{12}=BW_{22}$ are 0.6 nm. The inter-band spacing 809 $\Delta\lambda_{21}$ is 1.0 nm. The peak reflectivities 810, 811 are 99%. The group delay 801 is substantially constant, equal to $\Delta\tau 0=0$ ps, over the total outer bandwidth 812 $BW_{out}$. The resulting coupling constant modulus 900 $|\kappa(z)|$ (thicker line—left axis) and the local-period change 901 $\Delta\Lambda(z)$ (thinner line—right axis) are shown in FIG. 9. The coupling constant modulus 900 $|\kappa(z)|$ has a peak value 902 approximately twice the peak value 702 in FIG. 7. It is shown that the local period is substantially unchanged over the entire grating length. This implies that the grating period is constant. The observed spikes are numerical artefacts, due to numerical differentiation, and denote a sudden jump in the grating spatial phase $\square(z)$. All phase jumps, in this case, are equal to $\pi$.

Figure 10:
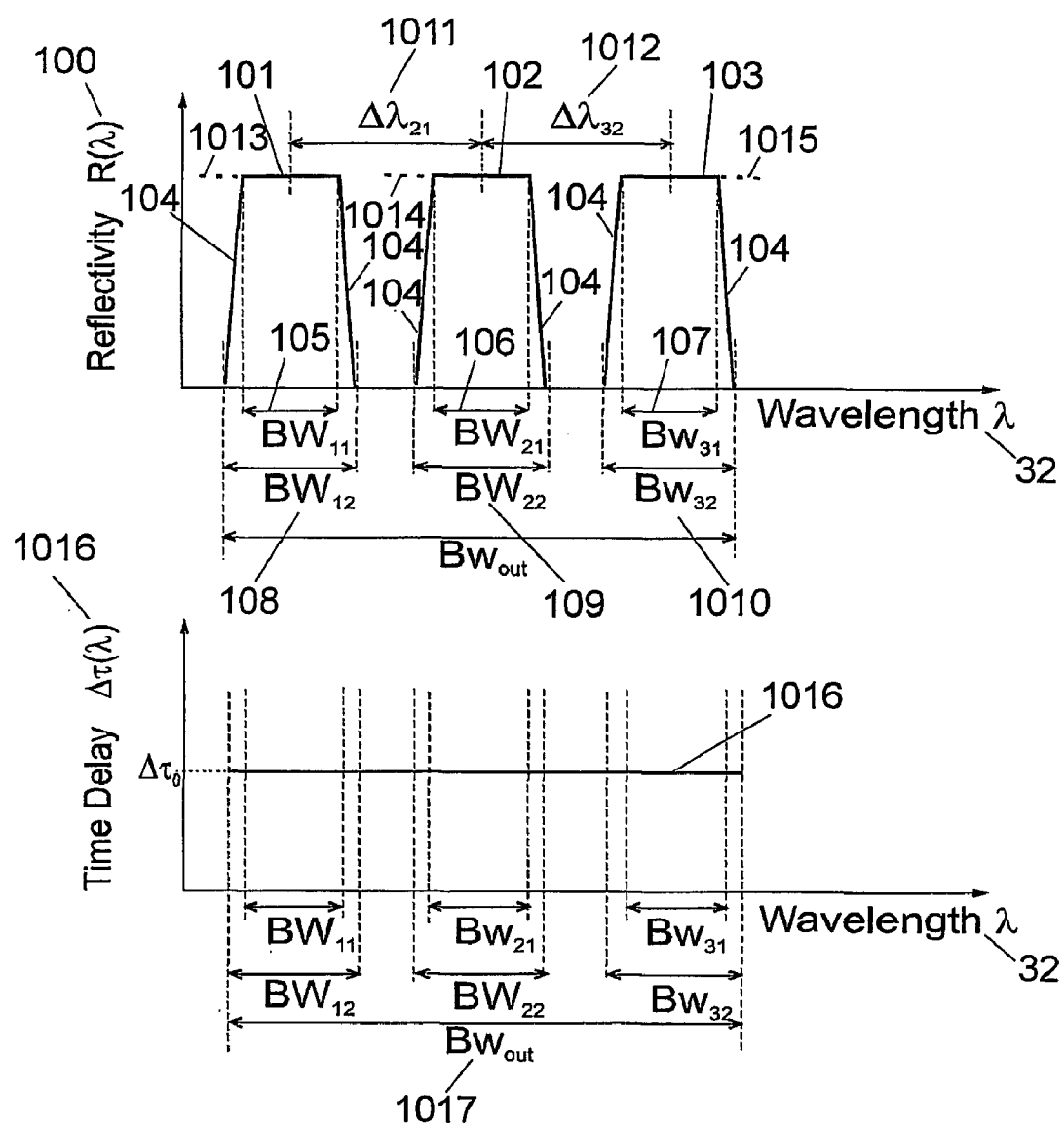
FIG. 10 (not in accordance with the invention) shows the reflectivity of a three-band grating.
Figure 11:
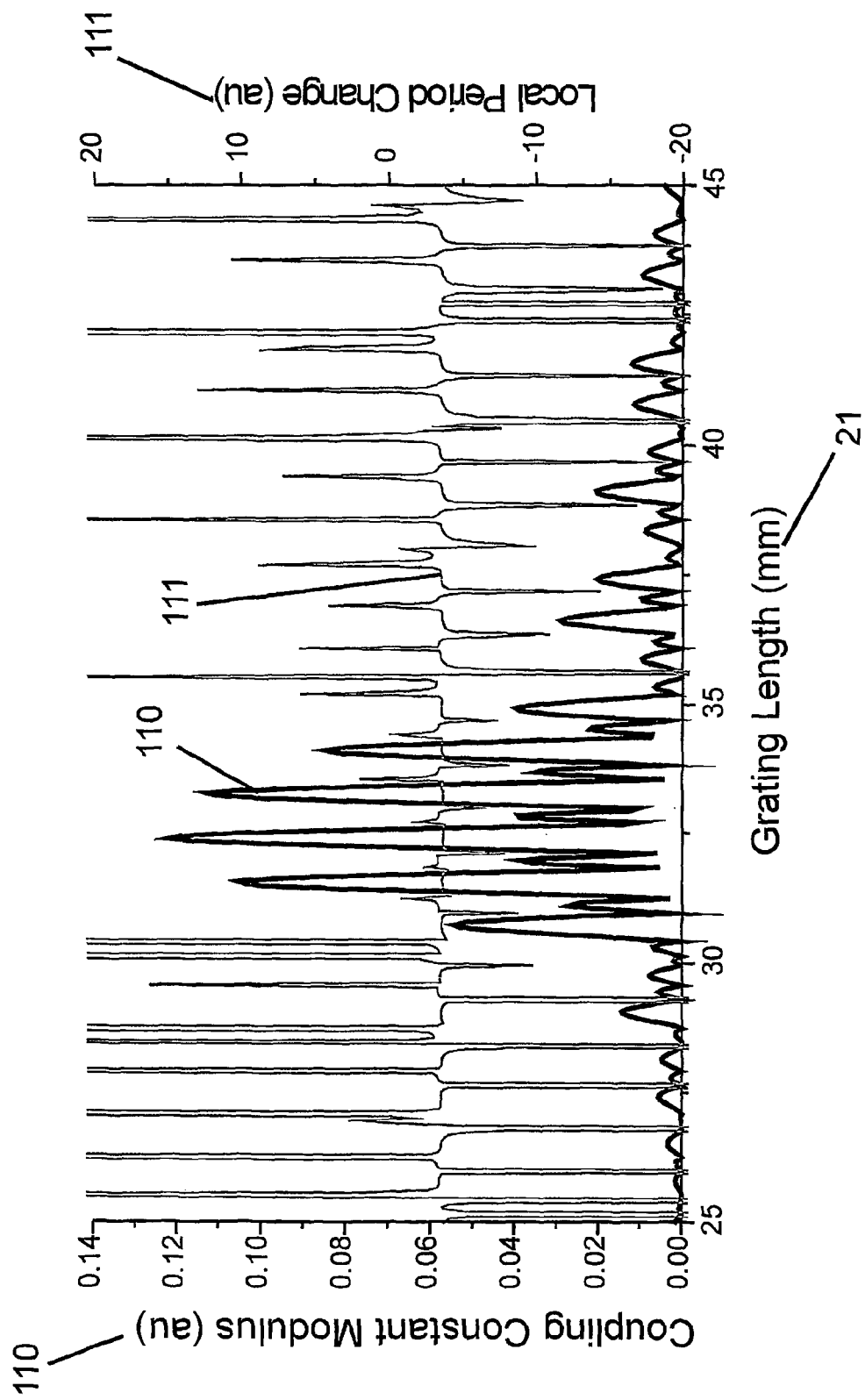
FIG. 11 (not in accordance with the invention) shows the coupling constant of the three-band grating of FIG. 10.

FIG. 10 shows the desired reflectivity spectrum 100 $R(\lambda)$ and the group delay 1016 $\Delta\tau(\lambda)$ of a three-band grating. The reflectivity spectrum 100 of each band 101, 102, 103 has sloping edges 104 with inner bandwidths 105, 106, 107 $BW_{11}=BW_{21}=BW_{31}$ equal to 0.4 nm and outer bandwidths 108, 109, 1010 $BW_{12}=BW_{22}=BW_{32}$ equal to 0.6 nm. The inter-band spacings 1011, 1012 $\Delta\lambda_{21}=\Delta\lambda_{32}$ are 1 nm. The peak reflectivities 1013, 1014, 1015 are 99%. The group delay 1016 is substantially constant, equal to $\Delta\tau 0=0$ ps, over the total outer bandwidth 1017 $BW_{out}$. The resulting coupling constant modulus 110 $|\kappa(z)|$ (thicker line—left axis) and the local-period change 111 $\Delta\Lambda(z)$ (thinner line—right axis) are shown in FIG. 11. It is shown again that the local period is substantially unchanged over the entire grating length. This implies that the grating period is constant. The observed spikes are numerical artefacts, due to numerical differentiation, and denote a sudden jump in the grating spatial phase $\phi(z)$. All phase jumps, in this case, are equal to $\pi$.

Figure 12:
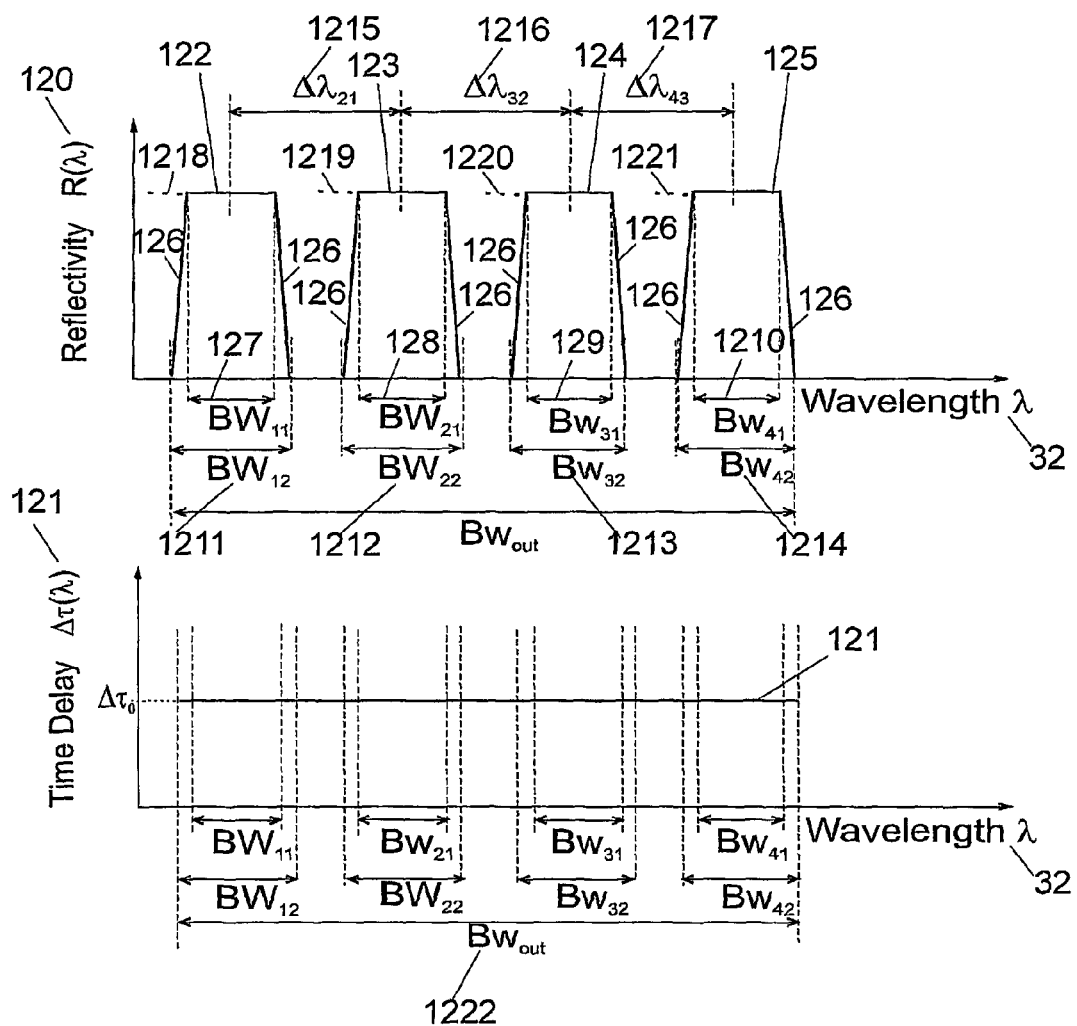
FIG. 12 (not in accordance with the invention) shows the reflectivity of a four-band grating.
Figure 13:
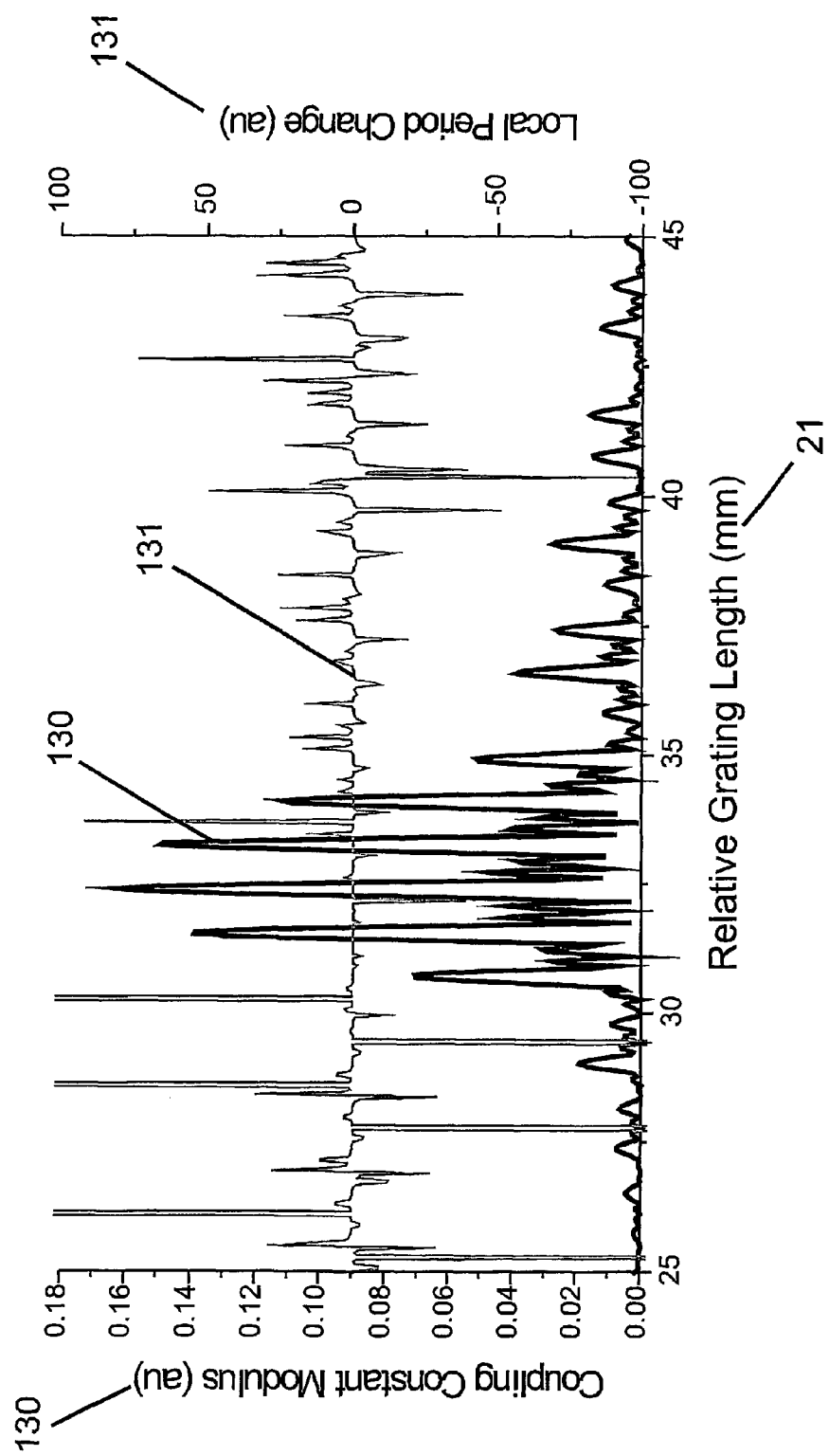
FIG. 13 (not in accordance with the invention) shows the coupling constant of the four-band grating of FIG. 12.

FIG. 12 shows the desired reflectivity spectrum 120 $R(\lambda)$ and the group delay 121 $\Delta\tau(\lambda)$ of a four-band grating. The reflectivity spectrum 120 of each band 122, 123, 124, 125 has sloping edges 126 with inner bandwidths 127, 128, 129, 1210 $BW_{11}=BW_{21}=BW_{31}=BW_{41}$ equal to 0.4 nm and an outer bandwidths 1211, 1212, 1213, 1214 $BW_{12}=BW_{22}=BW_{32}=BW_{42}$ equal to 0.6 nm. The inter-band spacings 1215, 1216, 1217 $\Delta\lambda_{21}=\Delta\lambda_{32}=\Delta\lambda_{42}$ are 1 nm. The peak reflectivities 1218, 1219, 1220, 1221 are 99%. The group delay 121 is substantially constant, equal to $\Delta\tau 0=0$ ps, over the total outer bandwidth 1222 BWout. The resulting coupling constant modulus 130 $|\kappa(z)|$ (thicker line—left axis) and the local-period change 131 $\Delta\Lambda(z)$ (thinner line—right axis) are shown in FIG. 13. It is shown that the local period is substantially unchanged over the entire grating length. This implies that the grating period is constant. The observed spikes are numerical artefacts, due to numerical differentiation, and denote a sudden jump in the grating spatial phase $\phi(z)$. All phase jumps, in this case, are equal to $\pi$.

Figure 14:
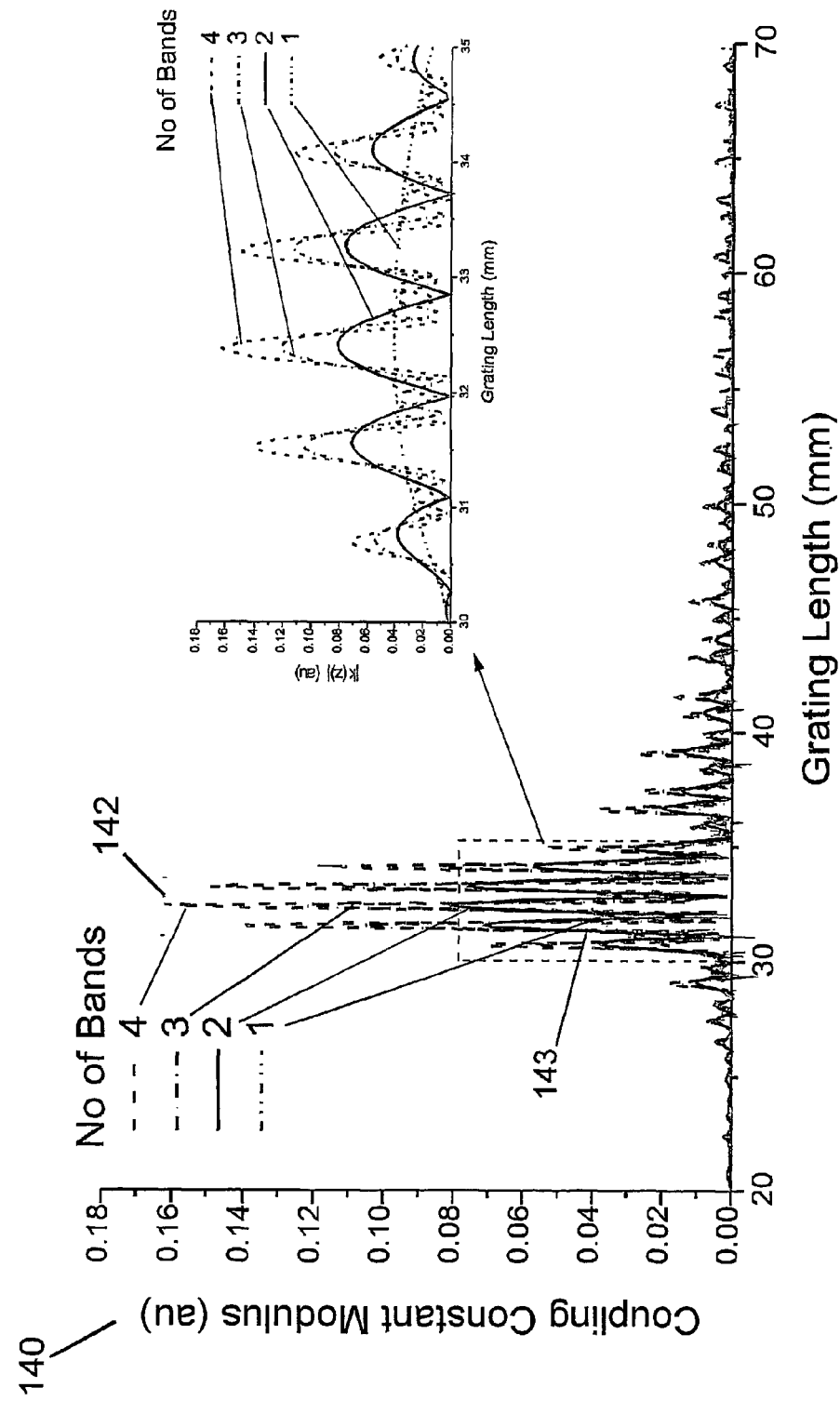
FIG. 14 (not in accordance with the invention) summarises the coupling constant data shown in FIGS. 7, 9, 11 and 13.
Figure 15:
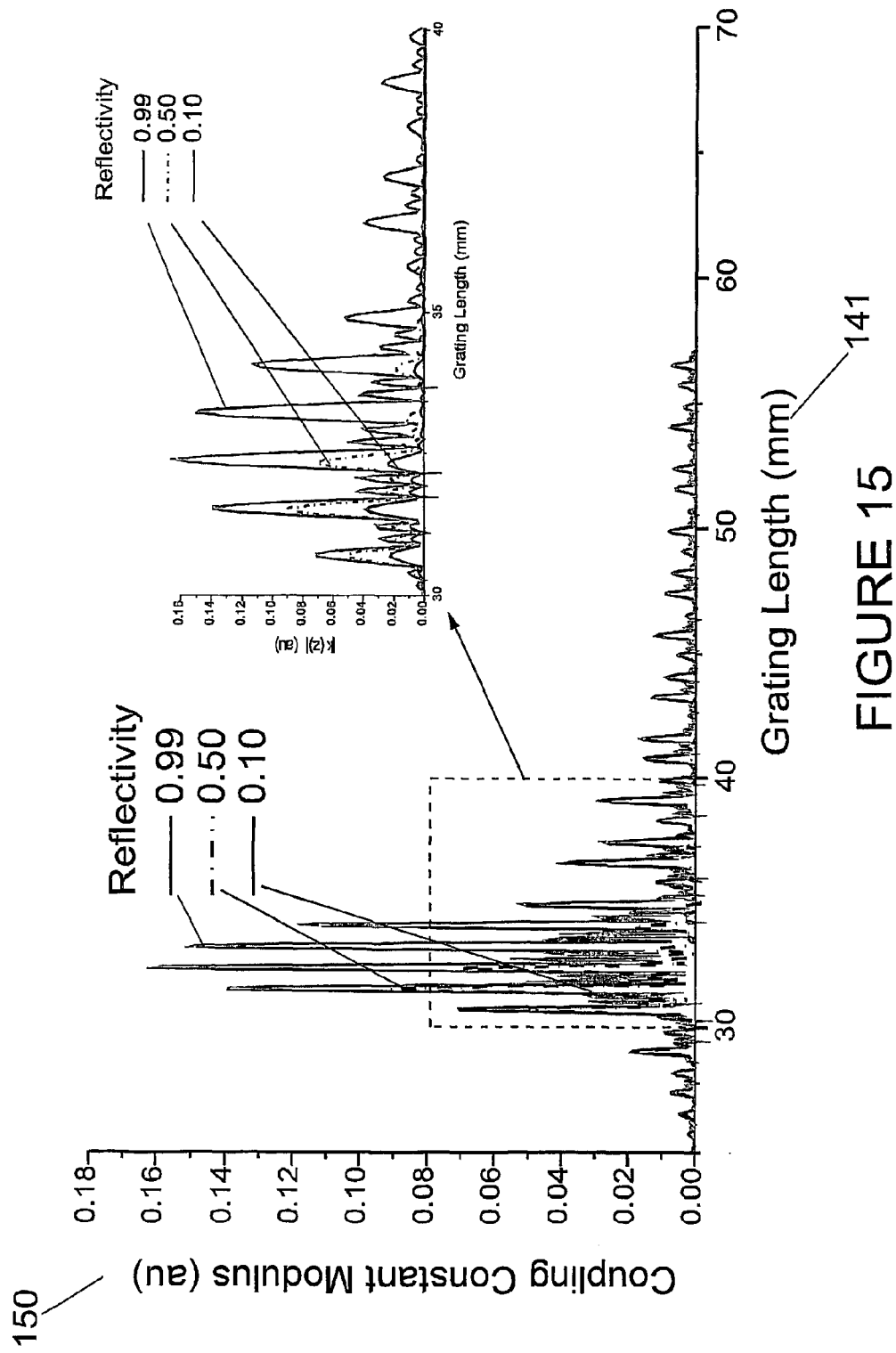
FIG. 15 (not in accordance with the invention) shows the coupling constant of four band gratings having different reflectivities.

From FIGS. 7, 9, 11 and 13 it is observed that adding spectral peaks in the required reflection spectrum and demanding the group delay to be constant across the entire outer bandwidth results in a progressively more complex coupling constant profile with large peak values. These complex-grating structures can be viewed as resulting from a linear, coherent superposition of the individual gratings that correspond to each different band BWi2, i=1,2,3,4. Such linear coherent superposition is essentially an additive process and results in complex coupling constant profiles with large coupling-constant peak values, which require large peak refractive-index changes and can potentially put severe limitations on the type of the photosensitive fibre. FIG. 14 summarises the coupling constant modulus 140 $|\kappa(z)|$ as a function of grating length 141 for the four designs shown in FIGS. 7, 9, 11 and 13 for direct comparison. It is shown that the peak 142 $|\kappa(z)|$ of the four-band device is about four times the peak 143 $|\kappa(z)|$ of the single-band device. In general, the peak $|\kappa(z)|$ of the N-band device will be about N times the peak $|\kappa(z)|$ of the single-band device. The peak coupling constant modulus 142 $|\kappa(z)|$ varies with the desired peak reflectivity 1218 (shown in FIG. 12). FIG. 15 shows the required coupling constant modulus 150 $|\kappa(z)|$ of a four-band reflector as a function of grating length 141 for peak reflectivities 1218 of 0.99, 0.50 and 0.10. The rest of the parameters are similar to the ones in FIG. 12. It is shown that as the peak reflectivity 1218 decreases, both the required peak coupling constant modulus 142 $|\kappa(z)|$ and the effective grating length 141 decrease accordingly.

The "individual-grating superposition" has been forced by the fact that all the individual reflection bands 122, 123, 124, 125 (shown in FIG. 12) are characterised by the same group delay 121. It is now shown that introducing relative time-delay shifts between individual reflection bands, disentangles the various "individual gratings" and results in a less complicated coupling constant function requiring much smaller peak refractive-index changes.

Figure 16:
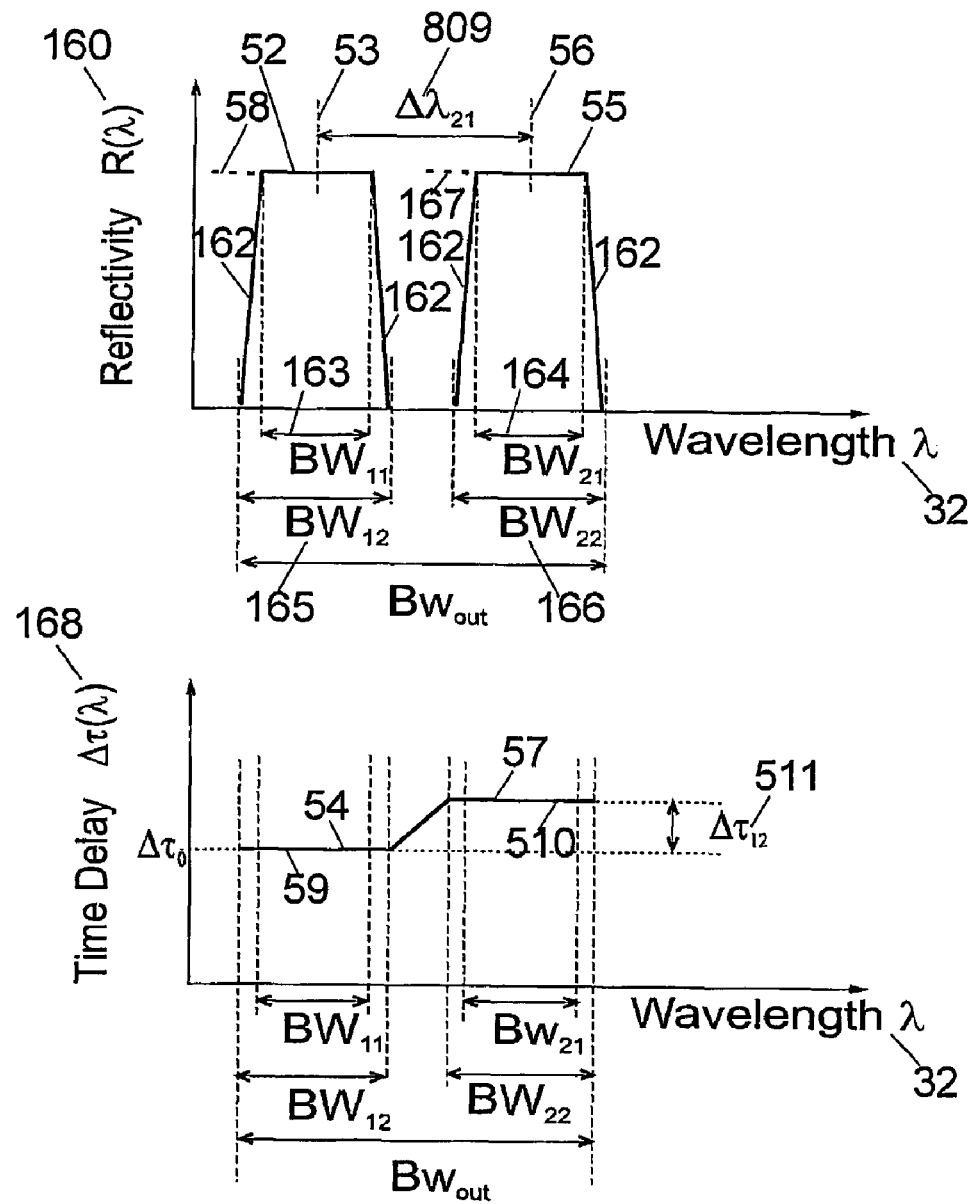
FIG. 16 shows the reflectivity of a two-band grating according to the present invention.

FIG. 16 shows the desired reflectivity spectrum 160 $R(\lambda)$ and the group delay 168 $\Delta\tau(\lambda)$ of a two-band grating. The reflectivity spectrum of each band 52, 55 has sloping edges 162 with inner bandwidths 163, 164 $BW_{11}=BW_{21}$ of 0.4 nm and outer bandwidths 165, 166 $BW_{12}=BW_{22}$ of 0.6 nm. The inter-band spacing 809 $\Delta\lambda_{21}$ is 1 nm. The peak reflectivities 58, 167 are 99%. The group delay 168 is substantially constant across each individual outer bandwidth 165, 166 $BW_{12}$ and $BW_{22}$ and shows a time delay difference 511 $\Delta\tau_{12}$ equal to the modulus of the difference between the average first time delay 59 and the average second time delay 510.

Figure 17:
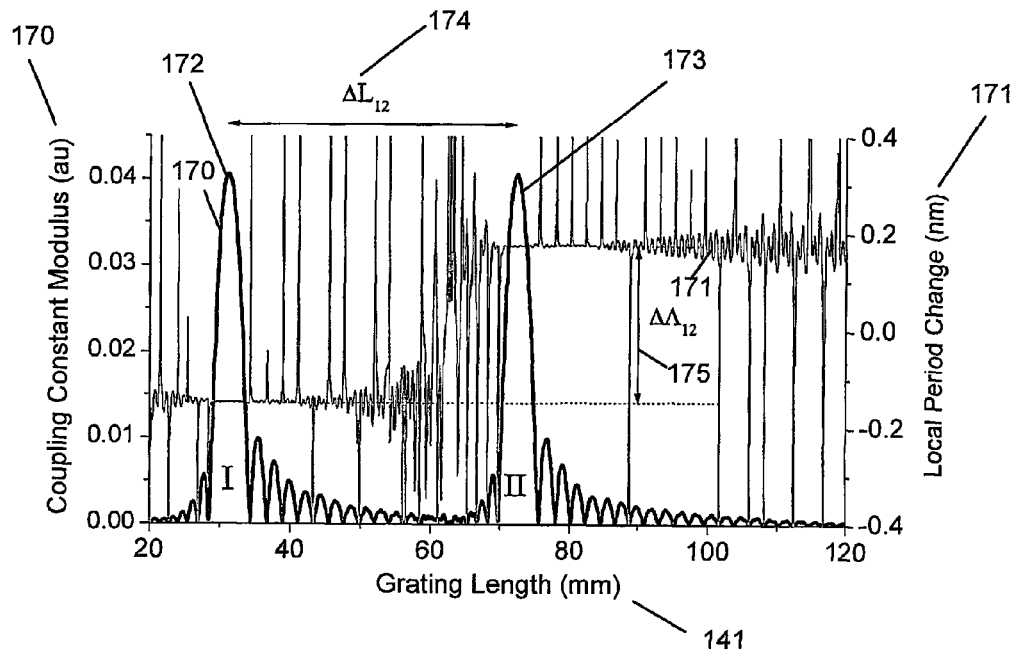
FIGS. 17 to 20 show the coupling constant of the two band gratings of FIG. 16.
Figure 18:
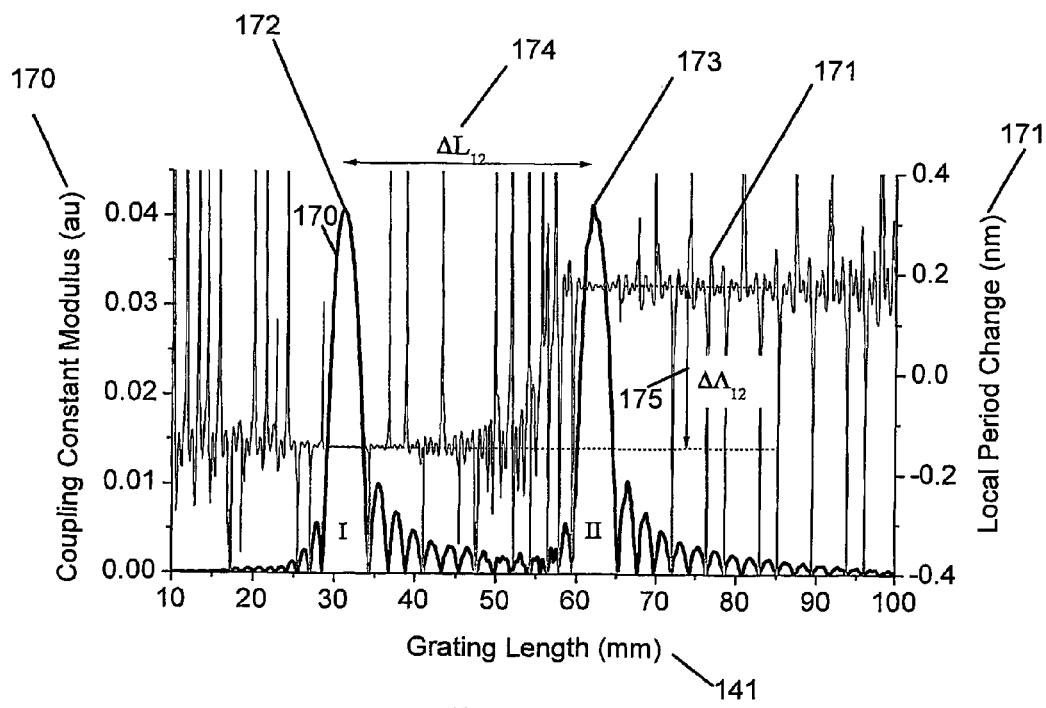

FIGS. 17 and 18 show the coupling constant modulus 170 $|\kappa(z)|$ (thicker line—left axis) and the local-period change 171 $\Delta\Lambda(z)$ (thinner line—right axis), corresponding to FIG. 16 where the time delay difference 511 $\Delta\tau_{12}$=400 ps and $\Delta\tau_{12}$=300 ps, respectively. It is first observed that the coupling constant modulus 170 $|\kappa(z)|$ in this case is fundamentally different from the corresponding one shown in FIG. 9. In the present case, two clear peaks 172, 173 can be identified corresponding to the first and second wavelength reflection bands 52, 55 of FIG. 16, respectively. Each $|\kappa(z)|$ peak 172, 173 is essentially identical with the $|\kappa(z)|$ distribution that corresponds to a single-band device (c.f., FIG. 7). The relative spatial separation 174 $\Delta L_{12}$ between the two $|\kappa(z)|$ peaks 172, 173 is related to the value of the introduced time-delay difference 511 $\Delta\tau_{12}$ (of FIG. 16) by Equation 7. The introduced time-delay difference 511 $\Delta\tau_{12}$ can be used to control the relative spatial separation $\Delta L_{12}$ 174 and effectively disentangle various wavelength reflection bands. For the time delay differences 511 $\Delta\tau_{12}$=400 ps and 300 ps, the relative spatial separation 174 $\Delta L_{12}$ is about 40 mm and 30 mm, respectively. These values are in very good agreement with the relative spatial separation 174 $\Delta L_{12}$ shown in FIGS. 17 and 18, respectively.

The local period change 171 $\Delta\Lambda(z)$ (thinner line—right axis), on the other hand, is substantially piecewise constant with a step 175 $\Delta\Lambda_{12}$, which is related to the interband spacing 809 $\Delta\lambda_{21}$ (of FIG. 16) by:

$$\Delta\Lambda_{12} = \frac{\Delta\lambda_{21}}{2n_0} \quad (8)$$

In both FIGS. 17 and 18, the local period step 175 $\Delta\Lambda_{12}$ is about 0.35 nm and that corresponds to an interband spacing 174 $\Delta\lambda_{21}$ of 1 nm. The typical value $n_0$=1.45 was used in the calculations. The grating period over the regions I and II are substantially equal to $\Lambda_I=\Lambda_0-|\Delta\Lambda_{12}|/2$ and $\Lambda_{II}=\Lambda_0+|\Delta\Lambda_{12}|/2$, respectively. This confirms the fact that the disentangled regions I and II of the grating contribute predominantly to the spectral bands I and II (in FIG. 16), with central wavelengths $\lambda_{I(II)}=2n_0\Lambda_{I(II)}$. Again, the observed spikes in the local period variation are numerical artefacts, due to numerical differentiation, and denote a sudden jump in the grating spatial phase $\phi(z)$. All phase jumps, in this case, are substantially equal to $\pi$.

Referring to FIG. 16, the peak reflectivities 58, 167 can be dissimilar, and can each vary independently between 0.1% and 99.99999%. The group delay 168 can be a linear or non-linear function of wavelength.

Comparing the grating designs shown in FIGS. 17 and 18 with the corresponding design shown in FIG. 9, it is deduced that introducing a differential time delay discontinuity between reflection spectral bands results in spatial disetanglement of the coupling function profile and reduces significantly the required peak coupling-constant value. The peak $|\kappa(z)|$ value 172, 173 in FIGS. 17 and 18 remains substantially equal to the peak $|\kappa(z)|$ 702 of the single-band device shown in FIG. 7 and, therefore, it is substantially half the peak value 902 of the two-band device of FIG. 9.

However, as a direct consequence of the spatial disentanglement, the reduction in peak $|\kappa(z)|$ value is achieved at the expense of a longer grating length 141. The coupling constant distribution is spread out over the grating length avoiding large peak values and fast spatial variations.

Figure 19:
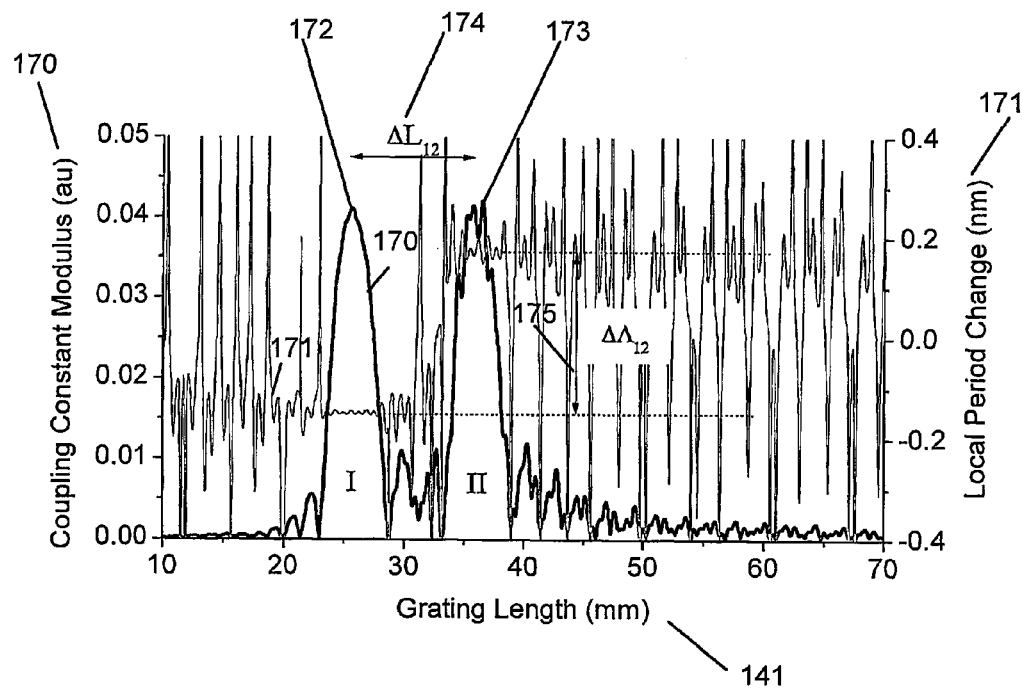

FIG. 19 shows the coupling constant modulus 170 $|\kappa(z)|$ (thicker line—left axis) and the local-period change 171 $\Delta\Lambda(z)$ (thinner line—right axis) for the two-band grating shown in FIG. 16 but with a smaller interband time-delay discontinuity 511 $\Delta\tau_{12}$=100 ps. In this case, the relative spatial separation 174 $\Delta L_{12}$ is about 10 mm. It is shown that decreasing the design time-delay discontinuity 511 $\Delta\tau_{12}$ between the two reflection bands 52, 55 results in relatively shorter effective grating lengths. However, in this case, due to the smaller relative spatial separation 174, the two peaks 172, 173 interfere to a larger extent, resulting in much faster $|\kappa(z)|$ changes and larger local period variations over peak II.

Figure 20:
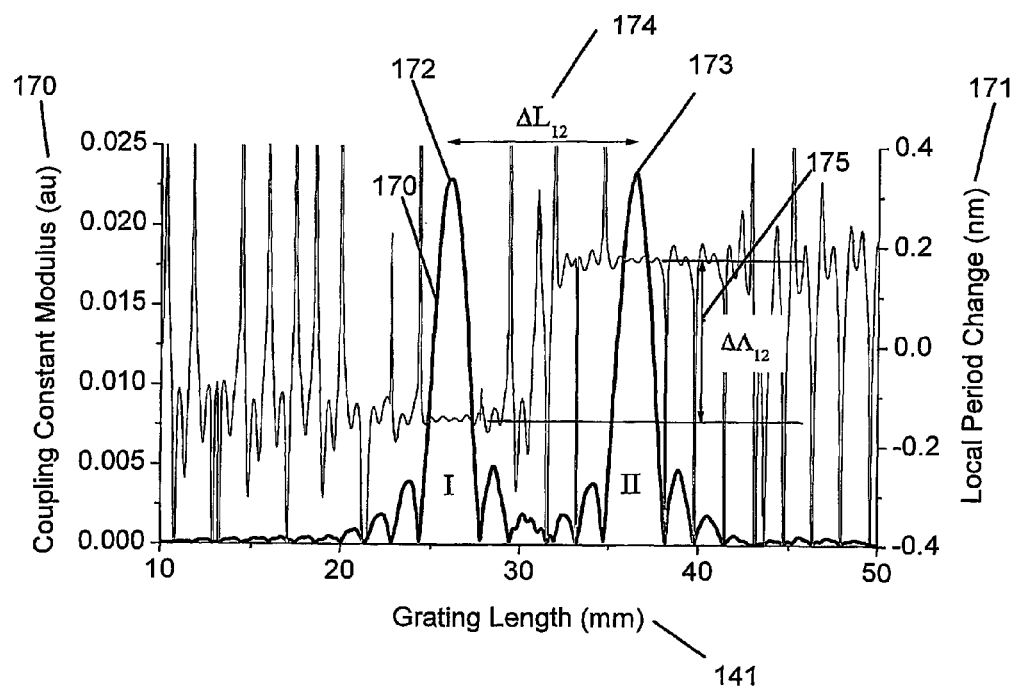

The relative amount of interference reduces significantly as the target peak reflectivity 58, 167 reduces. FIG. 20 shows the coupling constant modulus 170 $|\kappa(z)|$ (thicker line—left axis) and the local-period change 171 $\Delta\Lambda(z)$ (thinner line—right axis) for a two-band grating with spectral characteristics similar to the ones shown in FIG. 19 but with a smaller peak reflectivity 58, 167 of 50% (see FIG. 16). From FIGS. 17–20, it is deduced that the minimum time-delay discontinuity 511 $\Delta\tau_{12}$, required to disentangle the reflectivity bands 172, 173 depends on the target peak reflectivity 58, 167. It can also be shown that the required minimum time-delay discontinuity 511 $\Delta\tau_{12}$ also depends on the reflection-band "squareness" (defined as the ratio $BW_{i1}/BW_{i2}$, i=1,2) and the reflection band outer bandwidth ($BW_{i2}$, i=1,2).

Figure 21:
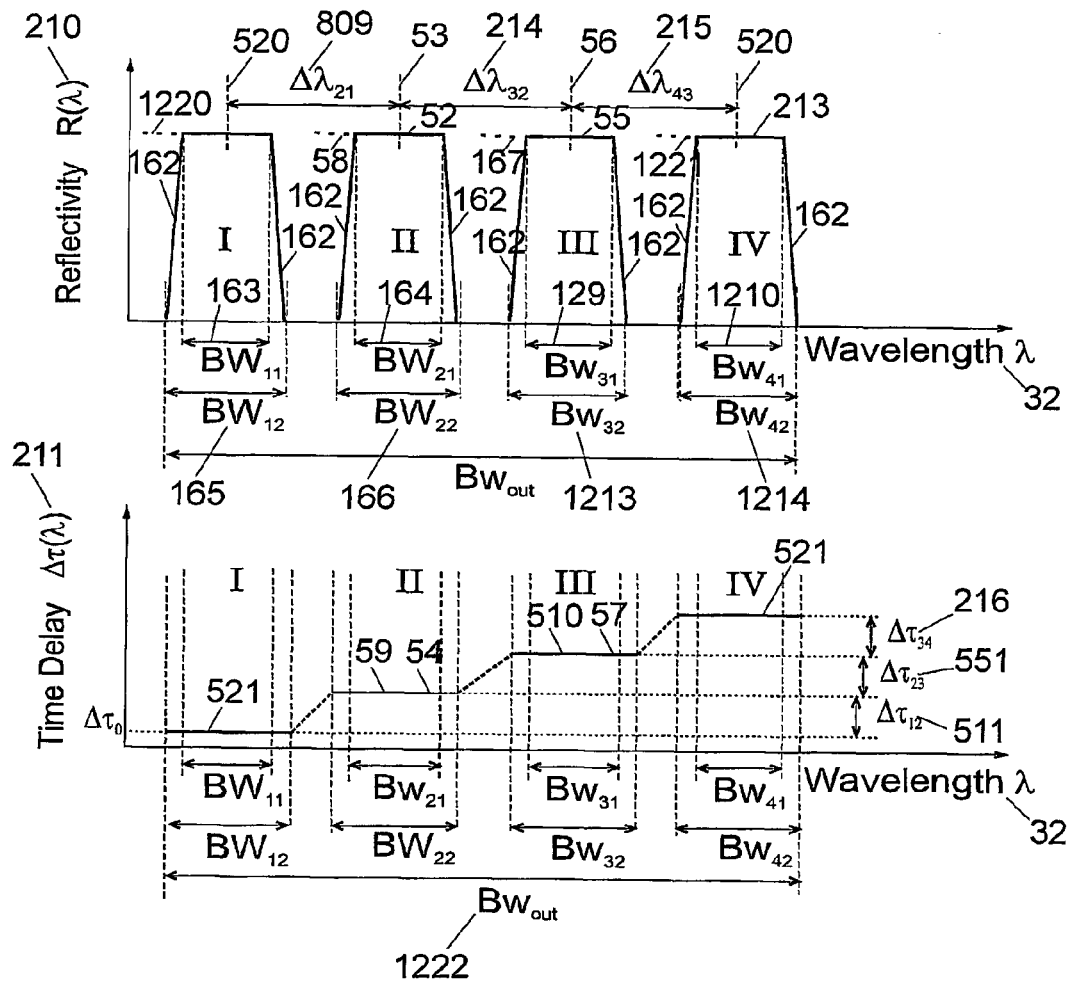
FIG. 21 shows the reflectivity of a four-band grating according to the present invention.

FIG. 21 shows the desired reflectivity spectrum 210 $R(\lambda)$ and the group delay 211 $\Delta\tau(\lambda)$ spectrum of a four-band dispersionless grating. The reflectivity spectrum of each band 52, 55, 212, 213 has sloping edges 162 with inner bandwidths 163, 164, 129, 1210 $BW_{11}=BW_{21}=BW_{31}=BW_{41}$ of 0.3 nm and outer bandwidths 165, 166, 1213, 1214 $BW_{12}=BW_{22}=BW_{32}=BW_{42}$ of 0.5 nm. In this case, the inter-band spacings 809, 214, 215 $\Delta\lambda_{21}=\Delta\lambda_{32}=\Delta\lambda_{43}$ are 0.8 nm and the peak reflectivities 58, 167, 1220, 1221 are all equal to 90%. The group delay 211 $\Delta\tau(\lambda)$ is substantially constant across each individual outer bandwidth 165, 166, 1213, 1214 $BW_{i2}$ (i=1–4) and shows time delay discontinuities 511, 551, 216 $\Delta\tau_{12}$, $\Delta\tau_{32}$ and $\Delta\tau_{43}$ between the bands 52, 55, 212, 213.

Figure 22:
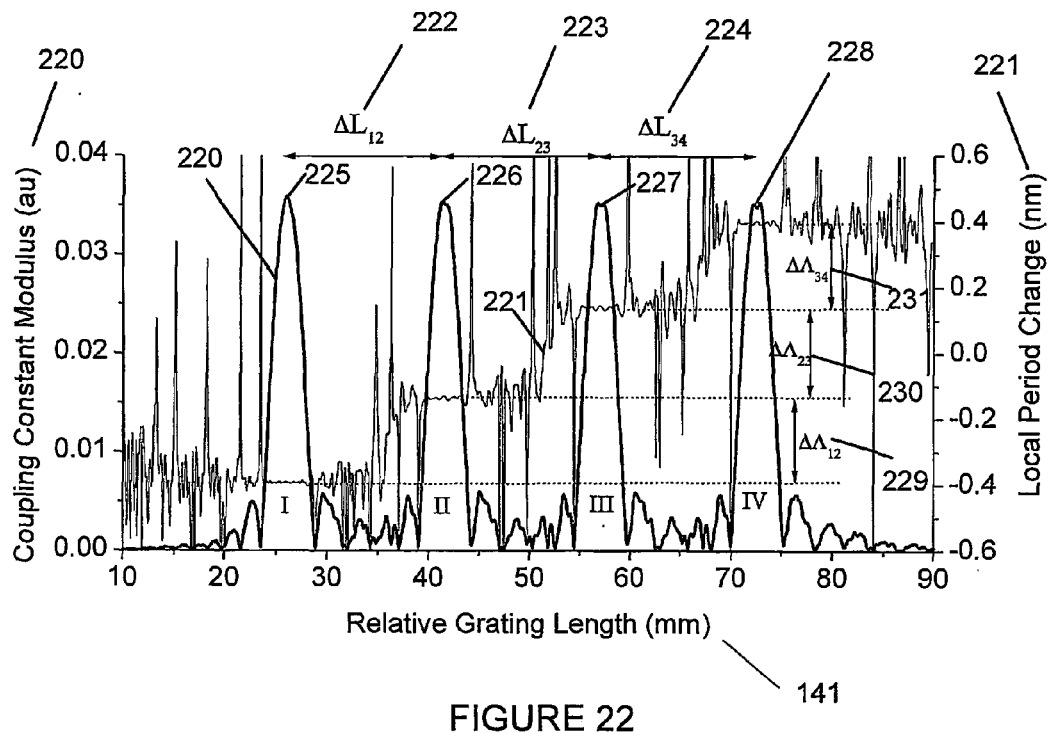
FIGS. 22 and 23 show the coupling constant of the four-band grating of FIG. 21.
Figure 23:
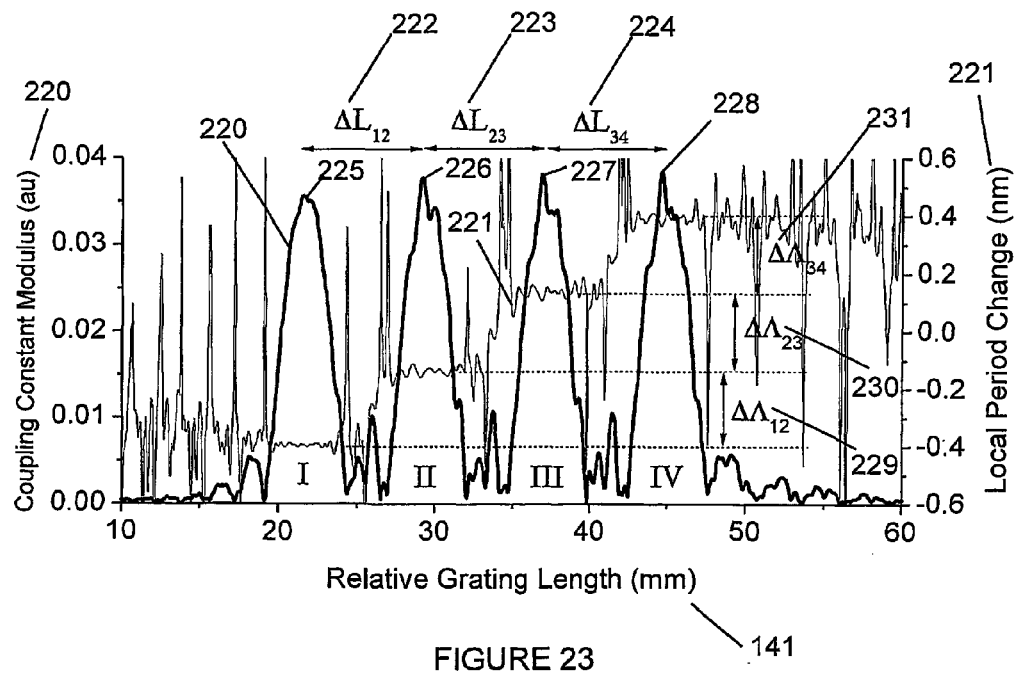

FIGS. 22 and 23 show the resulting coupling constant modulus 220 $|\kappa(z)|$ (thicker line—left axis) and the local-period change 221 $\Delta\Lambda(z)$ (thinner line—right axis), corresponding to the time-delay discontinuities 511, 551, 216 $\Delta\tau_{12}=\Delta\tau_{23}=\Delta\tau_{34}$ equal to 150 ps and 75 ps, respectively (as defined in FIG. 21). The relative spatial separations 222, 223, 224 $\Delta L_{12}=\Delta L_{23}=\Delta L_{34}$ between the peak coupling constant modulus 225, 226, 227, 228 are about 15 mm and 7.5 mm, respectively. The local period change 221 $\Delta\Lambda(z)$, on the other hand, is substantially piecewise constant over each disentangled peak 225, 226, 227, 228, with local period steps 229, 230, 231 proportional to the interband spacing 809, 214, 215 $\Delta\lambda_{21}$, $\Delta\lambda_{32}$ and $\Delta\lambda_{43}$, respectively. The local period steps 229, 230, 231 $\Delta\Lambda_{12}$, $\Delta\Lambda_{23}$ and $\Delta\Lambda_{34}$ are all approximately equal to about 0.28 nm, which corresponds to an interband spacing 809 $\Delta\lambda_{21}$ of about 0.8 nm. Again, the observed spikes are numerical artefacts, due to numerical differentiation, and denote a sudden jump in the grating spatial phase $\phi(z)$. All phase jumps, in this case, are substantially equal to $\pi$. As before, smaller time delay discontinuities 511, 551, 216 $\Delta\tau_{12}$, $\Delta\tau_{32}$ and $\Delta\tau_{43}$ result in smaller relative spatial separations 222, 223, 224 and stronger overlap between the partially disentangled wavelength peaks 225, 226, 227, 228. The peak reflectivities 58, 167, 1220, 1221 can also be dissimilar, varying between 0.1% and 99.99999%. The group delay 211 can also be a linear or non-linear function of wavelength.

Figure 24:
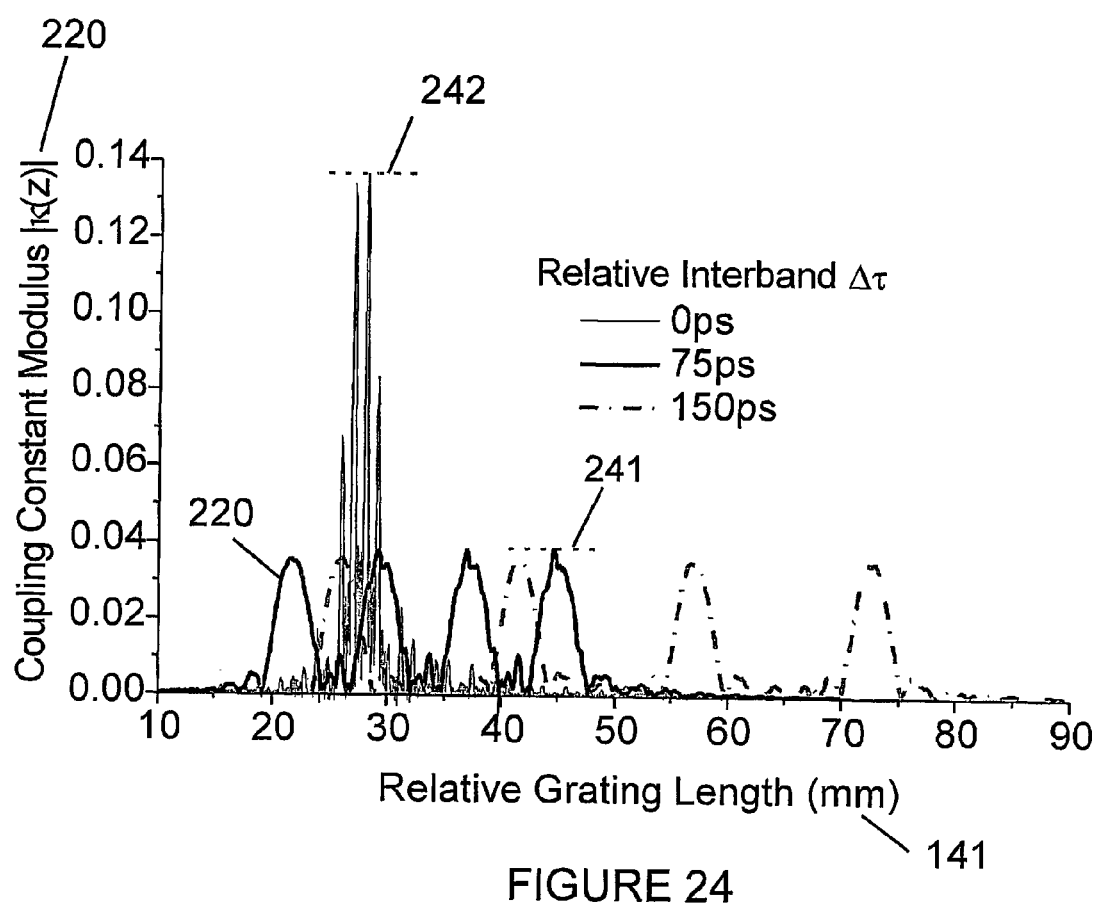
FIG. 24 compares the coupling constant of four band gratings according to the present invention with an entangled grating.

FIG. 24 summarises the coupling constant moduli |κ(z)|, corresponding to the disentangled grating designs shown in FIGS. 22 and 23, and compares them with an "entangled" grating design with the same four-band reflectivity spectrum 210 but with zero interband time delays 511, 551, 216 ($\Delta\tau_{12}=\Delta\tau_{23}=\Delta\tau_{34}=0$ ps) as defined in FIG. 21. It is shown that the disentangled grating designs result in much smoother coupling constant 220 |κ(z)| variations and require much lower peak |κ(z)| values of the coupling constant 220. The peak coupling constant 241 |κ(z)| for the disentangled designs is about one fourth of the corresponding value of the peak coupling constant 242 of the "entangled" (super-imposed) design.

So far, all the shown examples are fully disentangled and as a result each reflection band can be easily associated with a distinct feature in the coupling constant profile. A similar design approach can also be followed for partially disentangled multiband devices, or devices disentangled by groups.

Figure 25:
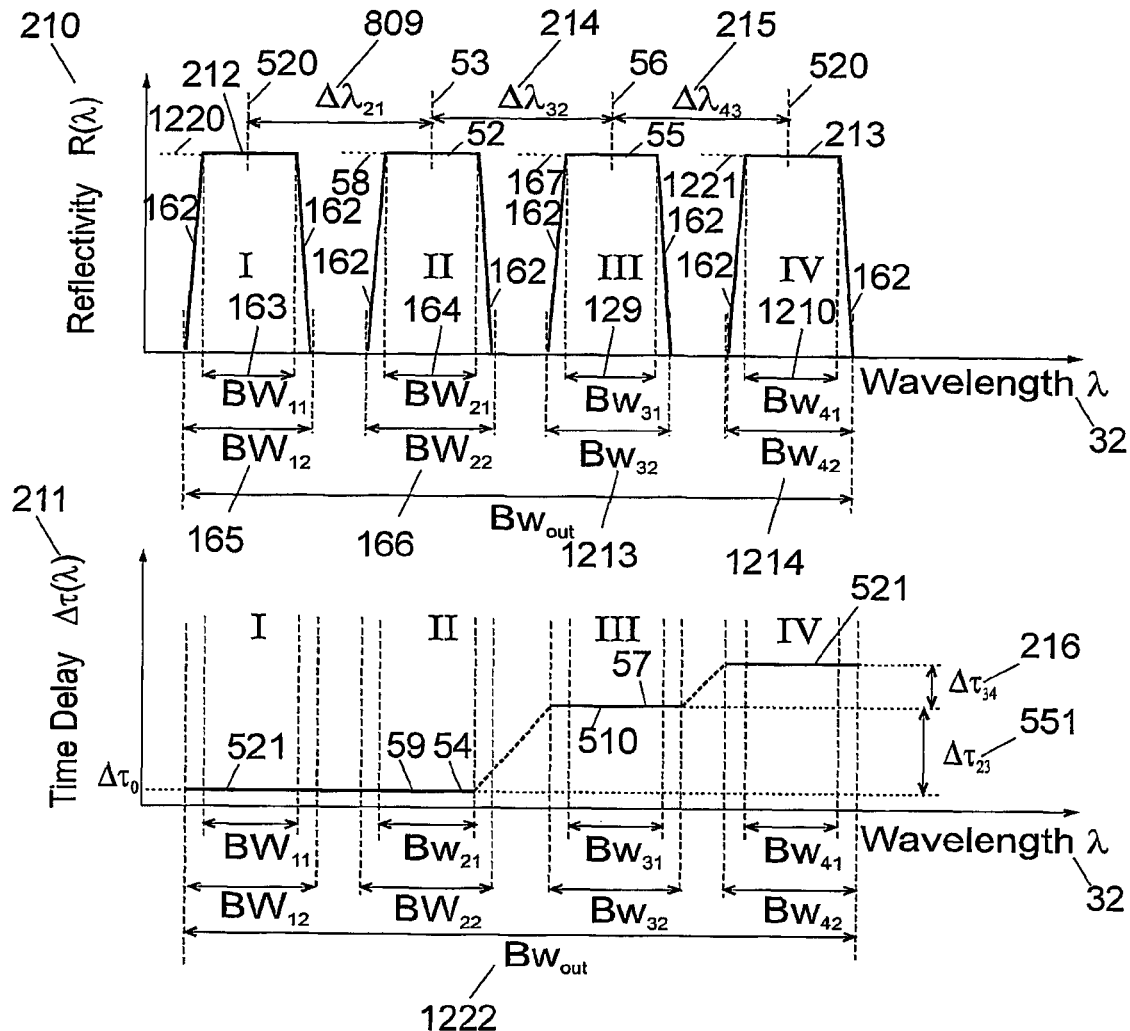
FIG. 25 shows the reflectivity of a four-band grating according to the present invention.

FIG. 25 shows the desired reflectivity spectrum 210 R(λ) and the group delay 211 Δτ(λ) spectrum of a partially disentangled four-band dispersionless grating. The reflectivity spectrum of each band 52, 55, 1220, 1221 has sloping edges 162 with inner bandwidths 163, 164, 129, 1210 $BW_{11}=BW_{21}=BW_{31}=BW_{41}$ of 0.3 nm and outer bandwidths 165, 166, 1213, 1214 $BW_{12}=BW_{22}=BW_{32}=BW_{42}$ of 0.5 nm. In this case, the inter-band spacings 809, 214, 215 $\Delta\lambda_{21}=\Delta\lambda_{32}=\Delta\lambda_{43}$ are 0.8 nm and the peak reflectivities 58, 167, 1220, 1221 are all equal to 90%. The group delay 211 Δτ(λ) is substantially constant across each individual outer bandwidth 212, 213 $BW_{i2}$ (i=1–4) and shows discontinuities 551, 216 $\Delta\tau_{23}$ and $\Delta\tau_{34}$ between the bands 52 and 55, and 55 and 213 (II/III and III/IV), respectively.

Figure 26:
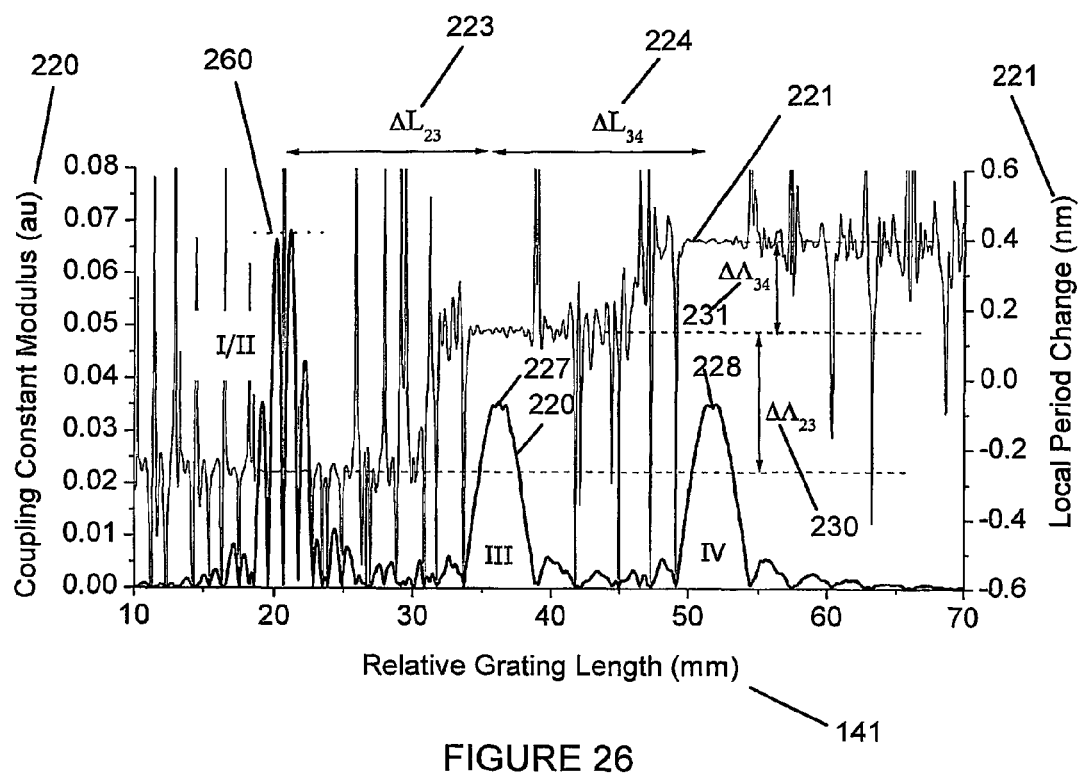
FIG. 26 shows the coupling constant of the four-band grating of FIG. 25.

FIG. 26 shows the coupling constant modulus 220 |κ(z)| (thicker line—left axis) and the local-period change ΔΛ(z) 221 (thinner line—right axis) corresponding to FIG. 25 where the time-delay discontinuities 551, 216 $\Delta\tau_{23}=\Delta\tau_{34}=150$ ps. Because the reflection bands 212, 52 (I and II) have no relative time-delay discontinuity ($\Delta\tau_{12}=0$) the corresponding grating parts remain entangled (super-imposed). As a result, the first part of the coupling constant modulus 220 and local period change 221 are similar to the ones shown in FIG. 9. However, due to the finite time delays 551, 216 $\Delta\tau_{23}$ and $\Delta\tau_{34}$, the grating components corresponding to reflection bands 227, 228 (III and IV) are fully disentangled. The relative spatial separations 223, 224 $\Delta L_{23}=\Delta L_{34}$ are about 15 mm (in close agreement with Equation 7). The local period change 221 is substantially piecewise constant over each disentangled peak 227, 228 (III and IV), with a step 231 proportional to the interband spacing 224 $\Delta\lambda_{34}$. The local-period step 231 $\Delta\Lambda_{34}$ is approximately 0.28 nm, which corresponds to an interband spacing 224 $\Delta\lambda_{34}$ of about 0.8 nm.

Since peaks I and II are now entangled (superimposed), the local period 221 is constant over the corresponding local super-structure with a relative shift of about −0.28 nm, with respect to a reference point corresponding to a local period change ΔΛ=0 nm. As expected, this relative local-period shift corresponds to the average of the relative shifts of band I and II shown in FIG. 22. The local-period step $\Delta\Lambda_{23}$ is then approximately equal to about 0.4 nm. Again, the observed spikes are numerical artefacts, due to numerical differentiation, and denote a sudden jump in the grating spatial phase ϕ(z). All phase jumps, in this case, are substantially equal to π. As before, smaller for time-delay discontinuities $\Delta\tau_{i(i+1)}$ result in smaller relative spatial separations $\Delta L_{i(i+1)}$ and stronger overlap between the partially disentangled peaks.

Figure 27:
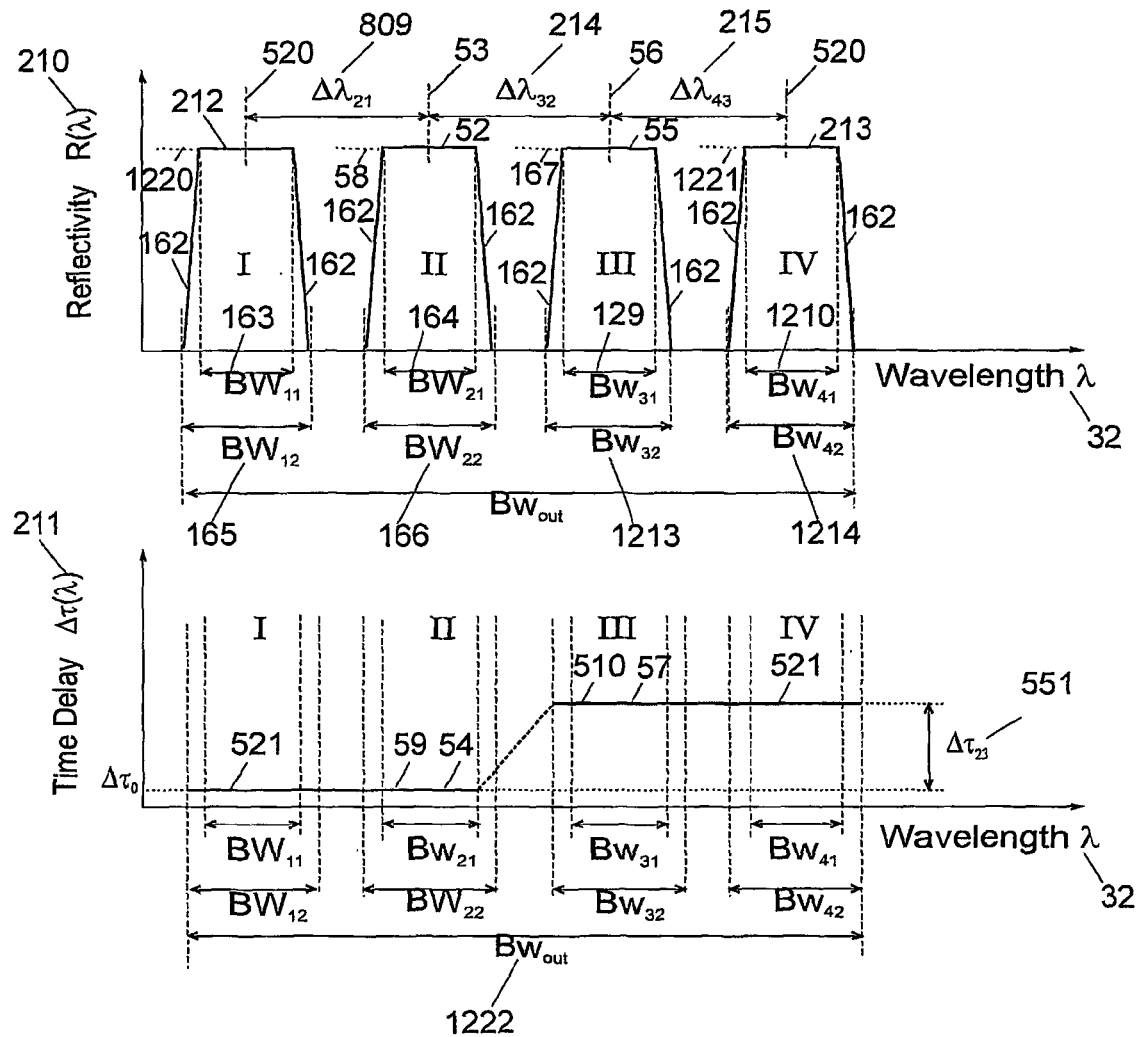
FIG. 27 shows the reflectivity of a four-band grating according to the present invention.

FIG. 27 shows the desired reflectivity spectrum 210 R(λ) and the group delay 211 Δτ(λ) spectrum of a four-band dispersionless grating, disentangled by groups. The two groups comprise bands 212 and 52 (I and II), and 55 and 213 (III and IV). The reflectivity spectrum 210 of each band 212, 52, 55, 213 has sloping edges with inner bandwidths 163, 164, 129, 1210 $BW_{11}=BW_{21}=BW_{31}=BW_{41}$ of 0.3 nm and outer bandwidths 165, 166, 1213, 1214 $BW_{12}=BW_{22}=BW_{32}=BW_{42}$ of 0.5 nm. In this case, the inter-band spacings 809, 214, 215 $\Delta\lambda_{21}=\Delta\lambda_{32}=\Delta\lambda_{43}$ are 0.8 nm and the peak reflectivities 1220, 58, 167, 1221 are all equal to 90%. The group delay 211 Δτ(λ) is substantially constant across each individual outer bandwidth 165, 166, 1213, 1214 $BW_{i2}$ (i=1–4) and shows a time discontinuity 551 $\Delta\tau_{23}$ between the bands 52 and 55 (II/III).

Figure 28:
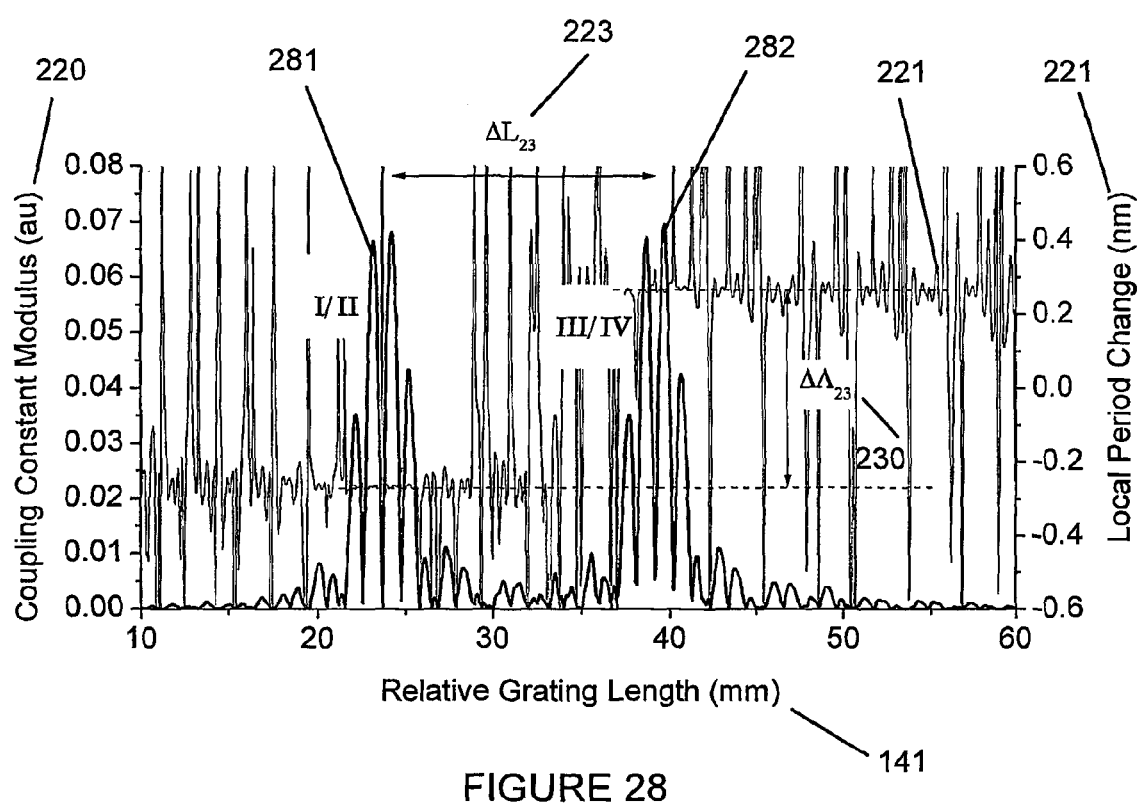
FIG. 28 shows the coupling constant of the four-band grating of FIG. 27.

FIG. 28 shows the coupling constant modulus 220 |κ(z)| (thicker line—left axis) and the local-period change 221 ΔΛ(z) (thinner line—right axis) corresponding to FIG. 27 with the time-delay discontinuity $\Delta\tau_{23}=150$ ps. Because the reflection bands I/II and III/IV have no relative time-delay discontinuity ($\Delta\tau_{22}=\Delta\tau_{34}=0$) the corresponding grating parts remain entangled (super-imposed). As a result, the two parts of the coupling constant modulus 220 and local period change 221 are similar to the ones shown in FIG. 9. The grating components corresponding to the super-imposed reflection bands I/II and III/IV are fully disentangled due to the time delay difference 551 $\Delta\tau_{23}$. The relative spatial separation $\Delta L_{23}$ is about 15 mm (again in close agreement with Equation 7). The local period change 221 ΔΛ(z) is substantially piecewise constant over each disentangled peak 281, 282. The local-period step 230 $\Delta\Lambda_{23}$ is approximately equal to about 0.28 nm, which corresponds to an interband spacing 223 $\Delta\lambda_{32}$ of about 0.8 nm.

Since the peak groups 281, 282 (III/IV and I/II) are now entangled (superimposed), the local period 221 is constant over the corresponding local super-structure with a relative shift of about ±0.28 nm, respectively, with respect to a reference point corresponding to ΔΛ=0 nm. Again, as expected, this relative local-period shift corresponds to the average of the relative shifts of the bands III, IV and I, II shown in FIG. 22. The local-period step 230 $\Delta\Lambda_{23}$ is then approximately equal to about 0.56 nm. Again, the observed spikes are numerical artefacts, due to numerical differentiation, and denote a sudden jump in the grating spatial phase ϕ(z). All phase jumps, in this case, are substantially equal to π. As before, smaller for time-delay discontinuities $\Delta\tau_{i(i+1)}$ result in smaller relative spatial separations $\Delta L_{i(i+1)}$ and stronger overlap between the partially disentangled peaks. The peak reflectivities can also be dissimilar, varying between 0.1% and 99.99999%. The group delay can also be a linear or non-linear function of wavelength.

Example II

Chirped-Grating Dispersion Compensators

Figure 29:
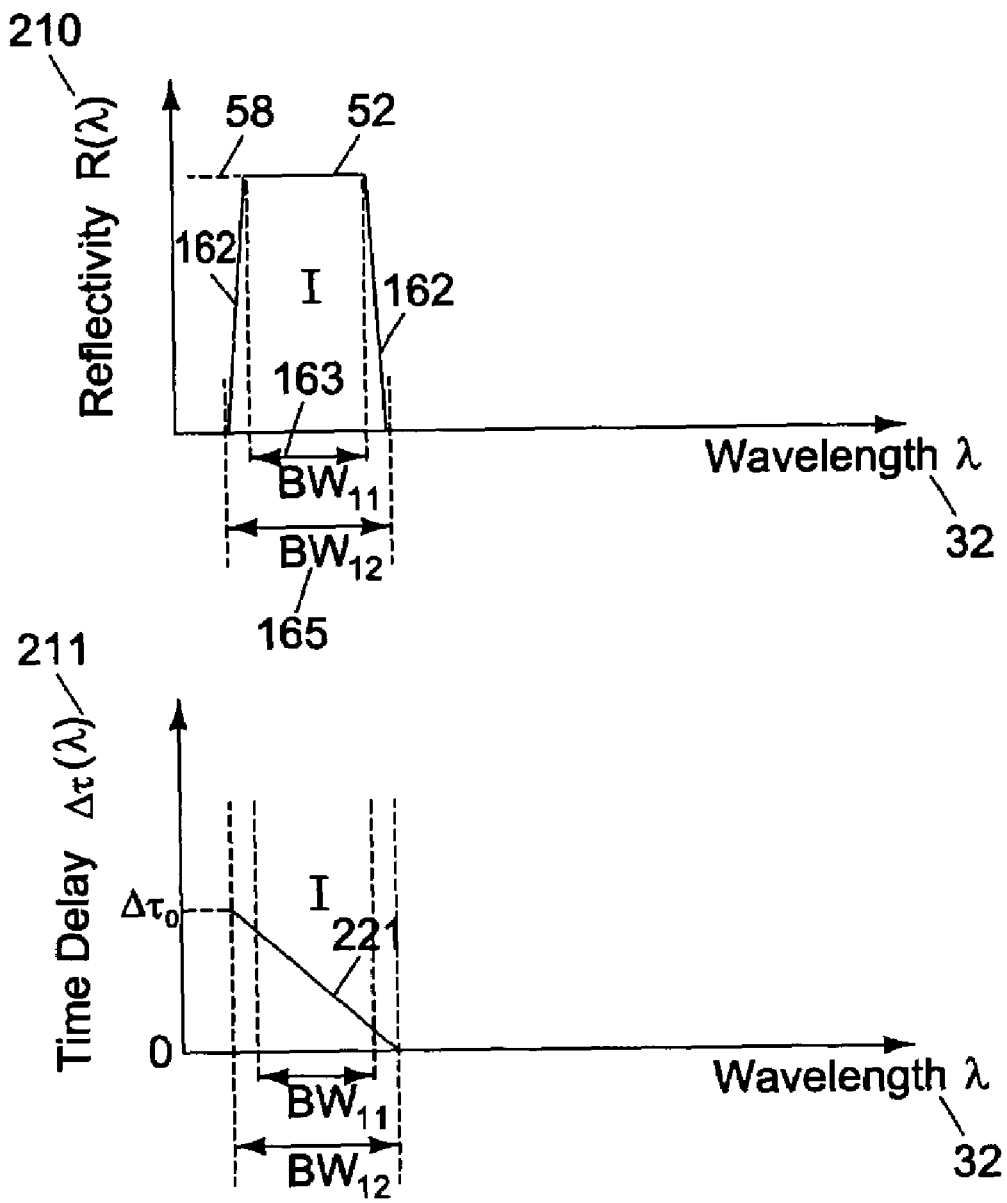
FIG. 29 (not in accordance with the invention) shows the reflectivity of a chirped grating.
Figure 30:
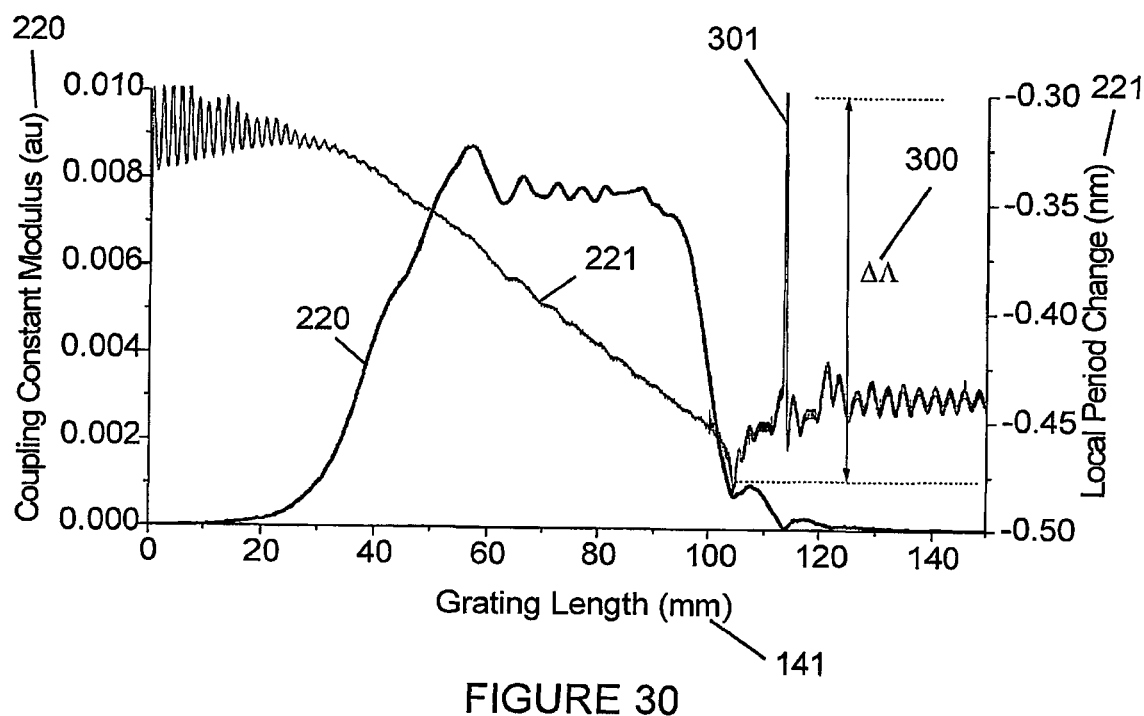
FIG. 30 (not in accordance with the invention) shows the coupling constant of the chirped grating of FIG. 29.

In this example, we apply the same disentangling design approach to a device suitable for dispersion compensation in communication systems. FIG. 29 shows the desired reflectivity spectrum 210 R(λ) and the group delay 211 Δτ(λ) of a single band grating. The reflectivity spectrum 210 has sloping edges 162, and the inner bandwidth 163 $BW_{11}$ is 0.3 nm and the outer bandwidth 165 $BW_{12}$ is 0.5 nm. The peak reflectivity 58 is 90%. The group delay 211 varies linearly from $\Delta\tau_0=750$ ps to 0 ps over the outer bandwidth 165 $BW_{12}$. The corresponding linear dispersion, given by the slope of the group delay 211 with wavelength, is 1500 ps/nm. The corresponding coupling constant modulus 220 |κ(z)| (thicker line—left axis) and the local-period change 221 ΔΛ(z) (thinner line—right axis) are shown in FIG. 30. It is shown that the local period change 221 varies non-linearly over the entire grating length 141. The total local-period change 300 ΔΛ is about 0.17 nm, which corresponds to the reflection band outer bandwidth 165 ($BW_{12} \approx 2n_0 \Delta\Lambda$). The observed spike 301 is numerical artefact and denotes a sudden jump in the grating spatial phase □(z) equal to π. Gratings can be designed with a peak reflectivity 58 from 0.1% and 99.99999% and with a group delay 211, which is a non-linear function of wavelength.

Figure 31:
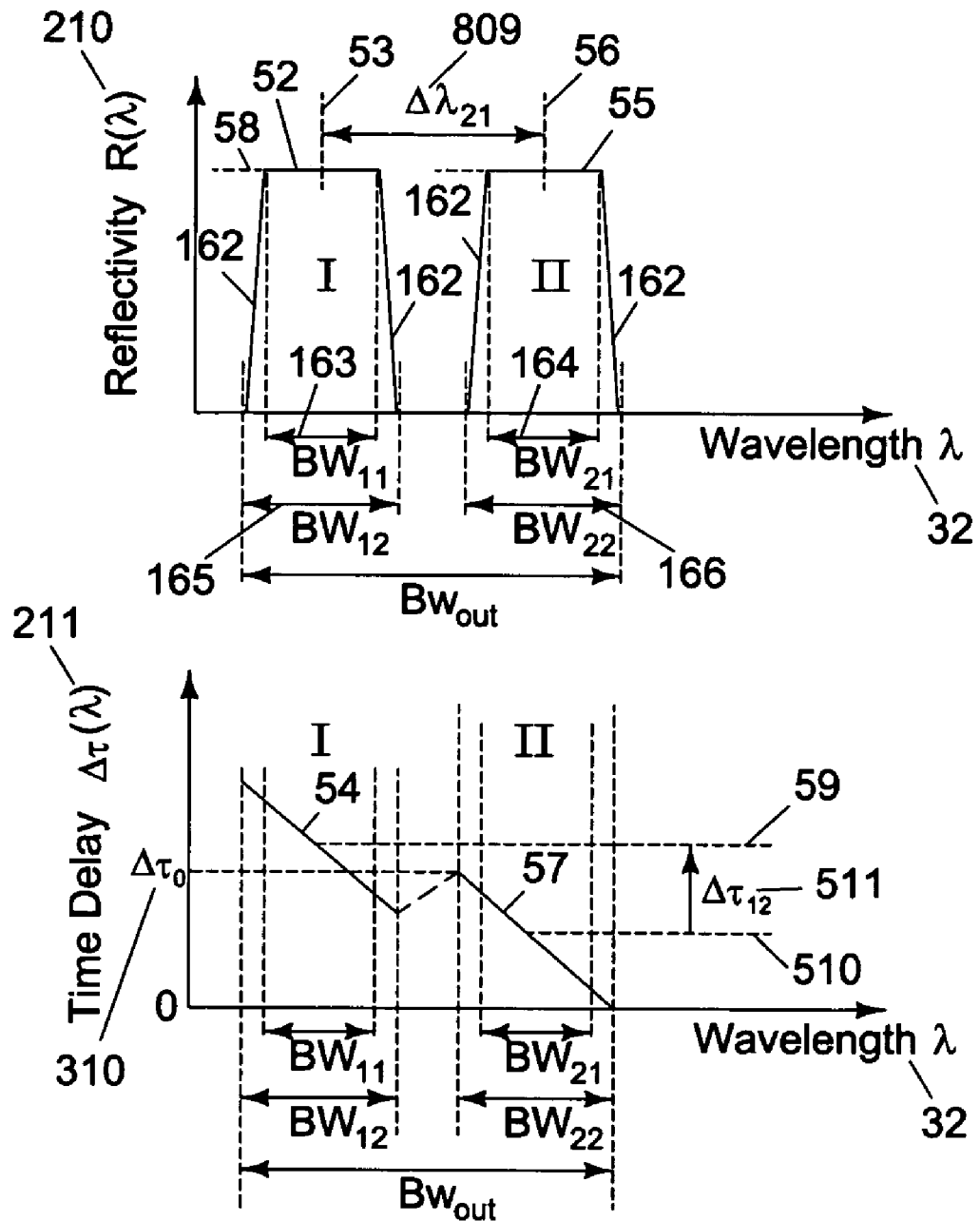
FIG. 31 shows the reflectivity of a two-band chirped grating according to the present invention.

FIG. 31 shows the desired reflectivity spectrum 210 R(λ) and the group delay 211 Δτ(λ) of a two-band grating. The reflectivity spectrum 210 of each band 52, 55 has sloping edges 162 with inner bandwidths 163, 164 $BW_{11}=BW_{21}$ of 0.3 nm and outer bandwidths 165, 166 $BW_{12}=BW_{22}$ of 0.5 nm. The inter-band spacing 809 $\Delta\lambda_{21}$ is 0.8 nm. The peak reflectivities 58, 167 are 90%. The group delay 211 varies linearly from a time delay 310 $\Delta\tau_0=750$ ps to 0 ps over the outer bandwidth 166 $BW_{22}$ of reflection band 55 (II). The group delay 211 also varies linearly from $\Delta\tau_0+\Delta\tau_{12}$ to $\Delta\tau_{12}$ over the outer bandwidth 165 $BW_{12}$ of reflection band 52 (I). The corresponding linear dispersion, given by the slope of the time delay 211 curve with wavelength, is −1500 ps/nm, for both reflection bands 52, 55. The average first time delay 59 can be greater or less than the average second time delay 510. The time delay 310 $\Delta\tau_0$ can be negative giving rise to positive linear dispersion.

Figure 32:
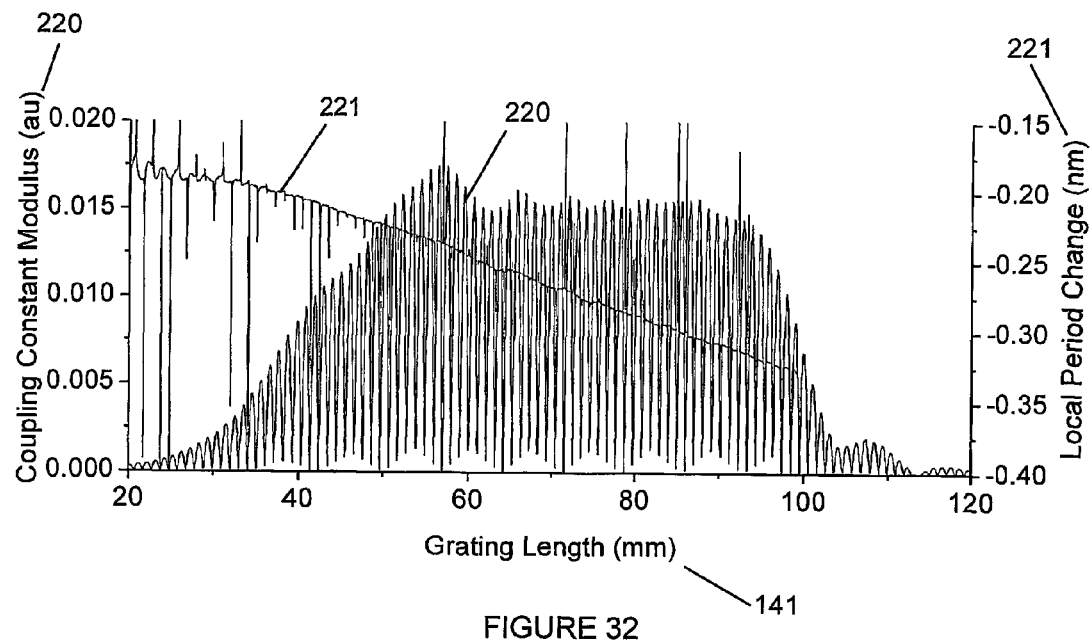
FIG. 32 shows the coupling constant of the two-band chirped grating of FIG. 31.

FIG. 32 shows the coupling constant modulus |κ(z)| (thicker line—left axis) and the local-period change ΔΛ(z) (thinner line—right axis) for the two-band reflector shown in FIG. 21 with the delay 511 $\Delta\tau_{12}=0$ ps. The rest of the parameters are equal to the ones shown in FIG. 31. It is shown that the coupling constant modulus 220 |κ(z)| varies quite fast in a periodic manner along the entire grating length 141. However, the observed envelope of the coupling constant modulus 220 |κ(z)| is the same as in the case of single-band reflector (see FIG. 30). The period of the coupling constant modulus 220 |κ(z)| variation depends on the interband spacing 809 $\Delta\lambda_{21}$. The local period change 221 ΔΛ(z) follows the same overall change and shape observed in FIG. 30 indicating again a spatially chirped grating structure. However, in the current case the presence of sharp spikes indicates again the existence of spatial phase shift equal to π. The fast periodic variations in |κ(z)| and the periodic phase shifts along the grating length are essentially a result of the spatial superposition of two individual gratings corresponding to each reflection band 52 and 55 (I and II). Apart from a small difference in their reference spatial periods $\Lambda_I$ and $\Lambda_{II}$, the characteristics of the two subgratings are identical (similar to the ones shown in FIG. 26). The difference $|\Lambda_I - \Lambda_{II}| = \lambda_{21}/2n_0$. The resulted entangled design is a consequence of the fact that the time delay 511 $\Delta\tau_{12}=0$ ps.

Figure 33:
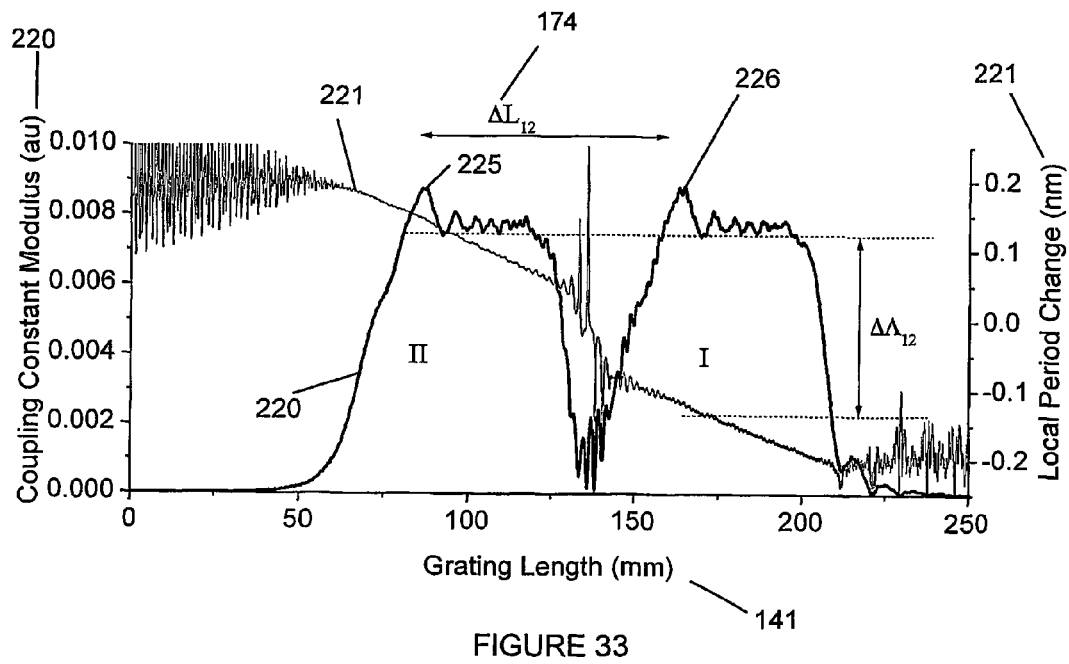
FIGS. 33, 34 and 35 show the coupling constant of the two-band chirped grating of FIG. 31.
Figure 34:
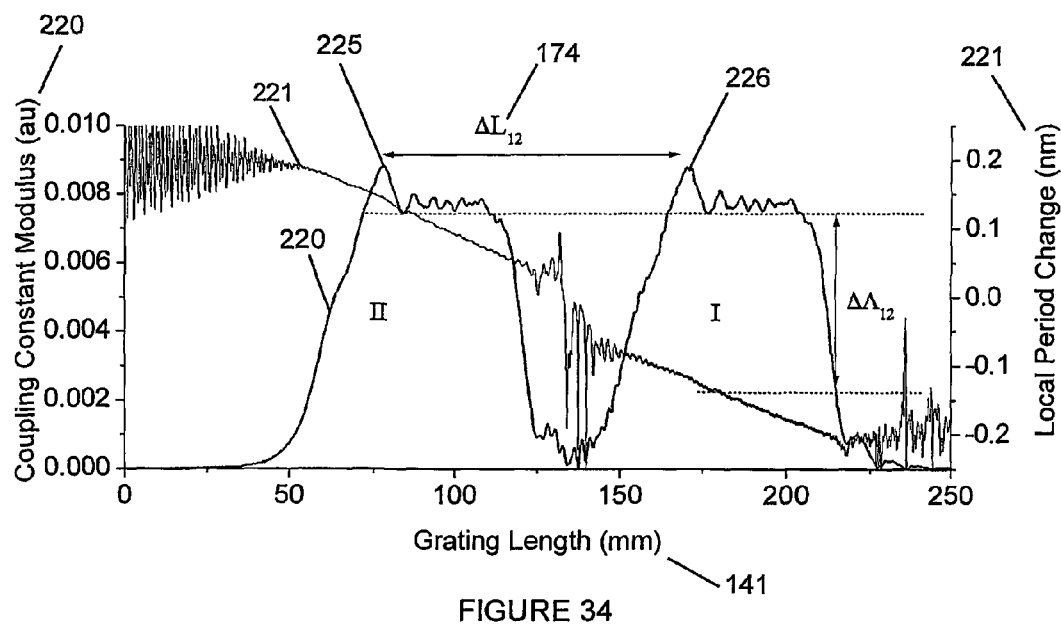
Figure 35:
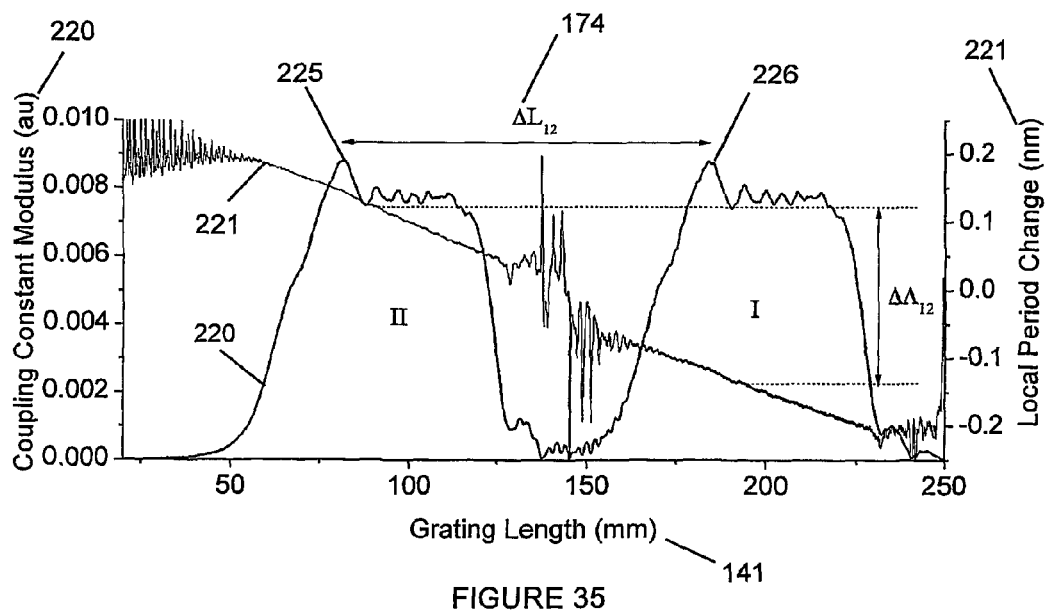

FIGS. 33, 34 and 35 show the resulting coupling constant modulus 220 |κ(z)| (thicker line—left axis) and the local-period change 221 ΔΛ(z) (thinner line—right axis), for the two-band reflectorshown in FIG. 31 with time delay discontinuities 511 $\Delta\tau_{12}$=+750 ps, +900 ps and +1000 ps, respectively. The rest of the parameters are equal to the ones shown in FIG. 31. It is first observed that the coupling constant modulus 220 |κ(z)| in these cases is fundamentally different from the one shown in FIG. 32. In the present case, two clear peaks 225, 226 (I and II) can be identified corresponding to the reflection spectral bands 53, 56 (I and II), respectively. The disentanglement of the two peaks 225, 226 is a direct result of the introduced time delay discontinuity 511 $\Delta\tau_{12}$. Each coupling constant modulus 220 |κ(z)| distribution and local period change 221 are essentially identical with the ones corresponding to a single-band device (c.f., FIG. 30). As before, the relative spatial separation 174 $\Delta L_{12}$ between the two |κ(z)| peaks is related to the value of the introduced time-delay discontinuity 511 $\Delta\tau_{12}$ through Equation 7. The observed relative spatial separations 174 $\Delta L_{12}$ are about 75 mm, 90 mm and 100 mm, respectively.

The local period changes 221 ΔΛ(z) (thinner line—left axis) over each band 225, 226 are relatively displaced by a an amount $\Delta\Lambda_{12}$ 229, which is again related to the interband spacing 809 $\Delta\lambda_{21}$ by Equation 8. In all cases, $\Delta\Lambda_{12} \approx 0.26$ nm. The second |κ(z)| peak 226 at the back of the grating is characterised by negative local period change 221 (with respect to a reference period $\Lambda_0$), which implies that it reflects the shorter-wavelength ("blue") part of the incident spectrum. This part of the grating (denoted I) corresponds to band I of the reflection spectrum of FIG. 31. The first |κ(z)| peak 225 at the front of the grating is characterised by positive local period change 221 (with respect to the same reference period $\Lambda_0$), which implies that it reflects the longer-wavelength ("red") part of the incident spectrum. This part of the grating (denoted II) corresponds, therefore, to band II of the reflection spectrum of FIG. 31. Therefore, the "blue" part of the spectrum (band I), been reflected at the far end of the grating (part I), suffers on average larger time delay ($\Delta\tau_{12}>0$) than the "red" counterpart (band II), which is reflected predominantly at the front part of the grating (part II).

Figure 36:
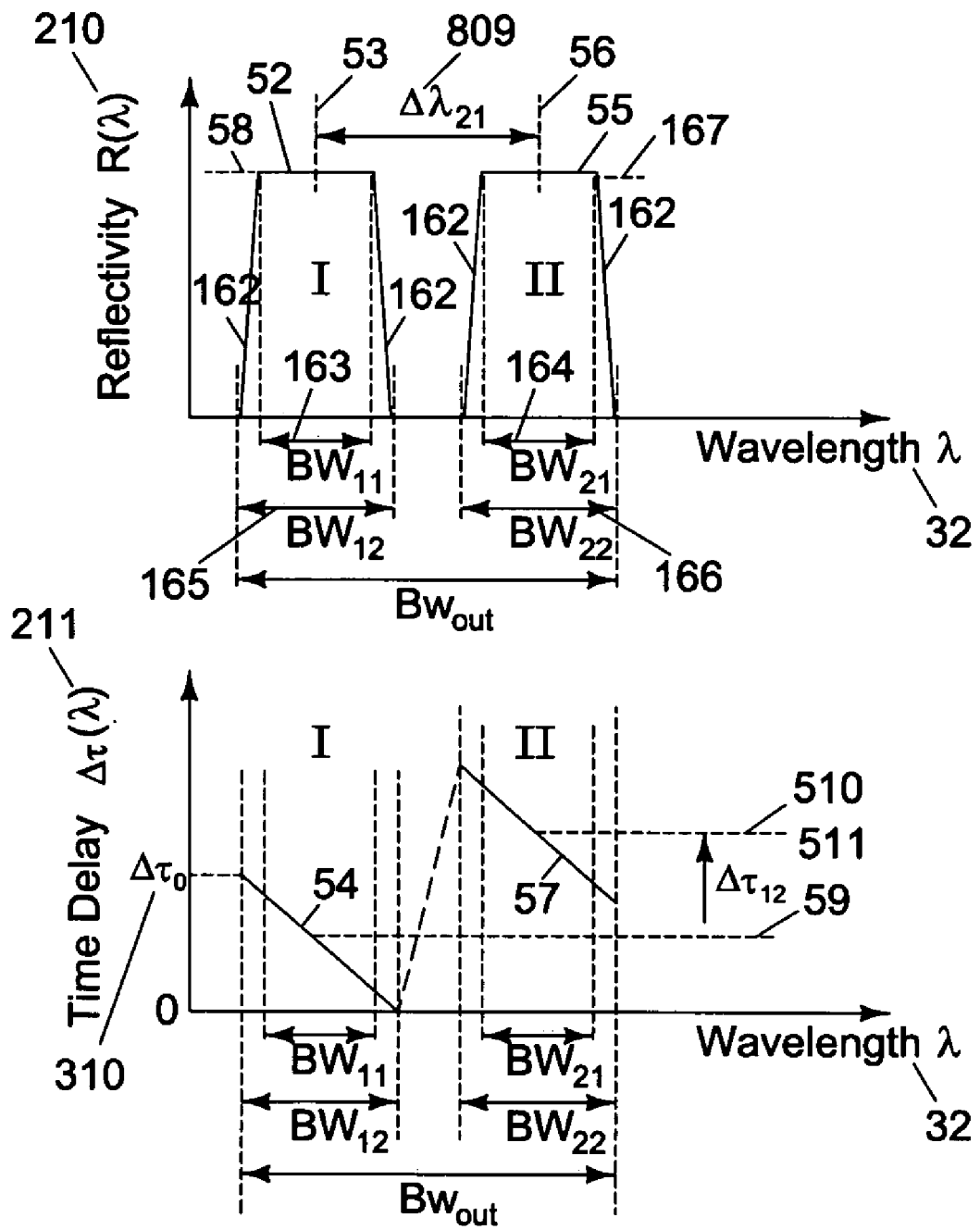
FIG. 36 shows the reflectivity of a two-band chirped grating with a negative time delay discontinuity according to the present invention.

FIG. 36 shows a preferred embodiment of the invention corresponding to grating designs with a negative time delay discontinuity 511. FIG. 36 shows the desired reflectivity spectrum 210 R(λ) and the group delay 211 Δτ(λ) of a two-band grating. The reflectivity spectrum 210 of each band 52, 55 has sloping edges 162 with inner bandwidths 163, 164 $BW_{11}=BW_{21}$ of 0.3 nm and outer bandwidths 165, 166 $BW_{12}=BW_{22}$ of 0.5 nm. The inter-band spacing 809 $\Delta\lambda_{21}$ is 0.8 nm. The peak reflectivities 58, 167 are 90%. The group delay 211 varies linearly from a time delay 310 $\Delta\tau_0=750$ ps to 0 ps over the outer bandwidth 165 $BW_{12}$ of reflection band 52 (I). The group delay 211 also varies linearly from $\Delta\tau_0+|\Delta\tau_{12}|$ to $|\Delta\tau_{12}|$ over the outer bandwidth 166 $BW_{22}$ of reflection band 56 (II). The corresponding linear dispersion, given by the slope of the time delay 211, is −1500 ps/nm, for both reflection bands 52 and 55. Compared to FIG. 31, the time delay discontinuity 511 is negative resulting in reflection band II 55 being more delayed that reflection band I 52.

Figure 37:
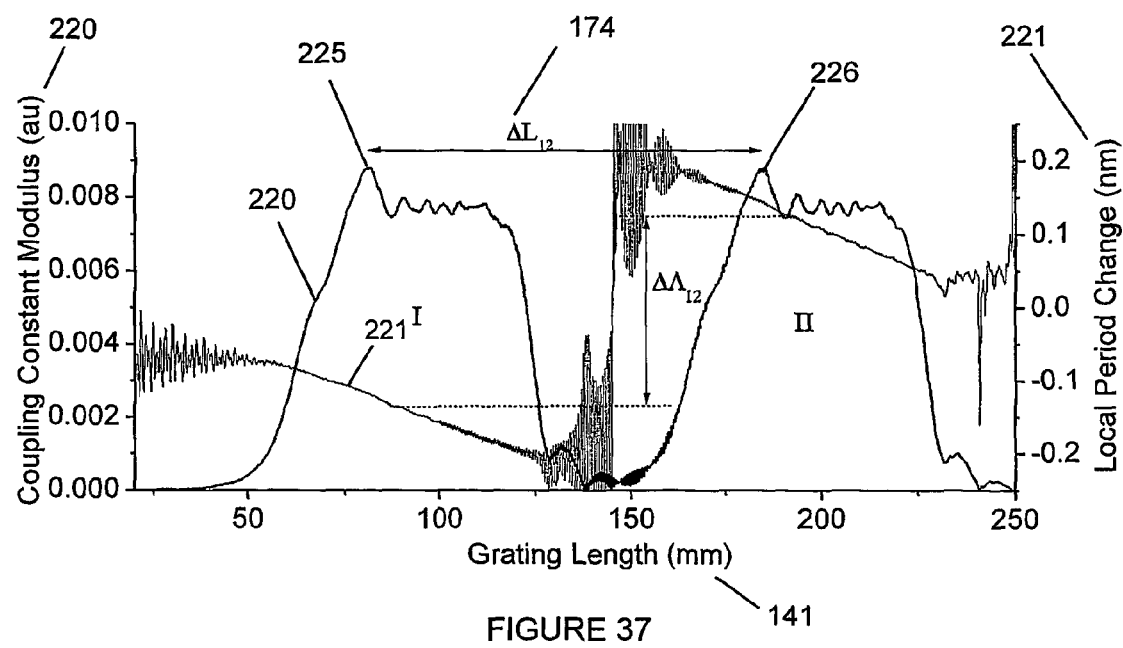
FIG. 37 shows the coupling constant of the two-band chirped grating of FIG. 36.

FIG. 37 shows the coupling constant modulus 220 |κ(z)| (thicker line—left axis) and the local-period change 221 ΔΛ(z) (thinner line—right axis), for the two-band reflector of FIG. 36 with a time delay discontinuity 511 $\Delta\tau_{12}$=−1000 ps. The rest of the parameters are equal to the ones shown in FIG. 35. It is first observed that the coupling constant modulus 220 |κ(z)| in these cases is the same as the coupling constant modulus 220 shown in FIG. 35. The local period changes 221 ΔΛ(z) (thinner line—left axis) over each band 225, 226 are again relatively displaced by the same amount $\Delta\Lambda_{12}$ 229 of about 0.26 nm, as in FIG. 35. However, the sign of the relative local period changes 221 over the front and back parts of the grating have now been reversed. The second |κ(z)| peak 226 at the back of the grating is characterised now by a positive local period change (with respect to a reference period $\Lambda_0$), which implies that reflects the longer-wavelength ("red") part of the incident spectrum. This part of the grating (denoted II) corresponds to band II of the reflection spectrum of FIG. 36. The first |κ(z)| peak 225, on the other hand, at the front of the grating is characterised by a negative local period change 221 (with respect to the same reference period $\Lambda_0$), which implies that it reflects the shorter-wavelength ("blue") part of the incident spectrum. This part of the grating (denoted I) corresponds, therefore, to band I of the reflection spectrum of FIG. 36. Therefore, the "blue" part of the spectrum (band I), reflected at the front end of the grating (part I), suffers on average shorter time delay (corresponding to $\Delta\tau_{12}<0$) than the "red" counterpart (band II), which is reflected predominantly at the back part of the grating (part II).

The design shown in FIG. 37 (corresponding to a negative time delay discontinuity 511 $\Delta\tau_{12}$—see FIG. 36) is superior to the equivalent design shown in FIG. 35 (corresponding to a positive time delay discontinuity 511 $\Delta\tau_{12}$—see FIG. 31) when used for linear dispersion compensation in optical transmission systems. Because in the design with $\Delta\tau_{12}<0$ (FIG. 37) the "blue" part of the spectrum which is reflected at the front end of the grating (part I) never reaches part II and, therefore, does not suffer from cladding-mode losses originating from "red" part II. In the design with $\Delta\tau_{12}>0$ (FIG. 35) the "blue" part of the spectrum is reflected at the far end of the grating (part I). In this case it propagates through part II and, therefore, suffers from cladding-mode losses originating from the preceding "red" part II.

Cladding-mode losses pose a very serious problem, limiting the useful bandwidth of grating dispersion compensators. To suppress them special fibre designs should be used. The design shown in FIG. 37 (corresponding to negative time delay discontinuity $\Delta\tau_{12}$—see FIG. 36), however, solves this problem by disentangling the different reflection bands and arranging them in such a way that they are not affected by the deleterious effects of cladding modes. This solution does not depend on the type of photosensitive fibre used.

The same design approach can be applied to multi-band (linear and/or non-linear) disentangled dispersion compensators, extending over very large bandwidths, for example extending over the C- and/or L-Bands. The "bluer" bands are arranged in such a way so that they experience progressively shorter average time delays.

Figure 48:
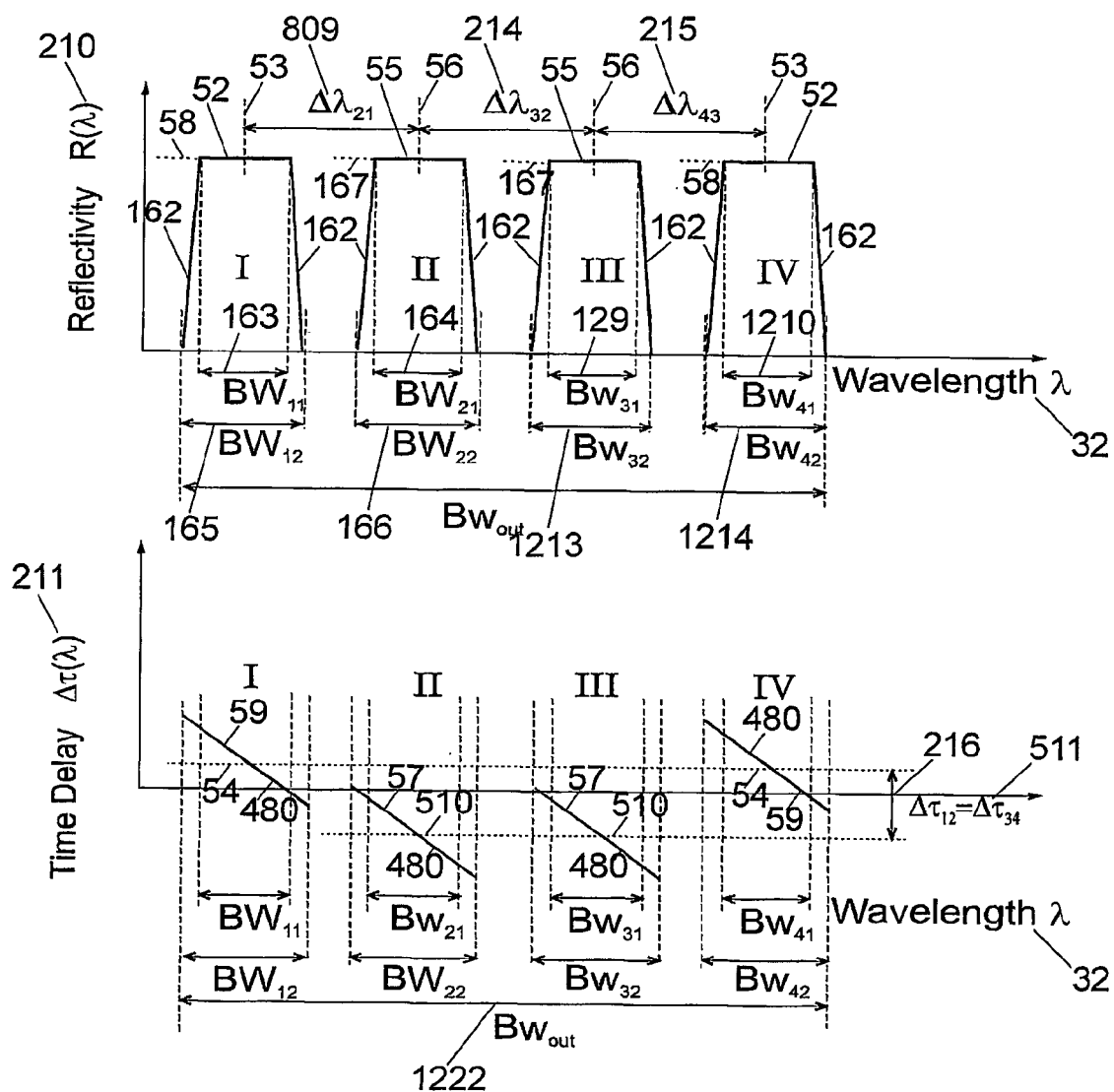
FIG. 48 shows a preferred embodiment of the present invention.

FIG. 48 shows a preferred embodiment of a four band dispersion-compensating grating. The group delay 211 is linearly chirped in each of the wavelength bands 52, 55, 212, 213 with a chirp 480.

Figure 49:
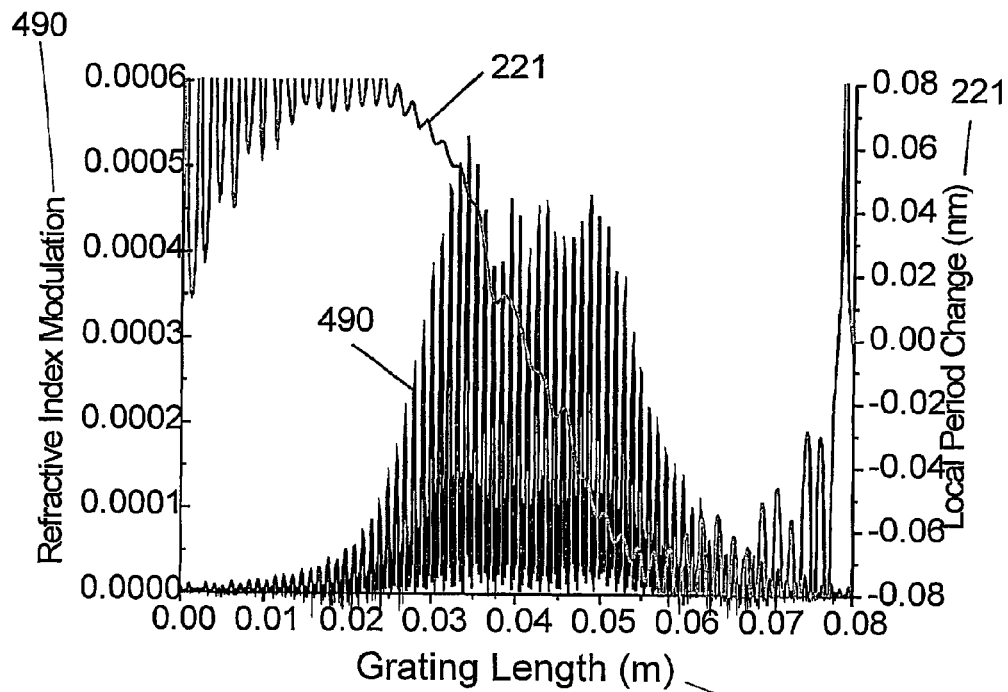
FIGS. 49 and 50 (not in accordance with the invention) show the refractive index envelope for a four band grating.
Figure 50:
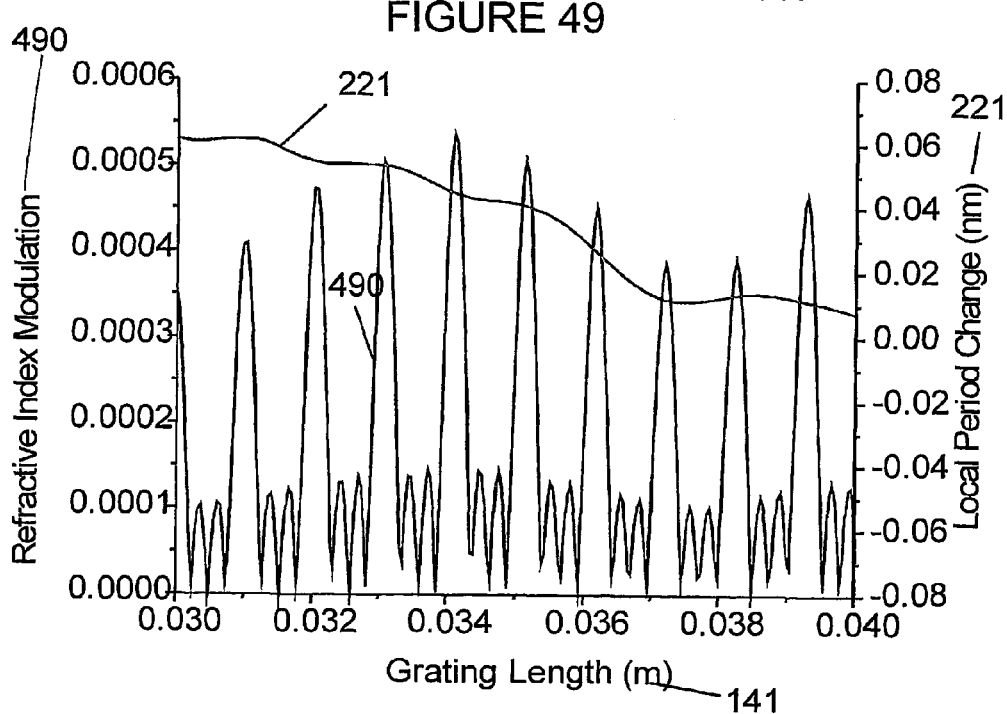

FIGS. 49 and 50 show the performance of the four band grating of FIG. 48 where the time delay discontinuities 511, 216 $\Delta\tau_{12}=\Delta\tau_{43}=0$ ps, inner bandwidths 163, 164, 129, 1210 $BW_{11}=BW_{21}=BW_{31}=BW_{41}=0.5$ nm and outer bandwidths 165, 166, 1213, 1214 $BW_{12}=BW_{22}=BW_{32}=BW_{42}=0.55$ nm. The chirp 480 is 600 ps/nm. The peak reflectivities 58, 167 are equal to 90%. FIG. 49 shows the slowly-varying positive envelope of the refractive index modulation 480 (defined in equation 1) and the local period change 221 in nm versus the grating length 141 in meters. FIG. 50 shows part of the response shown in FIG. 49 to show more detail. The peak to peak variation in refractive index modulation is over 0.001 (ie twice 0.0005). This magnitude of variation can lead to saturation effects of the refractive index modulation induced in the grating writing process, which results in deteriorated grating performance and is very undesirable.

Figure 51:
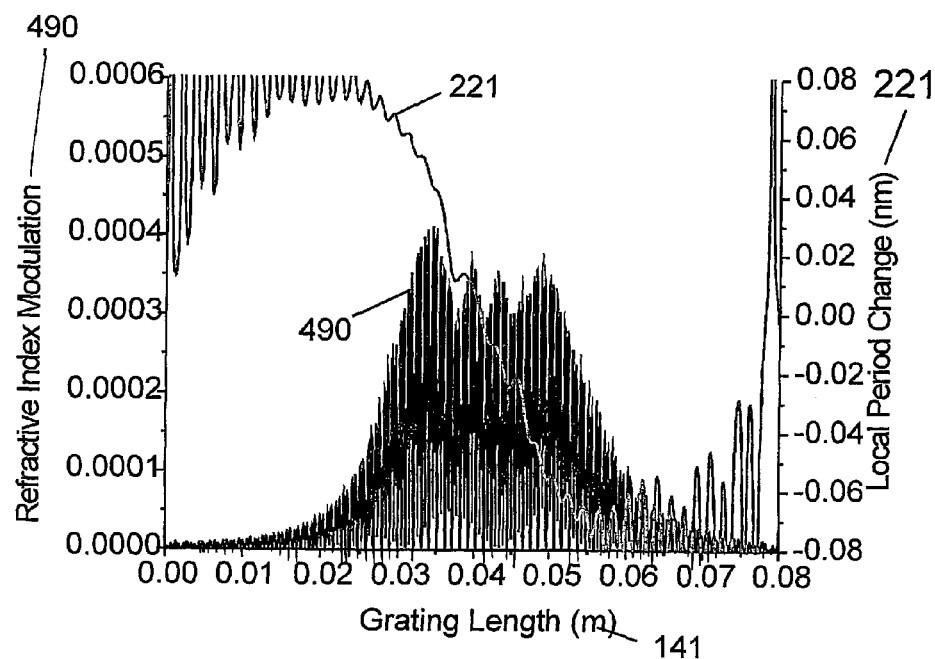
FIGS. 51 and 52 show the performance achieved from a preferred embodiment of the four band grating.
Figure 52:
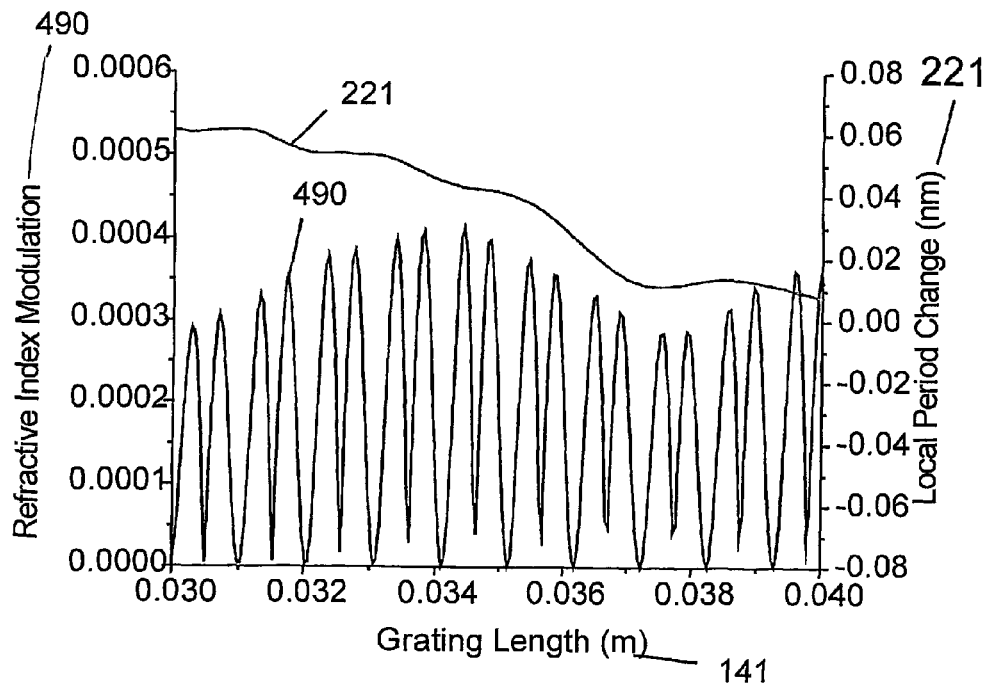

FIG. 51 shows the performance of a preferred embodiment of the four band grating of FIG. 48. The grating has the same parameters as used in FIG. 49, but with the time delay discontinuities 511, 216 $\Delta\tau_{12}=\Delta\tau_{43}=10$ fs (femtoseconds). FIG. 52 is an enlargement of FIG. 51.

Figure 53:
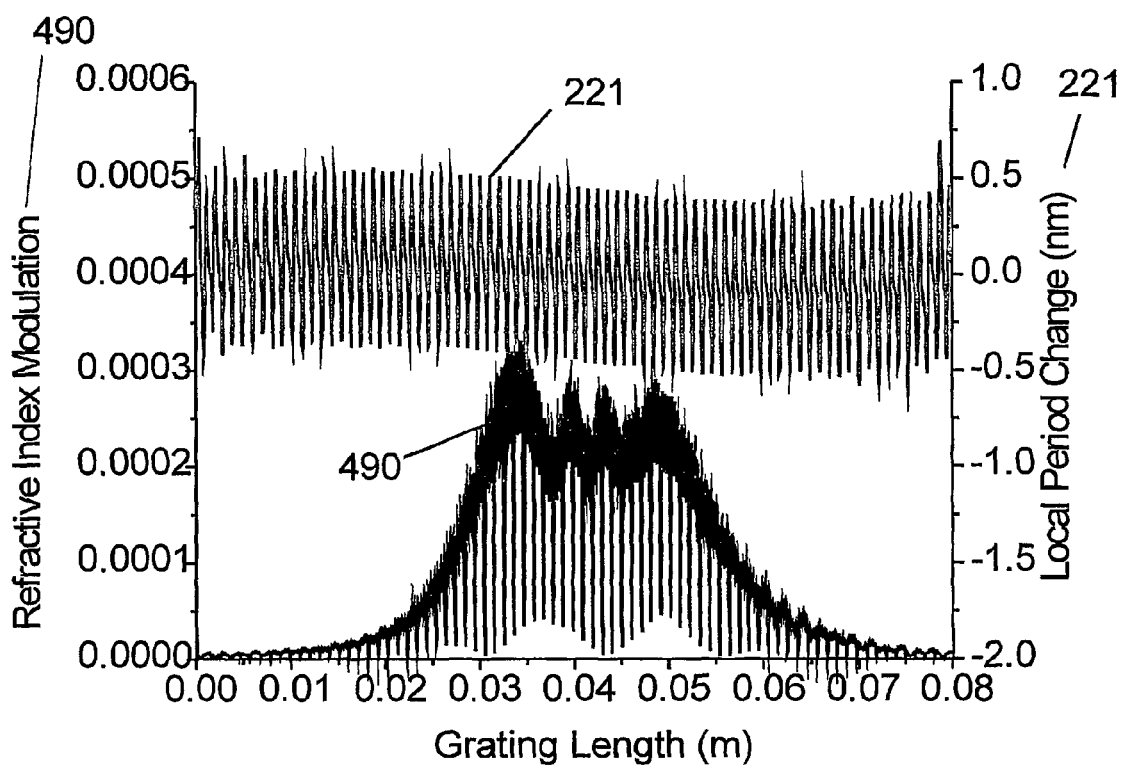
FIGS. 53 and 54 show the performance achieved from another preferred embodiment of the four band grating.
Figure 54:
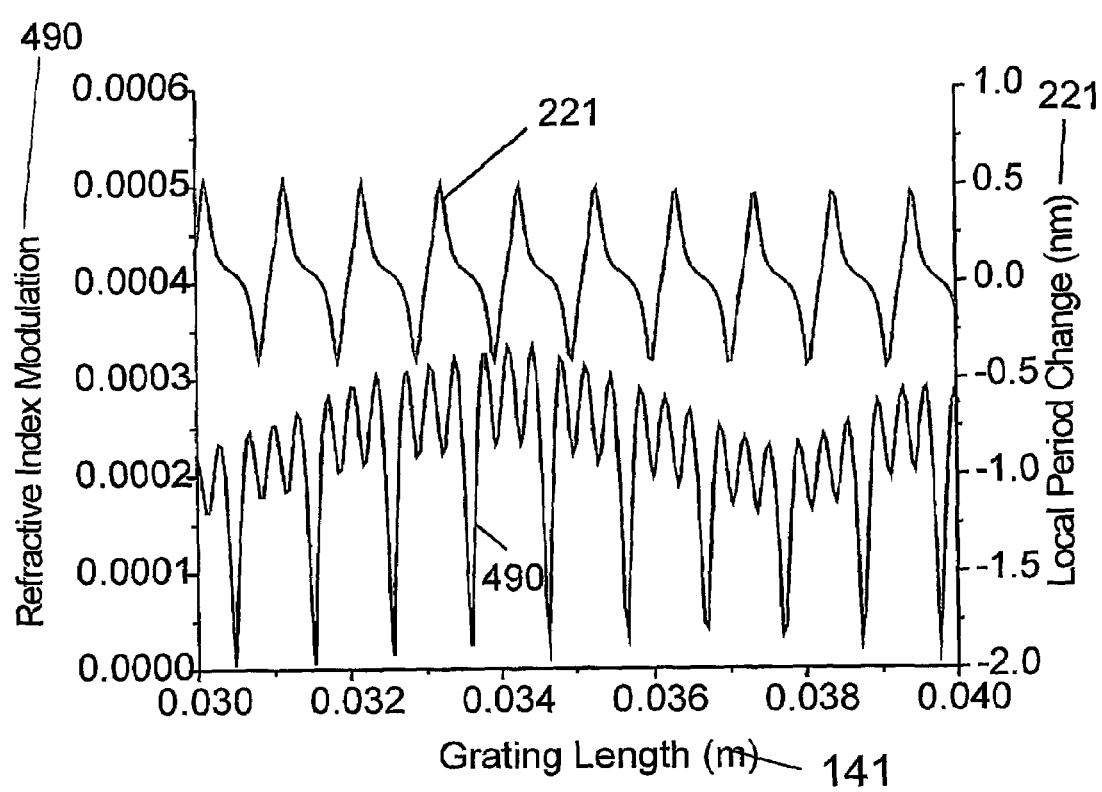

FIG. 53 shows the performance of another preferred embodiment of the four band grating of FIG. 48. The grating has the same parameters as used in FIG. 49, but with the time delay discontinuity $\Delta\tau_{12}=\Delta\tau_{43}=5$ fs (femtoseconds). FIG. 54 is an enlargement of FIG. 53.

It is clear by comparing FIGS. 51 to 54 with FIGS. 49 and 50 that partially disentangling the first and second reflection wavelength bands 52 and 55 by making the first group delay 54 different from the second group delay 57 has reduced the peak to peak variation in refractive index modulation 480. This leads to important advantages in interleavers, multiplexers and demultiplexers made from these gratings.

It should also be stressed that, in all the disentangled and partially disentangled designs of multiband dispersion compensators discussed above, the dispersion on each individual band can also be varied or non-linearly chirped so that we compensate for the dispersion slope across the total device band $BW_{out}$.

APPLICATIONS

The new grating designs, discussed in the section above, can be used in a number of different arrangements to achieve high performance devices.

Single-Grating Multiband WDM Interleavers/Demultiplexers

Figure 38:
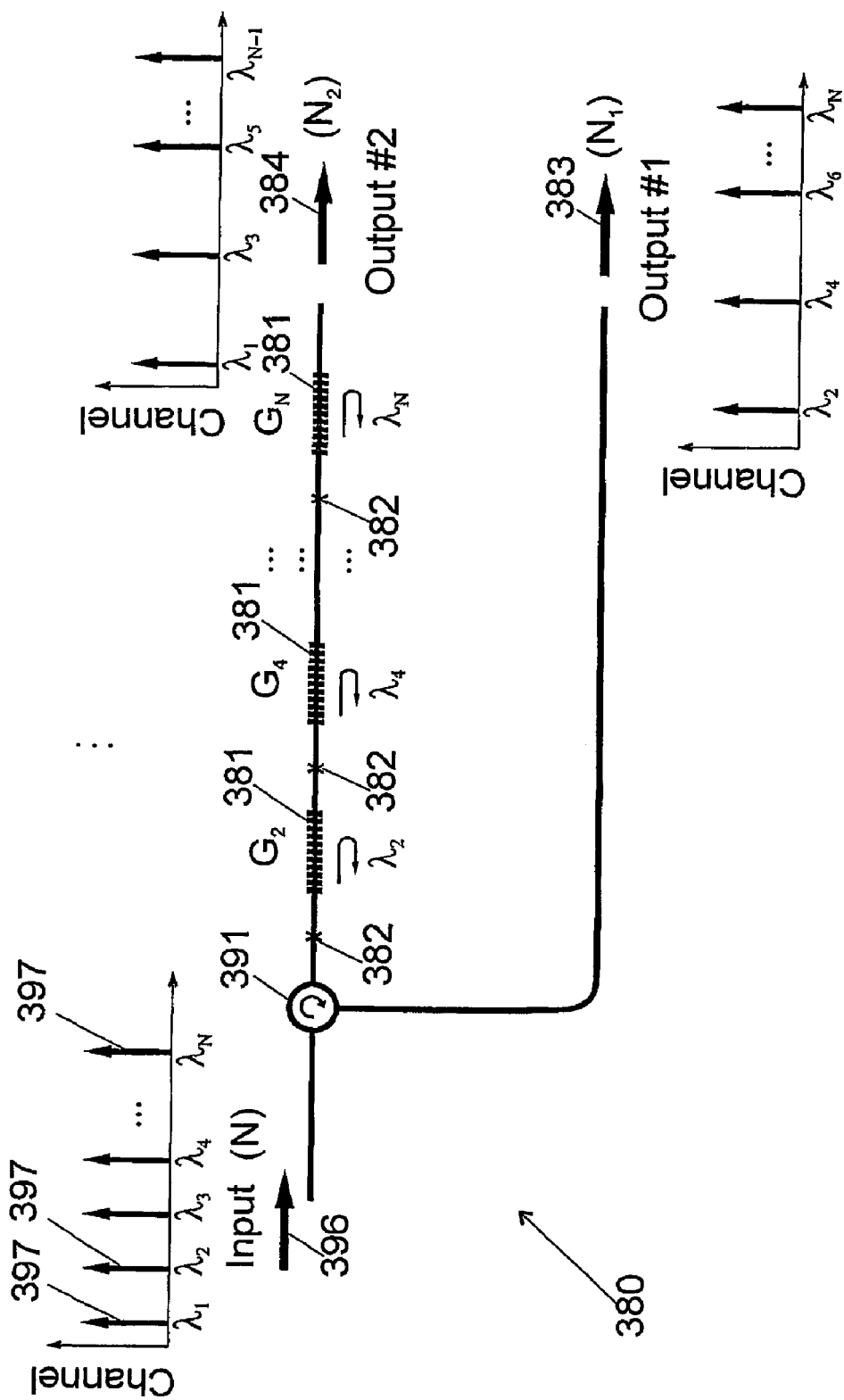
FIG. 38 (not in accordance with the invention) shows an interleaver.

FIG. 38 shows a schematic of a conventional optical interleaver 380 using a series of $N_1$ single-band gratings 381 spliced together at splices 382. An incoming dense wavelength-division-multiplexed (DWDM) signal 396, consisting of N channels 397 $\lambda_1, \lambda_2, \lambda_3, \ldots \lambda_N$, is separated into two output streams 383, 384 of $N_1$ and $N_2$ channels, respectively, where $N_1+N_2=N$. Each member of the $N_1$-channel subgroup 383 is reflected by a different one of the gratings 382. Such topology, however, involves $N_1$ splices 382, introducing a large cumulative insertion loss and spurious multiple back-reflections that can compromise severely the overall device performance. Additionally, splices have to be packaged in a final product, and the more there are, the bigger the final product and the less the reliability.

FIG. 39 shows a schematic of a novel arrangement 390 using a single multiband ($N_1$-band) grating 392 instead. The incoming dense wavelength-division-multiplexed (DWDM) signal 396, consisting of N channels 397 $\lambda_1, \lambda_2, \lambda_3, \ldots \lambda_N$, is separated into two output streams of $N_1$ and $N_2$ channels, respectively, where $N_1+N_2=N$. Each member of the $N_1$-channel subgroup 398 is now reflected by the same multiband grating 392. Such a topology involves only one splice 382 and the arrangement 390 therefore does not suffer from large cumulative insertion losses and multiple spurious back-reflections. The $N_1$-channel subgroup at output#1 can also be reflected by a small number ($Q<N_1$) of complimentary multiband subgratings 4010 ($G_i$) in series. Each subgrating 4010 ($G_i$) reflects $P_q$ (q=1,2, ... Q) bands and $$\sum_{q=1}^{Q} P_q = N_1.$$

Figure 40:
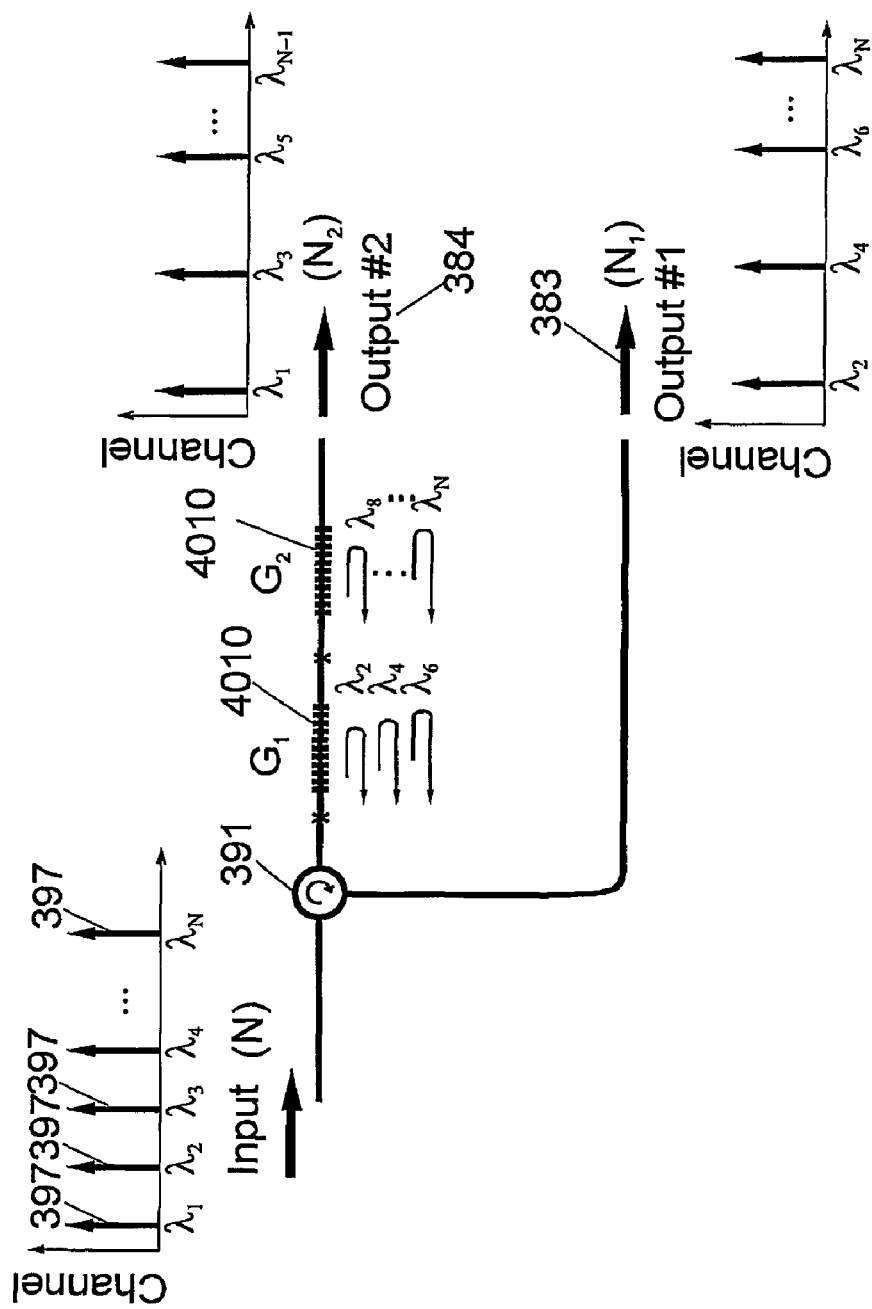
FIG. 40 shows an interleaver according to the present invention in which the interleaver has two multiband gratings.

FIG. 40 shows an example of two complimentary subgratings 4010 $G_1$ and $G_2$, reflecting $P_1$ and $P_2$ bands, respectively, where $P_1+P_2=N_1$.

FIG. 41 shows a schematic of a composite demultiplexer comprising two conventional demultiplexers 4100, 4110 (DEMUX1 and DEMUX2) connected at each output 4120, 4130 of the apparatus 390, which is configured as an interleaver 4140. The main function of the interleaver 4140 is to separate an incoming N-channel DWDM signal, with channel spacing $\Delta\lambda_{in}$, into two streams of $N_1$- and $N_2$-channel outputs with coarser channel spacing $\Delta\lambda_{out}=2\Delta\lambda_{in}$. This relaxes considerably the requirements on the optical characteristics of the subsequent conventional demultiplexers 4100, 4110. Each conventional demultiplexer 4100, 4110 divide the incoming Ni (i=1,2) channel signal into separate single-channel signals at each output. The conventional demultiplexer can be implemented by using arrayed-waveguide-grating (AWG) technology or multilayer thin-film technology.

FIG. 42 shows a schematic of a generalised M-port interleaver 420 comprising (M−1) multiband gratings 392 ($G_i$, i=1,2, . . . M−1) and (M−1) circulators 391 in series. The input 421 of the interleaver 420 constitutes an N-channel WDM signal. Each multiband grating 392 reflects $N_m$ (m=1, 2, . . . M−1) channels, where $N_m \geq 1$, which are routed to the corresponding output by the preceding circulator 391. The remaining $N_M$ channels, where $$N_M = N - \sum_{m=1}^{M-1} N_m,$$

appear at output#M 422. An incoming N-channel DWDM signal, with channel spacing $\Delta\lambda_{in}$, is divided into M streams of $N_m$ (m=1,2, . . . M) channel outputs with much coarser channel spacing $$\Delta\lambda_{out}^{(m)} = p_m \Delta\lambda_{in}$$

where $p_m$=int(N/$N_m$) (int means integer). In general, $p_m \geq 2$. In case of course that $N_1=N_2=N_3=\ldots=N_M$, the channel spacings of the output signals are the same.

FIG. 43 shows a schematic of a composite demultiplexer 431 that comprises the interleaver 420 and M conventional demultiplexers 430 (DMUX1 to DMUX(M)) connected as shown. Such a composite demultiplexer 431 relies on a number of conventional demultiplexers 430 with very low-port-count and large output-channel spacing. Conventional demultiplexers 430 with such relaxed specifications are easily achieved using arrayed-waveguide-grating (AWG) technology or multilayer thin-film technology.

A generalised M-port interleaver can also be realised by combining (M−1) multiband gratings ($G_i$, i=1,2, . . . M−1) and (M−1) circulators in a tree configuration. Such a device 440 is shown schematically in FIG. 44. The M outputs 442 of this generalised grating-based interleaver can be connected to equal number of conventional low-port-count, wide-channel-spacing demultiplexers 430, as shown in FIG. 45, to implement a high performance full optical demultiplexer. Conventional demultiplexers with such relaxed specifications are easily achieved for example by using arrayed-waveguide-grating (AWG) technology or multilayer thin-film technology.

The multiple-band grating/circulator cascade 420 of FIG. 42 can also be re-arranged to function as a wavelength combiner. FIG. 46 shows a schematic of a generalised M-input device 460 consisting of M multiband gratings 391 ($G_i$, i=1,2, . . . M) and M circulators 392. Each multiband grating 391 reflects $N_m$ (m=1,2, . . . M) incoming channels, where $N_m \geq 1$, which are subsequently routed, through the succeeding circulators 392, to the device output 462. The device output consists of N WDM channels, where $$N = \sum_{m=1}^{M} N_m.$$

The M inputs 463 of this generalised grating-based wavelength combiner 460 can be connected to the outputs of equal number of conventional low-port-count, wide-channel-spacing multiplexers 470, as shown in FIG. 47, to implement a high performance full composite optical multiplexer 471. Conventional multiplexers 470 with such relaxed specifications are easily achieved using arrayed-waveguide-grating (AWG) technology or multilayer thin-film technology.

The multiband gratings used for the implementation of the devices discussed in FIGS. 39–47 can be of any type detailed in FIGS. 8–37.

It is to be appreciated that the embodiments of the invention described above with reference to the accompanying drawings have been given by way of example only and that modifications and additional components can be provided to enhance performance.

What is claimed is:

1. Apparatus for filtering optical radiation, the apparatus comprising a waveguide, and wherein the waveguide comprises a grating having a first reflection wavelength band having a first average wavelength and a first group delay having an average first time delay, and a second reflection wavelength band having a second average wavelength and a second group delay having an average second time delay, and wherein the average first time delay and the average second time delay are different by at least one femtosecond, and wherein the grating comprises at least two sub-gratings that overlap spatially with each other.

2. The apparatus of claim 1, and further wherein the first reflection wavelength band has at least one maximum reflectivity.

3. The apparatus of claim 2, and further wherein the maximum reflectivity is greater than 50%.

4. The apparatus of claim 2, and further wherein the maximum reflectivity is greater than 90%.

5. The apparatus of claim 2, and further wherein the maximum reflectivity is greater than 95%.

6. The apparatus of claim 2, and further wherein the maximum reflectivity is greater than 99%.

7. The apparatus of claim 1, and further wherein the first average wavelength is shorter than the second average wavelength.

8. The apparatus of claim 1, and further wherein the average first time delay is less than the average second time delay.

9. The apparatus of claim 1, and further wherein the average first time delay is greater than the average second time delay.

10. The apparatus of claim 1, and further wherein the grating has a time delay difference equal to the modulus of the difference between the average first time delay and the average second time delay.

11. The apparatus of claim 10, and further wherein the time delay difference is between 1 fs and 1000 ps.

12. The apparatus of claim 10, and further wherein the grating comprises a plurality of lines, each line being defined by a respective strength, and each line having a relative displacement from adjacent lines, and wherein the time delay difference is equal to the time taken for light to propagate along the waveguide through an odd integral number of the lines.

13. The apparatus of claim 12, and further wherein the integral number of lines is between one and one million.

14. The apparatus of claim 1, and further wherein the first group delay has a first chirp.

15. The apparatus of claim 14, and further wherein which the first chirp is positive.

16. The apparatus of claim 14, and further wherein the first chirp is negative.

17. The apparatus of claim 14, and further wherein the first chirp is linear.

18. The apparatus of claim 14, and further wherein the first chirp is non-linear.

19. The apparatus of claim 15, and further wherein the second group delay has a second chirp.

20. The apparatus of claim 19, and further wherein the second chirp is positive.

21. The apparatus of claim 19, and further wherein the second chirp is negative.

22. The apparatus of claim 19, and further wherein the second chirp is linear.

23. The apparatus of claim 19, and further wherein the second chirp is non-linear.

24. The apparatus of claim 1, and further wherein the grating comprises at least one additional reflection wavelength band having an additional average wavelength and an additional group delay, and wherein the first, second and the additional average wavelengths are different from each other.

25. The apparatus of claim 24, and further wherein the grating is such that the first, second and additional average wavelengths are configured to reflect non-adjacent wavelength channels.

26. The apparatus of claim 24, and further wherein the first, second and additional average wavelengths are uniformly spaced.

27. The apparatus of claim 1, and further comprising a circulator connected to the grating.

28. The apparatus of claim 27, and further comprising a first demultiplexer, and wherein the circulator is connected to the first demultiplexer.

29. The apparatus of claim 28, and further comprising a second demultiplexer, and wherein the grating is connected to the second demultiplexer.

30. The apparatus of claim 27, and further comprising a plurality of such apparatus configured in a linear array, and wherein each apparatus is configured to reflect different wavelengths.

31. The apparatus of claim 30, and further wherein at least one of the circulators is connected to a demultiplexer.

32. The apparatus of claim 30, and further wherein at least one of the circulators is connected to another apparatus, the other apparatus comprising:
a waveguide, and wherein the waveguide comprises a grating having a first reflection wavelength band having a first average wavelength and a first group delay having an average first time delay, and a second reflection wavelength band having a second average wavelength and a second group delay having an average second time delay, and further wherein the first group delay and the second group delay are different in at least a portion of the second reflection wavelength band and wherein the average first time delay and the average second time delay are different, and wherein the grating comprises at least two sub-gratings that overlap spatially with each other; and wherein:
the grating comprises at least one additional reflection wavelength band having an additional average wavelength, and wherein the first, second and the additional average wavelengths are different from each other, and wherein the grating of the other apparatus is such that the first, second and additional average wavelengths are configured to reflect non-adjacent wavelength channels; and
the grating is such that the first, second and additional average wavelengths are configured to reflect non-adjacent wavelength channels; and
the another apparatus is configured to reflect different wavelengths from the apparatus.

33. The apparatus of claim 32, and further comprising at least one demultiplexer.

34. The apparatus of claim 1 wherein the grating is defined by a coupling constant modulus extending along its length, the coupling constant modulus having a first peak and a second peak, the first peak having a spatial width, and wherein the grating is characterised by having a spatial separation between the first and second peaks that is between one and eight times the spatial width.

35. The apparatus of claim 34 wherein the spatial separation is between one and four times the spatial width.

36. The apparatus of claim 35 wherein the spatial separation is between one and three times the spatial width.

37. The apparatus of claim 36 wherein the spatial separation is between 1.5 and 2 times the spatial width.

38. The apparatus of claim 34 wherein the coupling constant modulus has a plurality of additional peaks that are separated by the spatial separation.

* * * * *